US008497325B2

(12) United States Patent
Tse et al.

(10) Patent No.: US 8,497,325 B2
(45) Date of Patent: Jul. 30, 2013

(54) THERMOPLASTIC POLYOLEFIN BLENDS AND FILMS THEREFROM

(71) Applicant: ExxonMobil Chemical Patents Inc., Baytown, TX (US)

(72) Inventors: Mun F. Tse, Seabrook, TX (US); Peijun Jiang, League City, TX (US); Jianya Cheng, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/628,477

(22) Filed: Sep. 27, 2012

(65) Prior Publication Data

US 2013/0029125 A1 Jan. 31, 2013

Related U.S. Application Data

(60) Continuation-in-part of application No. 13/027,896, filed on Feb. 15, 2011, now Pat. No. 8,410,217, and a continuation-in-part of application No. 13/329,461, filed on Dec. 19, 2011, said application No. 13/027,896 is a continuation-in-part of application No. 12/638,916, filed on Dec. 15, 2009, now Pat. No. 8,101,685, said application No. 13/329,461 is a division of application No. 12/638,916, which is a continuation-in-part of application No. 12/335,252, filed on Dec. 15, 2008, now Pat. No. 8,022,142.

(51) Int. Cl.
*C08F 8/00* (2006.01)
*C08L 23/04* (2006.01)
*C08L 23/00* (2006.01)

(52) U.S. Cl.
USPC .......................................... 525/191; 525/240

(58) Field of Classification Search
USPC ............................................... 525/191, 240
See application file for complete search history.

(56) References Cited

U.S. PATENT DOCUMENTS

| | | |
|---|---|---|
| 4,438,238 A | 3/1984 | Fukushima et al. |
| 4,461,873 A | 7/1984 | Bailey et al. |
| 4,824,912 A | 4/1989 | Su |
| 4,832,770 A | 5/1989 | Nojiri et al. |
| 5,082,902 A | 1/1992 | Gurevitch et al. |
| 5,166,268 A | 11/1992 | Ficker |
| 5,180,751 A | 1/1993 | Park et al. |
| 5,306,775 A | 4/1994 | Martin et al. |
| 5,382,631 A | 1/1995 | Stehling et al. |
| 5,516,848 A | 5/1996 | Canich et al. |
| 5,539,056 A | 7/1996 | Yang et al. |
| 5,925,448 A | 7/1999 | Moy et al. |
| 5,962,595 A | 10/1999 | Dolle et al. |
| 6,147,180 A | 11/2000 | Markel et al. |
| 6,248,832 B1 | 6/2001 | Peacock |
| 6,284,833 B1 | 9/2001 | Ford et al. |
| 6,287,705 B1 | 9/2001 | Seta et al. |
| 6,319,998 B1 | 11/2001 | Cozewith et al. |
| 6,323,284 B1 | 11/2001 | Peacock |
| 6,362,270 B1 | 3/2002 | Chaudhary et al. |
| 6,441,111 B1 | 8/2002 | Ushioda et al. |
| 6,512,019 B1 | 1/2003 | Agarwal et al. |
| 6,583,193 B2 | 6/2003 | Park et al. |
| 6,583,227 B2 | 6/2003 | Mehta et al. |
| 6,590,006 B2 | 7/2003 | Park et al. |
| 6,635,715 B1 | 10/2003 | Datta et al. |
| 6,642,316 B1 | 11/2003 | Datta et al. |
| 6,660,809 B1 | 12/2003 | Weng et al. |
| 6,713,520 B2 | 3/2004 | Sahnoune et al. |
| 6,806,316 B2 | 10/2004 | Mehta et al. |
| 6,815,508 B1 | 11/2004 | Terano et al. |
| 6,939,919 B2 | 9/2005 | Tau et al. |
| 7,101,936 B2 | 9/2006 | Weng et al. |
| 7,365,136 B2 | 4/2008 | Huovinen et al. |
| 7,951,873 B2 | 5/2011 | Best et al. |
| 8,022,142 B2 | 9/2011 | Jiang et al. |
| 8,093,335 B2 | 1/2012 | Jiang et al. |
| 8,101,685 B2 | 1/2012 | Jiang et al. |
| 2003/0114595 A1 | 6/2003 | Van Dun et al. |
| 2004/0054100 A1 | 3/2004 | Debras et al. |
| 2004/0249084 A1 | 12/2004 | Stevens et al. |

(Continued)

FOREIGN PATENT DOCUMENTS

| | | |
|---|---|---|
| EP | 0 206 515 | 12/1986 |
| EP | 0 129 368 | 7/1989 |

(Continued)

OTHER PUBLICATIONS

Arriola et al., *Catalytic Production of Olefin Block Copolymers via Chain Shuttling Polymerization*, Science, 2006, vol. 312, pp. 714-719.

Dankova et al., *Models for Conformationally Dynamic Metallocenes. Copolymerization Behavior of the Unbridged Metallocene (1-Methyl-2-phenylindenyl)(2-phenylindenyl)zirconium Dichloride*, Macromolecules, 2002, vol. 35, No. 8, pp. 2882-2891.

Lohse et al., *Graft Copolymer Compatibilizers for Blends of Polypropylene and Ethylene-Propylene Copolymers*, Macromolecules, 1991, vol. 24, No. 2, pp. 561-566.

(Continued)

*Primary Examiner* — Nathan M Nutter

(74) *Attorney, Agent, or Firm* — Catherine L. Bell

(57) ABSTRACT

This invention relates to a film comprising a blend composition comprising: 1) a linear ethylene containing polymer, such as a LLDPE, a HDPE or the like; and at least 1 weight percent of an in-reactor polymer blend comprising: (a) a first ethylene containing polymer having a density of greater than 0.90 g/cm$^3$ and a $M_w$ of more than 20,000 g/mol; and (b) a second ethylene containing polymer having a density of less than 0.90 g/cm$^3$, wherein the polymer blend has a $T_m$ of at least 90° C. (DSC second melt), a density of less than 0.92 g/cm$^3$, and the densities of the first and second polymers differ by at least 1%.

45 Claims, 8 Drawing Sheets

U.S. PATENT DOCUMENTS

| | | |
|---|---|---|
| 2004/0260025 A1 | 12/2004 | Ravishankar et al. |
| 2006/0173132 A1 | 8/2006 | Mehta et al. |
| 2006/0199873 A1 | 9/2006 | Mehta et al. |
| 2006/0211819 A1 | 9/2006 | Hoenig et al. |
| 2006/0281868 A1 | 12/2006 | Sudhin et al. |
| 2008/0027173 A1 | 1/2008 | Ravishankar |
| 2008/0033124 A1 | 2/2008 | Jiang et al. |
| 2009/0192270 A1* | 7/2009 | Malakoff et al. ............ 525/240 |
| 2010/0152388 A1 | 6/2010 | Jiang et al. |
| 2010/0152390 A1 | 6/2010 | De Gracia et al. |

FOREIGN PATENT DOCUMENTS

| | | |
|---|---|---|
| EP | 0 366 411 | 5/1990 |
| EP | 0 423 962 | 4/1991 |
| EP | 0 527 589 | 2/1993 |
| EP | 0 749 992 | 12/1996 |
| JP | 08-041253 | 2/1996 |
| JP | 10-110068 | 4/1998 |
| JP | 2004-231844 | 8/2004 |
| JP | 2004-359911 | 12/2004 |
| WO | WO 98/26000 | 6/1998 |
| WO | WO 98/27154 | 6/1998 |
| WO | WO 03/040201 | 5/2003 |
| WO | WO 2004/016679 | 2/2004 |
| WO | WO 2004/060994 | 7/2004 |
| WO | WO 2007/001644 | 1/2007 |

OTHER PUBLICATIONS

Paavola et al., *Propylene Copolymerization With Non-conjugated Dienes and α-olefins Using Supported Metallocene Catalyst*, Polymer, 2004, vol. 45, No. 7, pp. 2099-2110.

Tynys et al., *Copolymerisation of 1,9-decadiene and Propylene With Binary and Isolated Metallocene Systems*, Polymer, 2007, vol. 48, No. 10, pp. 2793-2805.

Ye et al., *Synthesis and Rheological Properties of Long-Chain-Branched Isotactic Polypropylenes Prepared by Copolymerization of Propylene and Nonconjugated Dienes*, Ind. Eng. Chem. Res., 2004, vol. 43, No. 11, pp. 2860-2870.

\* cited by examiner

Example #3              Example #5

THERMOPLASTIC POLYOLEFIN BLENDS AND FILMS THEREFROM

PRIORITY

This application is a continuation-in-part of U.S. Ser. No. 13/027,896, filed Feb. 15, 2011 (now U.S. Pat. No. 8,410, 217), which is a continuation-in-part of Ser. No. 12/638,916, filed Dec. 15, 2009 (now U.S. Pat. No. 8,101,685), which is a continuation-in-part of U.S. Ser. No. 12/335,252 filed Dec. 15, 2008 (now U.S. Pat. No. 8,022,142). This application is also a continuation-in-part of U.S. Ser. No. 13/329,461, filed Dec. 19, 2011, which is a divisional of Ser. No. 12/638,916, filed Dec. 15, 2009 (now U.S. Pat. No. 8,101,685)), which is a continuation-in-part of U.S. Ser. No. 12/335,252 filed Dec. 15, 2008 (now U.S. Pat. No. 8,022,142).

FIELD OF THE INVENTION

This invention relates to the blend compositions comprising a linear ethylene containing polymer and an in-reactor polymer blend comprising two ethylene containing polymers having different comonomer contents.

BACKGROUND OF THE INVENTION

Various types of polyethylene are used in the art. Low density polyethylene ("LDPE") can be prepared at high pressure using free radical initiators, and typically has a density in the range of 0.916-0.940 g/cm$^3$. LDPE is also known as "branched" or "heterogeneously branched" polyethylene because of the relatively high level of long chain branches extending from the main polymer backbone. Polyethylene in the same density range, i.e., 0.916 to 0.940 g/cm$^3$, which is linear and does not contain long chain branching, is also available; this "linear low density polyethylene" ("LLDPE") can be produced with conventional Ziegler-Natta catalysts or with metallocene catalysts. Relatively higher density LDPE, typically in the range of 0.928 to 0.940 g/cm$^3$, is sometimes referred to as medium density polyethylene ("MDPE"). HDPE has a density of greater than 0.940 g/cm$^3$, and is generally prepared with Ziegler-Natta catalysts. Very low density polyethylene ("VLDPE") can be produced by a number of different processes yielding polymers with different properties, but can be generally described as polyethylene having a density less than 0.916 g/cm$^3$, typically 0.890 to 0.915 g/cm$^3$, or 0.900 to 0.915 g/cm$^3$.

Plastomers are ethylene/alpha-olefin copolymers with compositions and physical properties spanning the range between plastics and elastomers. Comonomer content typically ranges from 10 wt % to 30 wt % and density ranges from 0.910 to 0.860 g/cm$^3$. Particularly useful plastomers are often ultra-low-density ethylene copolymers made using metallocene catalysts. The uniform comonomer insertion results in low-density plastomer exhibiting both plastic and elastomeric behavior. Compared to LLDPE, plastomers are lower in density, tensile strength, flexural modulus, hardness, and melting point. They exhibit higher elongation and toughness and are substantially higher in clarity, with very low haze values at lower densities.

Each product slate has unique properties and is used for specific applications. For some applications individual polymers do not possess the necessary combination of properties. For instance, LLDPE provides good toughness and other desirable properties but these properties decrease as the modulus (modulus is proportional to density for polyethylene) of the LLDPE increases. Generally, selecting optimum performance is a matter of trading off one property against another, for example, increasing modulus decreases toughness.

Individual polyolefins having certain characteristics are often blended together in the hope of combining the positive attributes of the individual components. Typically the result is a blend which displays an average of the individual properties of the individual resins. Blending has been used to form polymer compositions having altered properties, such as melt index and various processability characteristics. Blending has also been used to form polymer compositions having properties enhanced for particular end uses. For example, polymer blends have been used to form cast or extruded films with altered film properties, such as toughness, tear resistance, shrink properties, and other desired film characteristics. For example, U.S. Pat. No. 4,438,238 describes blends for extrusion processing, injection molding and films where a combination of two ethylene-α-olefin copolymers with different densities, intrinsic viscosities and number of short chain branching per 1,000 carbon atoms is attributed with such physical properties. U.S. Pat. No. 4,461,873 describes ethylene polymer blends of a high molecular weight ethylene polymer, preferably a copolymer, and a low molecular weight ethylene polymer, preferably an ethylene homopolymer, for improved film properties and environmental stress crack resistance useful in the manufacture of film or in blow molding techniques, the production of pipes and wire coating. EP 0 423 962 describes ethylene polymer compositions particularly suitable for gas pipes said to have improved environmental stress cracking resistance comprising two or more kinds of ethylene polymers different in average molecular weight, at least one of which is a high molecular weight ethylene polymer having an intrinsic viscosity of 4.5 to 10.0 dl/g in decalin at 135° C. and a density of 0.910 to 0.930 g/cm$^3$ and another of which is a low molecular weight ethylene polymer having an intrinsic viscosity of 0.5 to 2.0 dl/g, as determined for the first polymer, and a density of 0.938 to 0.970 g/cm$^3$.

U.S. Pat. No. 5,082,902 describes blends of linear polyethylene for injection and rotational molding said to have reduced crystallization times with improved impact strength and environmental stress crack resistance. The blends comprise: (a) a first polymer having a density of from 0.85 to 0.95 g/cm$^3$ and an melt index of 1 to 200 g/10 min; and (b) a second polymer having a density of 0.015 to 0.15 g/cm$^3$ greater than the density of the first polymer and an melt index differing by no more that 50% from the melt index of the first polymer. U.S. Pat. No. 5,306,775 describes polyethylene blends said to have a balance of properties for processing by any of the known thermoplastic processes, specifically including improved environmental stress crack resistance. These compositions have: (a) low molecular weight ethylene resins made using a chromium oxide based catalyst and having a density at least 0.955 g/cm$^3$ and melt index (MI) between 25 and 400 g/10 min; and (b) high molecular weight ethylene copolymer resins with a density not higher than 0.955 g/cm$^3$ and a high load melt index (HLMI) between 0.1 and 50 g/10 min.

U.S. Pat. No. 5,382,631 describes linear interpolymer polyethylene blends having narrow molecular weight distribution ($M_w/M_n$ less than or equal to 3) and/or composition distribution breadth index (CDBI) less than 50%, where the blends are generally free of fractions having higher molecular weight and lower average comonomer contents than other blend components. Improved properties for films, fibers, coatings, and molded articles are attributed to these blends. In one example, a first component is an ethylene-butene copolymer with a density of 0.9042 g/cm³, $M_w/M_n$ of 2.3, and an MI of 4.0 dg/min and a second component is an HDPE with a density of 0.9552 g/cm³, $M_w/M_n$ of 2.8, and an MI of 5.0 dg/min. The blend is said to have improved tear strength characteristics.

U.S. Pat. No. 6,362,270 describes thermoplastic compositions said to be especially suited to rotomolding applications comprising: (a) a majority component that may be an ethylene interpolymer having a density greater than 0.915 g/cm³ and preferably a melt index (MI) of from about 2 to 500 dg/min; and (b) an impact additive that may be an ethylene interpolymer having a density less than 0.915 g/cm³ and an MI preferably greater than 0.05 dg/min and less than 100 dg/min. Improved physical properties as ascribed to these compositions include improved impact strength and good environmental stress crack resistance.

Physical blends have problems of inadequate miscibility. Unless the components are selected for their compatibility they can phase separate or smaller components can migrate to the surface. Reactor blends, also called intimate blends (a composition comprising two or more polymers made in the same reactor or in a series of reactors) are often used to address these issues; however, finding catalyst systems that will operate under the same environments to produce different polymers has been a challenge.

Multiple catalyst systems have been used in the past to produce reactor blends of various polymers and other polymer compositions. Reactor blends and other one-pot polymer compositions are often regarded as superior to physical blends of similar polymers. For example U.S. Pat. No. 6,248,832 discloses a polymer composition produced in the presence of one or more stereospecific metallocene catalyst systems and at least one non-stereospecific metallocene catalyst system. The resultant polymer has advantageous properties over the physical blends disclosed in EP 0 527 589 and U.S. Pat. No. 5,539,056.

Thus, there has been interest in the art in developing multiple catalyst systems to produce new polymer compositions. For example, U.S. Pat. No. 6,147,180 discloses a thermoplastic elastomer composition comprising a branched olefin copolymer backbone and crystallizable side chains, wherein the copolymer has A) a $T_g$ as measured by DSC less than or equal to 10° C.; B) a $T_m$ greater than 80° C.; C) an elongation at break of greater than or equal to 300%; D) a tensile strength of greater than or equal to 1,500 psi (10.3 MPa) at 25° C.; and E) an elastic recovery of greater than or equal to 50%. The thermoplastic elastomer composition can be produced by A) polymerizing ethylene or propylene, optionally with one or more copolymerizable monomers, in a polymerization reaction under conditions sufficient to form a polymer having greater than 40% chain end-group unsaturation; and B) copolymerizing the product of A) with ethylene and one or more copolymerizable monomers so as to prepare said branched olefin copolymer. The two polymerization steps can be conducted sequentially or concurrently. Although the polymer exhibited good tensile properties and elastic recovery, the shear thinning was low. In addition U.S. Pat. No. 6,323,284 discloses a method to produce thermoplastic compositions (mixtures of crystalline and amorphous polyolefin copolymers) by copolymerizing alpha-olefins and alpha, omega dienes using two separate catalyst systems.

Likewise, others have experimented with multiple stage processes to produce new polymer compositions. For example, EP 0 366 411 discloses a graft polymer having an EPDM backbone with polypropylene grafted thereto at one or more of the diene monomer sites through the use of a two-step process using a different Ziegler-Natta catalyst system in each step. This graft polymer is stated to be useful for improving the impact properties in blended polypropylene compositions.

Although each of the polymers/blends described in the above references has interesting combinations of properties, there remains a need for new compositions that offer other new and different property balances tailored for a variety of end uses. In particular, it would be desirable to find a composition that contains cross products useful as compatibilizer compounds for interfacial interactions.

Other references of interest include: U.S. Patent Application Publication Nos. 2006/0281868; 2008/0027173; 2008/0033124; 2004/0054100; WO 2003/040201; U.S. Pat. Nos. 6,319,998; 6,284,833; 6,512,019; 7,365,136; 6,441,111; 6,806,316; 5,962,595; 5,516,848; 6,147,180; EP 0 527 589; and EP 0 749 992.

SUMMARY OF THE INVENTION

The present invention provides a polymer blend of a linear ethylene containing polymer, such as a LLDPE, a HDPE or the like, and an in-reactor polymer blend. The in-reactor polymer blend is a mixture of a higher density polyethylene and a lower density polyethylene as well as cross product. This in-reactor polymer blend exhibits a unique combination of long elongation and strong shear thinning and is used as a modifier to a linear ethylene containing polymer, such as a LLDPE, a HDPE, or the like.

This invention discloses blend compositions of a linear ethylene containing polymer, such as a LLDPE, a HDPE, or the like, with in-reactor polymer blends. The resulting blend compositions show improved melt strength and shear thinning compared to the neat linear ethylene containing polymer. These attributes will expand and enable the use of this new blend composition in applications, such as films, thermoformed articles, extruded goods, etc. The in-reactor polymer blend used in this new blend composition can be prepared in a batch, a continuous, or a semi-continuous reactor by a dual metallocene catalyst system. Besides hexene, other α-olefin comonomer, such as propylene, butene, octene, etc., can be used.

This invention further relates to a composition comprising:
1) a linear ethylene containing polymer having a density of at least 0.910 g/cm³; and
2) an in-reactor polymer blend comprising: (a) a first ethylene containing polymer having a density of greater than 0.90 g/cm³ and a $M_w$ of more than 20,000 g/mol; and (b) a second ethylene containing polymer having a density of less than 0.90 g/cm³, wherein the densities of the first and second polymers differ by at least 1%, and wherein the in-reactor polymer blend has a $T_m$ of at least 90° C. (DSC second melt), a density of less than 0.92 g/cm³, and contains at least 78 wt % ethylene.

This invention further relates to a composition including a linear ethylene containing polymer, such as a LLDPE, a HDPE or the like, and an in-reactor polymer blend. The linear ethylene containing polymer has a density of greater than 0.910 g/cm³ and an $M_w$ of more than 50,000 g/mol. The in-reactor polymer blend comprises one or more of: (a) a high crystalline ethylene polymer comprising 90 wt % to 100 wt % ethylene and from about 0 wt % to less than 10 wt % comonomer, said high crystalline ethylene polymer component having density of greater than 0.920 g/cm³, an $M_w$ of 20,000 g/mol or more and optionally a $T_m$ of 110° C. or more; and (b) a low crystalline ethylene polymer comprising from 70 wt % to 90 wt % ethylene and 30 wt % to 10 wt % comonomer, said low crystalline ethylene polymer having a density of 0.910 g/cm³ or less so that the in-reactor polymer blend contains at least 78 wt % ethylene.

This invention relates to a composition comprising:
a linear ethylene containing polymer having a density of at least 0.910 g/cm³, such as a LLDPE, a HDPE, or the like; and
at least 1 wt % of an in-reactor polymer blend comprising:
(a) a high crystalline ethylene polymer comprising 90 wt % to 100 wt % ethylene and from 0 wt % to less than 10 wt % comonomer, said high crystalline ethylene polymer component having density of greater than 0.920 g/cm³, an $M_w$ of 20,000 g/mol or more and optionally a $T_m$ of 110° C. or more; and (b) a low crystalline ethylene polymer comprising from 70 wt % to 90 wt % ethylene and 30 wt % to 10 wt % comonomer, said low crystalline ethylene polymer having a density of 0.910 g/cm³ or less, wherein the in-reactor polymer blend has one or more of the following characteristics:
(a) at least 78 wt % ethylene;
(b) a $T_m$ of at least 100° C. over a density ranging from 0.84 to 0.92 g/cm³;
(c) an elongation at break of 300% or more;
(d) a strain hardening ratio, M300/M100, of at least 1.2;
(e) a ratio of complex viscosity at 0.01 rad/s to the complex viscosity at 100 rad/s of at least 30; and
(f) a shear thinning index of less than −0.2.

In this in-reactor polymer blend, the first ethylene polymer component may also be referred to as a "high crystallinity" ethylene polymer component, where "high" means the density is greater than 0.920 g/cm³. The second ethylene polymer component may also be referred to as a "low crystallinity" ethylene polymer component, where "low" means the density is 0.910 g/cm³ or less.

DETAILED DESCRIPTION

Figure 1:
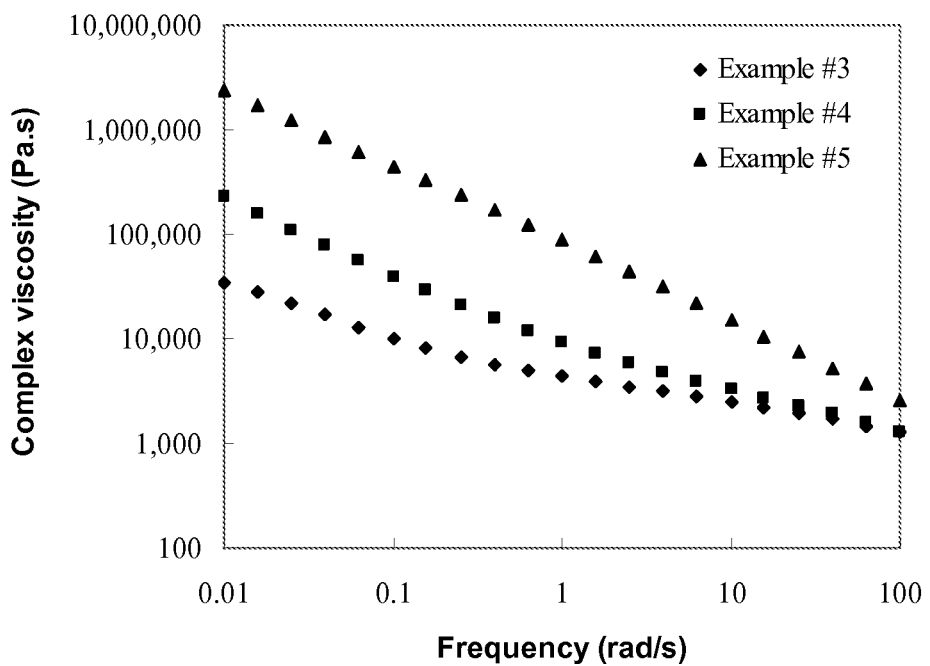
FIG. 1 is a graphic illustration of the relationship between the complex viscosity and frequency for the in-reactor polymer blends produced in Examples 3 to 5 (measured at a temperature of 190° C.).

As used herein the term "in-reactor polymer blend" also referred to as an "intimate blend" is intended to mean a mixture of polymers produced in one or more polymerization zones in the same polymerization process/system without the need for post polymerization blending (although the resultant copolymer can undergo post polymerization blending, for example, to incorporate modifiers and additives). Each polymer component in the mixture possesses a unique molecular structure such as percent comonomer content, molecular weight and some of the components have molecular architectures such as branched block products.

A polymerization zone is defined as an area where activated catalysts and monomers are contacted and a polymerization reaction takes place. When multiple reactors are used in either series or parallel configuration, each reactor is considered as a separate polymerization zone. For a multi-stage polymerization in both a batch reactor and a continuous reactor, each polymerization stage is considered as a separate polymerization zone.

As used herein, the term continuous means a system that operates without interruption or cessation. Hence, a continuous process is one where there is continuous addition to, and withdrawal of reactants and products from, the reactor system. Continuous processes can be operated in steady state, i.e., the composition of effluent remains fixed with time if the flow rate, temperature/pressure and feed composition remain invariant. For example, a continuous process to produce a polymer would be one where the reactants are continuously introduced into one or more reactors and polymer product is continuously withdrawn.

An "ethylene containing polymer" also referred to as an "ethylene polymer" is a polymer having at least 50 wt % ethylene monomer (based upon the weight of the polymer), with the balance being made up by hydrocarbon monomers, preferably $C_3$ to $C_{12}$ hydrocarbon monomers, preferably propylene, butene, hexene, octene, or mixtures thereof. A "linear ethylene containing polymer" also referred to as a "linear ethylene polymer" is an ethylene containing polymer having a branching index (g') of 0.98 or more, preferably 0.99 or more, preferably 1.0 (1.0 being the theoretical limit of g'). Branching index (g') is determined as described in U.S. Patent Application Publication No. 2006/0173123, particularly pages 24-25. In the event there is a conflict between the size exclusion chromatography method described in 2006/0173123 and the size exclusion chromatography method described below, the method described in 2006/0173123 shall be used for determination of g'. A "metallocene polyethylene" or an "mPE" is an ethylene polymer having a CDBI of greater than 50%, preferably greater than 60%. An "mLLDPE" is an ethylene polymer (preferably a copolymer) having a CDBI of greater than 50% (preferably greater than 60%) and a density of 0.910 to 0.940 g/cm³. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes of this invention and the claims thereto: 1) an ethylene polymer having a density of 0.86 g/cm³ or less is referred to as an ethylene elastomer or elastomer; 2) an ethylene polymer having a density of more than 0.86 to less than 0.910 g/cm³ is referred to as an ethylene plastomer or plastomer; 3) an ethylene polymer having a density of 0.910 to 0.940 g/cm³ is referred to as a low density polyethylene or "LDPE" (Low density polyethylene includes both LDPE and LLDPE unless otherwise noted); 4) a linear ethylene polymer having a density of 0.910 to 0.940 g/cm³ is referred to as a linear low density polyethylene or "LLDPE" (LLDPE is typically made using conventional Ziegler-Natta or metallocene catalysts); and 5) an ethylene polymer having a density of more than 0.940 g/cm³ is referred to as a high density polyethylene or "HDPE". For these definitions, and for this invention and the claims thereto, density is determined using a density-gradient column, as described in ASTM D1505, on a compression-molded specimen that has been slowly cooled to room temperature (i.e., over a period of 10 minutes or more) and allowed to age for a sufficient time that the density is constant within +/−0.001 g/cm³.

This invention relates to a composition comprising:

1) 0.5 wt % to 99 wt % (preferably 50 wt % to 99 wt %, preferably 85 wt % to 99 wt %) of a linear ethylene containing polymer having a density of at least 0.910 g/cm³; and 2) 99.5 wt % to 1 wt % (preferably 50 wt % to 1 wt %, preferably 15 wt % to 1 wt %) of an in-reactor polymer blend, based upon the weight of the composition, preferably where the in-reactor polymer blend comprises: (a) a first ethylene containing polymer having a density of greater than 0.90 g/cm³ and an $M_w$ of more than 20,000 g/mol; and (b) a second ethylene containing polymer having a density of less than 0.90 g/cm³, wherein the densities of the first and second polymers differ by at least 1%, and wherein the in-reactor polymer blend has a $T_m$ of at least 90° C. (DSC second melt), a density of less than 0.92 g/cm³, and contains at least 78 wt % ethylene.

This invention further relates to a composition including a linear ethylene containing polymer, such as a LLDPE, a HDPE or the like, and an in-reactor polymer blend. The linear ethylene containing polymer has a density of greater than 0.910 g/cm³ and an $M_w$ of more than 50,000 g/mol. The in-reactor polymer blend comprises one or more of: (a) a high crystalline ethylene polymer comprising 90 wt % to 100 wt % ethylene and from about 0 wt % to less than 10 wt % comonomer, said high crystalline ethylene polymer component having density of greater than 0.920 g/cm³, an $M_w$ of 20,000 g/mol or more and optionally a $T_m$ of 110° C. or more; and (b) a low crystalline ethylene polymer comprising from 70 wt % to 90 wt % ethylene and 30 wt % to 10 wt % comonomer, said low crystalline ethylene polymer having a density of 0.910 g/cm³ or less so that the in-reactor polymer blend contains at least 78 wt % ethylene.

This invention also relates to a composition comprising:

1) a linear ethylene containing polymer having a density of at least 0.910 g/cm³, such as a LLDPE, a HDPE, or the like; and 2) at least 1 wt % of an in-reactor polymer blend comprising: (a) a high crystalline ethylene polymer comprising 90 wt % to 100 wt % ethylene and from 0 wt % to less than 10 wt % comonomer, said high crystalline ethylene polymer component having density of greater than 0.920 g/cm³, an $M_w$ of 20,000 g/mol or more and optionally a $T_m$ of 110° C. or more; and (b) a low crystalline ethylene polymer comprising from 70 wt % to 90 wt % ethylene and 30 wt % to 10 wt % comonomer, said low crystalline ethylene polymer having a density of 0.910 g/cm³ or less, wherein the in-reactor polymer blend has one or more of the following characteristics:

(a) at least 78 wt % ethylene;
(b) a $T_m$ of at least 100° C. over a density ranging from 0.84 to 0.92 g/cm³;
(c) an elongation at break of 300% or more;
(d) a strain hardening ratio, M300/M100, of at least 1.2;
(e) a ratio of complex viscosity at 0.01 rad/s to the complex viscosity at 100 rad/s of at least 30; and
(f) a shear thinning index of less than −0.2.

Linear Ethylene Containing Polymers

This invention relates to a composition comprising a linear ethylene-containing polymer and an in-reactor blend. The linear ethylene-containing polymers are generally polymers having a density of 0.910 g/cm³ or more and include HDPE and LLDPE produced either with conventional Ziegler-Natta catalysts or with metallocene catalysts.

In a preferred embodiment, the linear ethylene containing polymer is a polymer having a density of 0.910 g/cm³ or more; an $M_w$ of 50,000 g/mol or more (preferably 75,000 g/mol or more, preferably 100,000 g/mol or more); a g' of 0.95 or more (preferably 0.98 or more, preferably 0.99 or more, preferably 1.0); an $M_w/M_n$ of from 1 to 10 (preferably from greater than 1 to 10, preferably from 1.5 to 8, preferably 2 to 5); and comprises from 50 mole % to 100 mole % ethylene (preferably 65 mole % to 99 mole %, preferably 80 mole % to 97 mole %, preferably 90 mole % to 97 mole %), and from 0 to 50 mole % (preferably from 1 to 35 mole %, preferably 3 to 20 mole %, preferably 3 mole % to 10 mole %) of $C_2$ to $C_{40}$ comonomer (preferably $C_2$ to $C_{40}$ alpha-olefin, preferably a $C_5$ to $C_{40}$ alpha olefin, preferably propylene, butene, pentene, hexene, or octene).

In a preferred embodiment, the ethylene containing polymer has an extractables level of less than 2.6 wt %, as defined in 21 CFR 177.1520(d)(3)(ii).

In a preferred embodiment, the ethylene polymers are metallocene polyethylenes (mPE's). The mPE homopolymers or mPE copolymers (such as mLLDPE) may be produced using mono- or bis-cyclopentadienyl transition metal catalysts or other metallocene catalysts in combination with an activator of alumoxane and/or a non-coordinating anion in solution, slurry, high pressure, or gas phase. The catalyst and activator may be supported or unsupported and the cyclopentadienyl rings may be substituted or unsubstituted. The mPE polymers, particularly mLLDPE copolymers, can include those containing a small amount of long chain branching (LCB), for example below 5 wt %. Several commercial products produced with such catalyst/activator combinations are commercially available from ExxonMobil Chemical Company in Baytown, Tex. under the tradenames EXCEED™ and ENABLE™.

In a particularly preferred embodiment, the compositions of this invention comprise a linear ethylene containing polymer that is a metallocene LLDPE (mLLDPE), preferably present at 0.5 wt % to 99 wt % of an mLLDPE, more preferably 50 wt % to 99 wt %, more preferably 90 wt % to 99 wt %, based upon the weight of the composition. Preferred mLLDPEs are copolymers comprising at least 50 wt % ethylene and having up to 50 wt %, preferably 1 wt % to 35 wt %, even more preferably 1 wt % to 6 wt % of a $C_3$-$C_{20}$ comonomer (e.g., $C_4$, $C_6$, $C_8$), based upon the weight of the copolymer. The polyethylene copolymers preferably have an $M_w/M_n$ of from greater than 1 to 10, preferably from 1.5 to 8, preferably 2 to 7, preferably from 2 to 5. The polyethylene copolymers preferably have a composition distribution breadth index (CDBI) of 60% to 85%, preferably 65% to 85%. In another preferred embodiment the ethylene copolymer has a density of 0.910 to 0.935 g/cm³ and a CDBI of 60% to 85% or more, preferably between 65% and 85%. Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight ($M_w$) below 15,000 g/mol are ignored when determining CDBI. For purposes of this invention a homopolymer is defined to have a CDBI of 100%.

In another embodiment the linear ethylene containing polymer is a polymer of an ethylene and at least one alpha olefin. The alpha olefin has 5 to 20 carbon atoms, more preferably 5 to 10 carbon atoms and most preferably 5 to 8 carbon atoms. The polymer is obtainable by a continuous gas phase polymerization using supported catalyst of an activated molecularly discrete catalyst in the substantial absence of an aluminum alkyl based scavenger (e.g., triethylaluminum (TEAL), trimethylaluminum (TMAL), triisobutyl aluminum (TIBAL), tri-n-hexylaluminum (TNHAL) and the like). The polymer has a melt index, MI, (ASTM D1238, 190° C./2.16 kg) of from 0.1 to 15 (preferably 0.3 to 10); a CDBI of at least 70% (preferably at least 75%), a density of from 0.910 to 0.930 g/cm$^3$ (preferably from 0.915 to 0.927 g/cm$^3$); a haze value (ASTM D 1003) of less than 20; a melt index ratio (MIR, ASTM D1238 I21/I2) of from 35 to 80; an averaged modulus (M) of from 20000 to 60000 psi (137.9 to 413.7 MPa) and a relation between M and the dart impact strength, DIS, (determined by ASTM D1709, 26 inch) in g/mil (DIS) complying with the formula:

$$DIS \geq 0.8[100+\exp(11.71-0.000268M+2.183\times 10^{-9}M^2)]$$

where M is the averaged modulus, as further described in U.S. Pat. No. 6,255,426, the contents of which are incorporated in their entirety, including columns 7, line 5 through column 10, line 63. The averaged modulus (M) is the sum of the 1% secant Modulus (ASTM D882) in the machine direction and the transverse direction divided by two. In a preferred embodiment, the DIS is from 120 to 1000 g/mil, preferably 150 to 800 g/mil. In a preferred embodiment, the $M_w/M_n$ is from 2.5 to 5.5.

Particularly useful linear ethylene containing polymers are those described in U.S. Pat. No. 6,255,426.

In-Reactor Polymer Blend

As used herein the term "branched block copolymer" is defined as the cross product obtained when a first polymer chain (also referred as macromonomer) with reactive polymerizable chain ends is incorporated into a second polymer chain during the polymerization of the latter to form a structure comprising a backbone defined by one of the polymer chains with branches of the other polymer chains extending from the backbone. Backbone and branches possess different and unique molecular structures, such as chemical composition and crystallinity. For example, a polyethylene homopolymer with vinyl chain ends can be incorporated into an ethylene copolymer chain to form a branched cross-product with an ethylene copolymer backbone and homopolyethylene side branches. Since the molecular structure/composition in the backbone and branches are different, the branched block composition typically has characteristics from both the backbone and the branches. The branched block products are also referred to as branched cross products or cross products. In one embodiment, the branches of branched block copolymer produced herein are comprised of homopolyethylene and the backbone is comprised of ethylene copolymers with at least one monomer selected from ethylene or $C_3$ to $C_{12}$ alpha olefin. In another embodiment, both the backbone and branches in the branched block polymer are comprised of ethylene copolymers, wherein the difference in density between the copolymers in backbone and branches is at least 1%, preferably at least 2%, more preferably at least 3%.

To effectively incorporate a reactive polymer chain into the growing chains of another polymer, it is preferable that the macromonomers derived from at least one catalyst have reactive polymerizable chain ends. Alternately a first polymerization step produces macromonomers having reactive termini, such as vinyl end groups, in a process involving multiple steps. By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. Vinyl terminated chains are generally more reactive than vinylene or vinylidene terminated chains. Generally, it is desirable that the macromonomers derived from at least one catalyst have at least 50%, such as at least 70% of vinyl terminal unsaturations based on the total unsaturated olefin chain ends. Alternatively it is desirable that the first polymerization step produces a polymer having at least 50%, such as at least 60%, for example at least 70%, even at least 80% of vinyl terminal unsaturation based on the total unsaturated olefin chain ends. Unsaturated chain ends (and percents thereof) are determined using proton NMR (collection at 120° C., 400 MHz) as described in U.S. Ser. No. 12/143,663, filed Jun. 20, 2008, particularly the procedure described on page 33 line 25 to page 34, line 11.

The in-reactor blends described herein are blended with at least one ethylene containing polymer to prepare the compositions of this invention. The in-reactor polymer blend comprises: (a) a first ethylene containing polymer having a density of greater than 0.90 g/cm$^3$ and an $M_w$ of more than 20,000 g/mol; and (b) a second ethylene containing polymer having a density of less than 0.90 g/cm$^3$, wherein the polymer blend has a $T_m$ of at least 90° C. (DSC second melt), a density of less than 0.92 g/cm$^3$, and the densities of the first and second polymer differ by at least 1% (preferably be at least 2%, preferably by at least 3%, preferably by at least 5%). Alternately the densities differ by at least 0.01 g/cm$^3$, preferably by at least 0.02 g/cm$^3$, preferably by at least 0.03 g/cm$^3$, preferably by at least 0.035 g/cm$^3$.

The in-reactor polymer blend comprises: (a) a first ethylene polymer comprising 90 wt % to 100 wt % ethylene (preferably 95 wt % to 100 wt %) and from 0 wt % to less than 10 wt % comonomer (preferably 0 wt % to 5 wt %), said first ethylene polymer component having density of greater than 0.920 g/cm$^3$, an $M_w$ of 20,000 g/mol or more and optionally a $T_m$ of 110° C. or more; and (b) a second ethylene polymer comprising from 70 wt % to 90 wt % ethylene and 30 wt % to 10 wt % comonomer, said second ethylene polymer having a density of 0.910 g/cm$^3$ or less, wherein the in-reactor polymer blend has one or more of the following characteristics:

(a) at least 78 wt % ethylene;
(b) a $T_m$ of at least 100° C. over a density ranging from 0.84 to 0.92 g/cm$^3$;
(c) an elongation at break of 300% or more;
(d) a strain hardening ratio, M300/M100, of at least 1.2, preferably of at least 1.3;
(e) a ratio of complex viscosity at 0.01 rad/s to the complex viscosity at 100 rad/s of at least 30; and
(f) a shear thinning index of less than −0.2.

In one aspect, the in-reactor polymer blends have high melting temperature over a wide range of density from 0.84 to 0.92 g/cm$^3$. The melting temperature of traditional random copolymers of ethylene/alpha-olefins decreases with decreasing densities. In contrast, the in-reactor polymer blends exhibit melting points substantially independent of the density, particularly when density is between about 0.84 to about 0.92 g/cm$^3$. For example, the melting points of such polymer blends are in the range of about 100° C. to about 130°

C. when density ranges from 0.84 to about 0.92 g/cm³. In some embodiments, the melting points of polymer blends are in the range of about 100° C. to about 125° C. when density ranges from 0.84 to about 0.92 g/cm³.

The in-reactor polymer blend described herein has a unique combination of strong shear thinning and strong mechanical properties, such as elongation and tensile strength and comprises an ethylene-containing first polymer; an ethylene-containing second polymer different in density from the first polymer by at least 0.03 g/cm³, typically at least 0.035 g/cm³; and a branched block copolymer having a backbone comprising the second polymer and branches comprising the first polymer. Preferably, the higher density material is employed as the first polymer and hence as the side branches of the branched block copolymer.

Branched block structures can be observed by Small Amplitude Oscillatory Shear (SAOS) testing of the molten polymer performed on a dynamic (oscillatory) rheometer. From the data generated by such a test it is possible to determine the phase or loss angle δ, which is the inverse tangent of the ratio of G" (the loss modulus) to G' (the storage modulus). For a typical linear polymer, the loss angle at low frequencies (or long times) approaches 90°, because the chains can relax in the melt, adsorbing energy, and making the loss modulus much larger than the storage modulus. As frequencies increase, more of the chains relax too slowly to absorb energy during the oscillations, and the storage modulus grows relative to the loss modulus. Eventually, the storage and loss moduli become equal and the loss angle reaches 45°. In contrast, a branched chain polymer relaxes very slowly, because the branches need to retract before the chain backbone can relax along its tube in the melt. This polymer never reaches a state where all its chains can relax during an oscillation, and the loss angle never reaches 90° even at the lowest frequency, ω, of the experiments. The loss angle is also relatively independent of the frequency of the oscillations in the SAOS experiment; another indication that the chains cannot relax on these timescales.

In a plot of the loss or phase angle δ versus the measurement frequency, ω, polymers that have long chain branches exhibit a plateau in the function of δ(ω), whereas linear polymers do not have such a plateau. According to Garcia-Franco et al. (Macromolecules 2001, 34, No. 10, pp. 3115-3117), the plateau in the aforementioned plot will shift to lower phase angles δ when the amount of long chain branching occurring in the polymer sample increases. Dividing the phase angle at which the plateau occurs by a phase angle of 90°, one obtains the critical relaxation exponent n which can then be used to calculate a gel stiffness using the equation:

$$\eta^*(\omega) = S\Gamma(1-n)\omega^{n-1}$$

wherein η* represents the complex viscosity (Pa·s); ω represents the frequency; S is the gel stiffness; Γ is the gamma function (see Beyer, W. H. Ed., CRC Handbook of Mathematical Sciences 5th Ed., CRC Press, Boca Raton, 1978); and n is the critical relaxation exponent. Polymers produced herein preferably have a gel stiffness of more than 150 Pa·s, preferably at least 300 Pa·s and more preferably at least 500 Pa·s. The gel stiffness is determined at the test temperature of 190° C. A preferred critical relaxation exponent n for the in-reactor blends used herein is less than 1 and more than 0, generally, n will be between 0.1 and 0.92, preferably between 0.2 and 0.85.

The Small amplitude oscillatory shear (SAOS) data can be transformed into discrete relaxation spectra using the procedure on pages 273-275 in R. B. Bird, R. C. Armstrong, and O. Hassager, *Dynamics of Polymeric Liquids, Volume 1, Fluid Mechanics, 2nd Edition*, John Wiley and Sons, (1987). The storage and loss moduli are simultaneously least squares fit with the functions $$G'(\omega_j) = \Sigma \eta_k \lambda_k \omega_j^2 / (1 + (\eta_k \omega_k)^2)$$

$$G''(\omega_j) = \Sigma \eta_k \lambda_k \omega_j / (1 + (\eta_k \omega_k)^2)$$

at the relaxation times $\lambda_k$=0.01, 0.1, 1, 10, and 100 seconds. Therefore, the sums are from k=1 to k=5. The sum of the $\eta_k$'s is equal to the zero shear viscosity, $\eta_0$. An indication of high levels of branched block products is a high value of $\eta_5$, corresponding to the relaxation time of 100 s, relative to the zero shear viscosity. The viscosity fraction of the 100 s relaxation time is $\eta_5$ divided by the zero shear viscosity, $\eta_0$. For the in-reactor polymer blends useful in this invention the viscosity fraction of the 100 second relaxation time is preferably at least 0.1, more preferably 0.4, and most preferably 0.8. In contrast, viscosity fractions of 100 second chains of conventional isotactic polypropylene are of the order of 0.10 or less and of conventional propylene/ethylene copolymers are of the order of 0.10 or less. Chains with long relaxation times cannot relax during the cycle time of the SAOS experiment and lead to high zero shear viscosities.

The in-reactor polymer blends used in this invention have good shear thinning. Shear thinning is characterized by the decrease of complex viscosity with increasing shear rate. One way to quantify the shear thinning is to use a ratio of complex viscosity at a frequency of 0.01 rad/s to the complex viscosity at a frequency of 100 rad/s. Preferably, the complex viscosity ratio of the invented polymer blend is 30 or more, more preferably 50 or more, even more preferably 100 or more when the complex viscosity is measured at 190° C.

Shear thinning can be also characterized using a shear thinning index. The term "shear thinning index" is determined using plots of the logarithm (base ten) of the dynamic viscosity versus logarithm (base ten) of the frequency. The slope is the difference in the log (dynamic viscosity) at a frequency of 100 rad/s and the log(dynamic viscosity) at a frequency of 0.01 rad/s divided by 4. These plots are the typical output of the SAOS experiments. For ethylene/propylene copolymers, a conventional SAOS test temperature is 190° C. Polymer viscosity is conveniently measured in poise (dyne-second/square centimeter) or Pa·s (1 Pa·s=10 poises) at shear rates within a range of from 0 to 100 rad/sec and at 190° C. under a nitrogen atmosphere using a dynamic mechanical spectrometer, such as the Advanced Rheometrics Expansion System (ARES). Generally a low value of shear thinning index indicates a polymer is highly shear-thinning and that it is readily processable in high shear processes, for example by injection molding. The more negative this slope, the faster the dynamic viscosity decreases as the frequency increases. Preferably, the in-reactor polymer blend has a shear thinning index of less than −0.2. These types of polymer blends are easily processed in high shear rate fabrication methods, such as injection molding.

Useful in-reactor polymer blends described herein have tensile strength greater than 15 MPa (as measured by ASTM D638 at 23° C.), preferably greater than 20 MPa, preferably greater than 30 MPa.

Useful in-reactor polymer blends described herein have elongation at break greater than 300% (as measured by ASTM D638 at 23° C.), preferably greater than 400%, preferably greater than 500%, preferably greater than 600%, preferably greater than 700%, preferably greater than 800%, preferably greater than 900%.

Useful in-reactor polymer blends described herein have tensile strength at 100% elongation greater than 8 MPa (as measured by ASTM D638 at 23° C.), preferably greater than 10 MPa, preferably greater than 12 MPa.

In some embodiments, the in-reactor polymer blends have a tensile strength above 8 MPa, preferably a tensile strength above 10 MPa, and/or an elongation at break of at least 600%, preferably at least 700%, preferably at least 800%, and preferably at least 900%.

Useful in-reactor polymer blends described herein also show strain hardening in tensile measurements. After the yield point, the blend undergoes a period of strain hardening, in which the stress increases again with increasing strain up to the ultimate strength in a stress-strain curve as measured according to ASTM D638. Strain hardening is measured by a ratio of a stress at 300% of strain (M300) to the stress at 100% of strain (M100). The ratio of M300/M100 greater than 1 indicates strain hardening. The degree of strain hardening can also be measured using a ratio of M100 to a stress at 500% or 800% of strain. M500/M100 is defined as a ratio of the stress at 500% strain to the stress at 100% strain. Likewise, M800/M100 is defined as a ratio of the stress at 800% strain to the stress at 100% strain.

Preferred in-reactor polymer blends useful herein have a M300/M100 strain hardening ratio greater than 1.2, preferably greater than 1.3, preferably greater than 1.4, preferably greater than 1.5, preferably greater than 1.6; and/or a M500/M100 strain hardening ratio greater than 1, preferably greater than 1.03, preferably greater than 1.05; and/or a M800/M100 strain hardening ratio greater than 1, preferably greater than 1.1, preferably greater than 1.2. Alternatively, the in-reactor polymer blends described herein have a strain hardening ratio Mx/M100 greater than 1.2, where Mx is the tensile strength at break.

Useful in-reactor polymer blends described herein also have a toughness (as measured by ASTM D638) of 40 MJ/m$^3$ or more, preferably 50 MJ/m$^3$ or more, preferably 60 MJ/m$^3$ or more. Toughness is defined as the ability of polymer to absorb applied energy up to break. The area under the stress-strain curve (ASTM D638 at 23° C.) is used as a measure of the toughness at room temperature.

The branched block composition in the present in-reactor polymer blend can comprise a wide variety of structural compositions enabling the tensile properties to be tuned over a wide range. While not wishing to be bounded by any theory, it is believed that in addition to the branched block structural composition, the crystalline polymers form hard inclusions (or crystallites) within a soft matrix so that physical crosslinks are formed in the polymer blend. The presence of physical crosslink promotes tensile properties. To be effective, the high crystalline hard inclusions are multi-blocks with low crystalline or amorphous chain segments. The low crystalline or amorphous chain segments should be long enough to span the distance between two hard inclusions or entangled with other chain segments from other hard inclusions.

In one embodiment, the components on the side branches and backbone as well as individual components in the in-reactor blend are immiscible so that the blend has a heterogeneous morphology. One advantageous heterogeneous blend comprises the lower crystallinity polymer component in dispersed phase and the higher crystallinity polymer in the continuous phase. For some applications, the blends have a wide range in morphology as the components of greater and lesser crystallinity can also be co-continuous. Alternatively, the in-reactor blend can have a heterogeneous morphology with the higher crystalline component in a dispersed phase and the lesser crystalline component in a continuous phase. In any event, the sizes of the individual domains of the dispersed phase are very small with the smallest length dimension for the dispersed phase typically being less than 5 µm, such as less than 2 µm, even less than 1 µm without any compatibilizer added. While not wishing to be restrained by any theory, we believe that the reason for the small domain size is the presence of branched block structures which has the attributes of both the first polymer and the second polymer component. In particular, we believe that such a molecule containing segments of each of the polymeric components acts like compatibilizer in the in-reactor blend. The presence of branched block composition enables immiscible components in the blend to be compatible to the extent that no compatibilizer is needed in order to attain and retain this fine morphology. Presence of fine particles of the dispersed phase generally allows dispersion of higher amounts of the dispersed phase in a polymer matrix, stabilizes the obtained morphology by preventing coalescence of the dispersed particles, and enhances mechanical properties of the blend. This also allows the production of softer in-reactor polymer blends.

For purposes of this invention and the claims thereto, a "heterogeneous blend" is a composition having two or more morphological phases in the same state. For example a blend of two polymers where one polymer forms discrete packets (or finely divided phase domains) dispersed in a matrix of another polymer is said to be heterogeneous in the solid state. Also a heterogeneous blend is defined to include co-continuous blends where the blend components are separately visible, but it is unclear which is the continuous phase and which is the discontinuous phase. Such morphology is determined using atomic force microscopy (AFM). By continuous phase is meant the matrix phase in a heterogeneous blend. By discontinuous phase is meant the dispersed phase in a heterogeneous blend. The finely divided phase domains of the discontinuous phase are also referred as particles. In contrast, a "homogeneous blend" is a composition having substantially one morphological phase in the same state. For example, a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature, e.g., the $T_g$ would exist as a single, sharp transition temperature on a dynamic mechanical thermal analyzer (DMTA) trace of tan δ (i.e., the ratio of the loss modulus to the storage modulus) versus temperature. By contrast, two (or more) separate transition temperatures would be observed for an immiscible blend, typically corresponding to the temperatures for each of the individual components of the blend. Thus, a polymer blend is miscible when there is one $T_g$ indicated on the DMTA trace. A miscible blend is homogeneous, while an immiscible blend is heterogeneous.

Alternatively, the components on the side branches and backbone as well as individual components in the in-reactor blend are miscible. The in-reactor produced polymer blend then has homogeneous morphology. When all the individual components are capable of crystallizing to a limited extent, they are at least partially co-crystallized.

In one practical embodiment, the present in-reactor polymer blend includes a branched block copolymer in which the branches are comprised of an ethylene homopolymer and the backbone is comprised of an ethylene copolymer with at least one monomer selected from $C_3$ to $C_{12}$ alpha olefin. In another embodiment, both the backbone and branches in the branched block polymer are comprised of ethylene copolymers, wherein the difference in density between the copolymers in backbone and branches is at least 1%, such as at least 2%, for example at least of 3%.

The in-reactor polymer blends have a density in a range of from 0.840 g/cm³ to 0.940 g/cm³ in one embodiment, from 0.850 g/cm³ to 0.93 g/cm³ in a more particular embodiment, from 0.850 g/cm³ to 0.920 g/cm³ in yet a more particular embodiment, from 0.860 g/cm³ to 0.930 g/cm³ in yet a more particular embodiment, from 0.870 g/cm³ to 0.92 g/cm³ in yet a more particular embodiment, less than 0.925 g/cm³ in yet a more particular embodiment, less than 0.920 g/cm³ in yet a more particular embodiment, and less than 0.900 g/cm³ in yet a more particular embodiment.

The in-reactor polymer blends preferably have a bulk density of from 0.400 to 0.900 g/cm³ in one embodiment, and from 0.420 to 0.800 g/cm³ in another embodiment, and from 0.430 to 0.500 g/cm³ in yet another embodiment, and from 0.440 to 0.60 g/cm³ in yet another embodiment, wherein a desirable range may comprise any upper bulk density limit with any lower bulk density limit described herein.

Preferably, the in-reactor polymers blend has an MI (I2, as measured by ASTM D1238, 190° C./2.16 kg) in the range of from 0.01 dg/min to 100 dg/min in one embodiment, from 0.01 dg/min to 50 dg/min in a more particular embodiment, from 0.02 dg/min to 20 dg/min in yet a more particular embodiment, and from 0.03 dg/min to 2 dg/min in yet a more particular embodiment, and from 0.002 dg/min to 1 dg/min in yet a more particular embodiment.

Preferably, the polymers blend has an HLMI (I21, as measured by ASTM D1238, 190° C./21.6 kg) value that ranges from 0.01 to 800 dg/min in one embodiment, and from 0.1 to 500 dg/min in another embodiment, and from 0.5 to 300 dg/min in yet a more particular embodiment, and from 1 to 100 dg/min in yet a more particular embodiment wherein a desirable range is any combination of any upper I21 limit with any lower I21 limit.

Preferably, the in-reactor polymer blends have a melt index ratio (MIR or I21/I2) of from 10 to 500 in one embodiment, from 15 to 300 in a more particular embodiment, and from 20 to 200 in yet a more particular embodiment. Alternately, the polymer blends have a melt index ratio of greater than 15 in one embodiment, greater than 20 in a more particular embodiment, greater than 30 in yet a more particular embodiment, greater than 40 in yet a more particular embodiment, and greater than 50 in yet a more particular embodiment.

First Ethylene Polymer (High Density Ethylene Polymer) in the In-Reactor Polymer Blend In a preferred embodiment, the first ethylene polymer of the in-reactor blend is an ethylene polymer comprising 90 wt % to 100 wt % ethylene (preferably from 95 wt % to 100 wt % ethylene, preferably from 98 wt % to 100 wt % ethylene, preferably 100 wt % ethylene) and from 0 wt % to less than 10 wt % comonomer (preferably 0 wt % to 5 wt %, preferably 0 wt % to 2 wt %, preferably 0 wt %), said first ethylene polymer having density of greater than 0.920 g/cm³ (preferably greater than 0.930 g/cm³, preferably between 0.920 g/cm³ and 0.96 g/cm³) and optionally a $T_m$ of 100° C. or more (preferably from 90° C. to 130° C., preferably from 100° C. to 130° C.).

In a preferred embodiment, the first ethylene polymer is an ethylene homopolymer, such as high density polyethylene.

In another embodiment the first ethylene polymer has:
1) a molecular weight distribution ($M_w/M_n$) of up to 40 (preferably ranging from 1.5 to 20, and from 1.8 to 10 in another embodiment, and from 1.9 to 5 in yet another embodiment, and from 2.0 to 4 in yet another embodiment); and/or
2) a weight average molecular weight ($M_w$) of 20,000 g/mol or more, preferably 30,000 g/mole or more, preferably 50,000 g/mol or more, preferably 100,000 g/mol or more, preferably 200,000 g/mol or more, preferably 300,000 g/mol or more; and/or
3) a melt index (MI) of 0.1 to 800 dg/min (alternately 1 to 100 dg/min, as measured according to ASTM D1238 (190° C., 2.16 kg)); and/or
4) a density of 0.920 g/cm³ or more, preferably 0.925 g/cm³ or more, preferably of 0.930 g/cm³ or more, preferably of 0.935 g/cm³ or more.

The first polymers are macromonomers with reactive chain ends. Preferably, the polymers have at least 50%, such as at least 60%, for example at least 70%, even at least 80% of vinyl terminal unsaturation based on the total unsaturated olefin chain ends.

Second Ethylene Polymer (Ethylene Plastomer) in the In-Reactor Polymer Blend

In a particularly desirable embodiment, the second ethylene polymer of the in-reactor blend is an ethylene copolymer having a density of 0.910 g/cm³ or less, as determined by ASTM D1505 (preferably from above 0.84 g/cm³ to less than 0.910 g/cm³), and a melt index (MI) of 200 dg/min or less, as determined by ASTM D1238 (190° C., 2.16 kg). In one embodiment, the second ethylene polymer is a copolymer of ethylene and at least one $C_3$ to $C_{12}$ α-olefin, preferably at least one $C_4$ to $C_8$ α-olefin (preferably at least one of propylene, butene, hexene, octene, and decene). The amount of $C_3$ to $C_{12}$ α-olefin present in the ethylene copolymer ranges from 2 wt % to 45 wt % in one embodiment, and from 10 wt % to 30 wt % in another embodiment, and from 15 wt % to 25 wt % in yet another embodiment, and from 20 wt % to 30 wt % in yet another embodiment.

Preferred second ethylene polymers (also referred to as "plastomers") useful in the invention typically have a melt index of 200 dg/min or less, alternately 100 dg/min or less in one embodiment, and from 0.2 to 50 dg/min in another embodiment, and from 0.5 to 30 dg/min in yet another embodiment. The weight average molecular weight of preferred plastomers ranges from 10,000 to 800,000 g/mole in one embodiment, and from 20,000 to 700,000 g/mole in another embodiment. The 1% secant flexural modulus (ASTM D790) of preferred plastomers ranges from 5 MPa to 100 MPa in one embodiment, and from 10 MPa to 50 MPa in another embodiment. Further, preferred plastomers that are useful in compositions of the present invention have a melting temperature ($T_m$, first melt peak) of from 0° C. to 100° C. in one embodiment, and from 10° C. to 80° C. in another embodiment. The degree of crystallinity of preferred plastomers is between 3% and 30%.

Particularly preferred polymers useful in the present invention are synthesized using a single-site catalyst, such as a metallocene catalyst, and comprise copolymers of ethylene and higher α-olefins such as propylene, 1-butene, 1-hexene and 1-octene, and which contain enough of one or more of these comonomer units to yield a density between 0.86 g/cm³ and 0.91 g/cm³ in one embodiment. The molecular weight distribution ($M_w/M_n$) of desirable plastomers ranges from 1.5 to 5 in one embodiment and from 2.0 to 4 in another embodiment.

Preferably, the difference in the peak melting temperatures between the first high crystalline polymer and the second low crystalline polymer is 20° C. or more, for example 30° C. or more, for example 40° C. or more.

The ratio of the first polymer component to the second polymer component in the reactor blend depends on the requirements of the end-use applications. The thermal properties of the final in-reactor polymer blend depend on the properties of each component and the ratio of each component in the blend. Generally, the in-reactor blend has a crystallinity of 80% or less, typically 70% or less, as calculated using heat of fusion obtained from DSC analysis. A sum of the heat of fusion from all melting peaks is used when multiple melting peaks are present. The heat of fusion for 100% crystallinity is selected from the homopolymer of the primary composition in the in-reactor polymer blend. For example, when the polymer blend is made of an ethylene homopolymer and ethylene/hexene copolymer, ethylene is the primary composition, and the heat of fusion of 100% crystalline polyethylene is used (e.g., 290 J/g). In one embodiment, the in-reactor produced polymer blend has a heat of fusion between about 10 and about 270 J/g, for example between about 30 and about 200 J/g, such as between about 40 and about 200 J/g.

Conveniently, the in-reactor polymer blend typically has a melting temperature of 100° C. or more, and generally 110° C. or more, such as 115° C. or more, for example 120° C. or more. The term "melting point," as used herein, for the in-reactor polymer blend, is the highest temperature peak among principal and secondary melting peaks as determined by DSC. In one embodiment of the present invention, the polymer has a single melting peak. Typically, a sample of in-reactor polymer blend will show secondary melting peaks adjacent to the principal peak, which peaks are considered together as a single melting peak. The highest of these peaks is considered the melting point. The in-reactor polymer blend preferably has a melting point by DSC ranging from an upper limit of 130° C., 120° C., 110° C., 100° C., or 90° C., to a lower limit of 20° C., 30° C., 40° C., or 50° C.

Typically, the in-reactor blend has crystallization temperature of 130° C. or less. The term "peak crystallization temperature" or "crystallization temperature" as used herein, for the in-reactor polymer blend, is the highest temperature peak among principal and secondary crystallization peaks as determined by DSC. In one embodiment of the present invention, the polymer has a single crystallization peak. When the crystallinity of the first and the second polymer components in the in-reactor blend is close, the polymer blend will show secondary crystallization peaks adjacent to the principal peak, which peaks are considered together as a single crystallization peak. The highest of these peaks is considered the peak crystallization temperature. When the crystallinity of the first and the second polymer components in the in-reactor blend is far apart, the polymer blend will show two individual peaks for each component. The in-reactor polymer blend preferably has a crystallization temperature by DSC ranging from an upper limit of 120° C., 100° C., 90° C., 70° C., or 40° C., to a lower limit of 0° C., 10° C., 30° C., 40° C., or 70° C.

The melting temperatures of the in-reactor polymer blend produced directly reflect the degree of crystallinity of the crystalline polymer component in the blend. The polymer blend can have a high melting temperature in a wide range of densities. In one embodiment, the polymer produced has a melting temperature of 100° C. or higher and a density of 0.920 g/cm$^3$ or less, preferably 110° C. or higher and a density of 0.900 g/cm$^3$ or less, more preferably 115° C. or higher and a density of 0.880 g/cm$^3$ or less. Lower value of density means softer materials. Alternatively, the in-reactor polymer blends have shore hardness from 30 A to 40 D and a melting temperature of 110° C. or higher.

Conveniently, the in-reactor blend has a weight average molecular weight of between 20,000 and 2,000,000 g/mol, such as between 30,000 and 1,500,000 g/mol with a polydispersity index (PDI=$M_w/M_n$) in the range of 1.5 to 40. The polydispersity index is partially dependent on the catalysts and process condition employed in the polymerization process. For example, polymerization involving multiple catalysts may produce a copolymer with broader or multimodal molecular weight distribution. Multiple reactors with different polymerization conditions may produce polymer blend with multimodal molecular weight distributions. In one embodiment the polymer blend produced may have a unimodal, bimodal, or multimodal molecular weight distribution. By bimodal or multimodal is meant that the SEC trace has more than one peak or inflection points. An inflection point is that point where the second derivative of the curve changes in sign (e.g., from negative to positive or vice versa).

The molecular weight of each component in the in-reactor polymer blend can be optimized for a specific application. Generally, the molecular weight of the crystalline component should be greater than the entanglement molecular length, while the molecular weight of the less crystalline or amorphous component should be long enough so the crystalline component can bind the polymer segments together into a physical network in the solid state. When the molecular weight of the first polymer is low, the second polymer should have higher molecular weight to attain good mechanical strength.

Preferred in-reactor polymer blends have a lower molecular weight/higher density polyethylene component and a higher molecular weight/lower density component.

The amount of the first polymer relative to the second polymer component may vary widely depending on the nature of the component polymers and intended end use of the polymer blend. In particular, however, one advantage of the present process is the ability to be able to produce a polymer blend in which the lower crystalline propylene copolymer comprises more than 20%, such as more than 50%, for example more than 70% of the total in-reactor polymer blend.

A polymer blend can be separated into fractions by solvent extraction (also referred as fractionation). A typical solvent is a saturated hydrocarbon, such as hexane, cyclohexane, heptane, or xylene. The extraction temperature can range from room temperature to the boiling point of the solvent. Polymers are easier to dissolve if they are pressed into a thin film and then cut into small pieces. They can also be milled into granules or powder prior to dissolving. For polymer blends containing homopolyethylene, the polyethylene component can be separated using cyclohexane refluxing for 24 hours. The insoluble fraction comprises polyethylene and part of the branched block products. For in-reactor blends containing low crystallinity plastomeric or elastomeric component, the low crystallinity component can be isolated by contacting the blend with cyclohexane at 25° C. for 48 hours. The soluble fraction comprises the low crystallinity plastomeric or elastomeric component. Alternatively, a differential solvent fractionation of the in-reactor polymer blend with several solvents of progressively increasing solubility and boiling point can provide several fractions. Nominally, about 10 grams of the in-reactor blend is contacted with about 500 ml of cyclohexane in a thick-walled glass bottle with a screw cap closure. The sealed bottle is maintained at 25° C. for 48 hours. At the end of this period, the solution is decanted/filtered and evaporated to yield a residue of the polymer soluble to cyclohexane at 25° C. To the insoluble residue is added sufficient cyclohexane to bring the volume to about 500 ml and the bottle is then maintained at 30° C. for 48 hours. The soluble polymer is decanted/filtered and evaporated to yield a residue of the polymer soluble to cyclohexane at 30° C. In this manner, fractions of the in-reactor blends soluble at a temperature from 40° C. to 60° C. are obtained at temperature increases of approximately 5° C. between stages. Increases in temperature to over 100° C. can be accommodated if xylene, instead of cyclohexane, is used as the solvent. The temperature and temperature interval can be varied according to the distribution of the in-reactor blends.

Conveniently, the in-reactor blend has a cyclohexane refluxing insoluble fraction of 70 wt % or less, preferably 60 wt % or less. Alternatively, the in-reactor blend has a cyclohexane room temperature soluble fraction of 20 wt % or more, preferably 30 wt % or more, more preferably 40 wt % or more.

In one embodiment, the present in-reactor polymer blend has a fraction which elutes between 50° C. to 100° C. and a soluble fraction which elutes below 5° C. when fractionated using Temperature Rising Elution Fractionation (TREF) using the procedure described in the Experimental Section. The fraction corresponding to the highest temperature peak is referred to as the high-crystalline fraction. The soluble fraction is therefore referred to as the amorphous elastomeric component. Depending on the crystallinity of the first and second polymers as well as the branched block composition, the peak temperature may be shifted or there may be additional peaks. Alternatively, a fraction elutes at temperature between 0° C. and 70° C. when a semi-crystalline ethylene copolymer such as plastomer is present in the blend.

In conducting the $^{13}$C NMR investigations, samples are prepared by adding about 0.3 g sample to approximately 3 g of tetrachloroethane-d2 in a 10 mm NMR tube. The samples are dissolved and homogenized by heating the tube and its contents to 150° C. The data are collected using a Varian spectrometer, with corresponding $^1$H frequencies of either 400 or 700 MHz. The data are acquired using nominally 4000 transients per data file with a about a 10 second pulse repetition delay. To achieve maximum signal-to-noise for quantitative analysis, multiple data files may be added together. The spectral width was adjusted to include all the NMR resonances of interest and FIDs were collected containing a minimum of 32K data points. The samples are analyzed at 120° C. in a 10 mm broad band probe. Assignments of peaks for ethylene/propylene, ethylene/butene, ethylene/hexene, and ethylene/octene copolymers have been reviewed by James C. Randall in *Polymer Reviews*, 29 (2), pp. 201-317, (1989). Assignments for ethylene-hexene copolymers were taken from M. R. Seger and G. E. Maciel, *Anal. Chem.* 2004, 76, pp. 5734-5747.

Although the branch points for long chain branched polymers can be seen in $^{13}$C NMR for some compositions, they are difficult to measure in the spectra of ethylene/hexene copolymers (or ethylene copolymers with comonomers larger than $C_6$). The short chain branch points associated with the hexene (or larger) comonomers occur at similar chemical shifts to the chemical shifts of long chain branch points, making them impossible to integrate.

For in-reactor polymer blends with low content of branched block composition, the blends should be first fractionated into components. Signals for the branched block components are found in the same fractions as the high crystallinity polyethylene components since majority of the cross products between polymers with different crystallinities will remain in the higher crystallinity fraction of the in-reactor blend.

In a preferred embodiment, the in-reactor blends of this invention comprise: (i) a first ethylene polymer comprising 90 wt % to 100 wt % (preferably 92 wt % to 99 wt %, preferably 95 wt % to 97 wt %) ethylene and from 0 wt % to less than 10 wt % (preferably 1 wt % to 8 wt %, preferably 3 wt % to 5 wt %) comonomer (preferably propylene, butene, hexene, or octene), said first ethylene component having a melting point of 90° C. or more (preferably 100° C. or more, preferably 110° C. or more); and (ii) a second ethylene polymer comprising from 30 wt % to 90 wt % (preferably 35 wt % to 85 wt %, preferably 40 wt % to 80 wt %) ethylene and 70 wt % to 10 wt % (preferably 65 wt % to 15 wt %, preferably 60 wt % to 20 wt %) comonomer (preferably propylene, butene, hexene, or octene), said second ethylene polymer having an $M_w$ of 20,000 g/mol or more, preferably 30,000 g/mol or more, preferably 50,000 g/mol or more and a melting point of 100° C. or less, preferably from 10° C. to 100° C., preferably from 20° C. to 85° C.

In another embodiment, the in-reactor polymer blends produced herein have a heat distortion temperature of 60° C. or more measured at 1.8 MPa according to ASTM D648.

Another unique feature of the in-reactor blend material is a broad application temperature range. In one embodiment, the application temperature is between −40° C. to 160° C., preferably from −30° C. to 130° C., more preferably from −20° C. to 120° C. The in-reactor blend comprises the high density ethylene copolymer component which has a melting point of greater than 90° C. and low density ethylene copolymer component which has a glass transition temperature as low as −70° C. The branched block cross products possess the characteristics derived from both the high and low density ethylene copolymer such as low glass transition temperature from low density component (−70° C. or less) and high melting temperature from long sequences of methylenes (polyethylene type crystallinity) (90° C. or more). Consequently, it has a much broader use temperature over a wide range of density.

Process for Producing the In-Reactor Polymer Blend

The in-reactor polymer blends described herein can be produced using any appropriate polymerization techniques known in the art. Polymerization methods include high pressure, slurry, gas, bulk, suspension, supercritical, or solution phase, or a combination thereof, using a single-site metallocene catalyst system. The catalysts can be in the form of a homogeneous solution, supported, or a combination thereof. Polymerization may be carried out by a continuous, a semi-continuous or batch process and may include use of chain transfer agents, scavengers, or other such additives as deemed applicable.

The in-reactor polymer blends can be produced in a single reaction zone with at least two catalysts. At least one of the catalysts is capable of producing high crystalline polyethylene having a density of 0.92 g/cm$^3$ or more, and another catalyst is capable of producing low crystallinity polymer having a density of 0.91 g/cm$^3$ or less in the same polymerization medium. The two catalysts can be fed into the reactor as homogeneous catalyst solution through separated feed lines or in premixed form. The two catalysts can be also supported on a separated support materials or supported on the same support material. Selections of the catalyst pair depend on, among many other factors, the catalyst activity as well as their capability of comonomer incorporation. Preferably, at least one catalyst is capable of producing polymer with reactive chain ends and at least one catalyst is capable of incorporate polymer with reactive chain end to form branched polymers. The catalyst ratio needs to be tuned to meet the product requirement for specific end-use applications. Preferred metallocenes are those selected from formulas (I), (II), (III), and (IVa) (described below) which when used with other catalysts, are capable of producing an polyethylene having a density of 0.92 g/cm$^3$ at commercially attractive temperatures of from about 50° C. to about 150° C. Preferably two or more metallocenes are selected which produce polymers having different molecular weights. This results in a broader molecular weight distribution.

The in-reactor polymer blend described herein can be produced by initially contacting ethylene in a first reaction zone with a polymerization catalyst capable of producing a polyethylene having a density of 0.920 g/cm$^3$ or more. At least part of the contents of the first reaction zone are then transferred into a separate second reaction zone together with one or more monomer selected from ethylene or $C_3$ to $C_{12}$ alpha-olefins and mixtures thereof so as to produce elastomer or plastomer in the presence of polyethylene produced in the first reaction zone.

In one embodiment, the second reaction zone employs the same catalyst system transferred from the first reaction zone, with no additional catalyst being supplied to the second reaction zone. Alternatively, an additional amount of the same catalyst system as used in the first reaction zone is fed into the second reaction. Generally between about 10% and about 90%, such as between about 20% and about 80%, for example between about 30% and about 70% of the total catalyst is supplied to the first reaction zone, with the remainder being supplied to the second reaction zone. The molar ratio of the catalyst supplied to the first reaction zone to the catalyst supplied to the second reaction zone depends on the end-use requirements of the in-reactor polymer blend.

In another embodiment, the catalyst system includes a first polymerization catalyst fed to the first reaction zone, and a second polymerization catalyst different from the first catalyst and capable of producing an elastomer or a plastomer having a density of 0.92 g/cm$^3$ or less fed to the second reaction zone. The molar ratio of the first polymerization catalyst to the second polymerization catalyst is generally from 5:95 to 95:5 depending on the application and other process variables. The resultant intimate mixing among the different components of the in-reactor produced polymer blend provides excellent interface bonding and enhanced mechanical properties.

In one embodiment, all the ethylene is fed into the first reaction zone. Alternatively, ethylene feed is split between the first and second reaction zones. Generally between about 30% and about 90%, such as between about 40% and about 80%, for example between about 50% and about 70%, such as between about 45% and about 55% of the total ethylene is supplied to the first reaction zone, with the remainder being supplied to the second reaction zone.

In another embodiment, the in-reactor polymer blend can be produced by contacting ethylene and one or more monomers selected from $C_3$ to $C_{12}$ alpha-olefins in a first reaction zone with a first polymerization catalyst capable of producing a polyethylene having a density of 0.92 g/cm$^3$ or more, and then supplying at least part of the contents of the first reaction zone together with optionally additional ethylene or one or more of $C_3$ to $C_{12}$ alpha-olefins into a separate second reaction zone wherein an elastomer or a plastomer is produced in the presence of ethylene copolymer produced in the first reaction zone. The density of the ethylene copolymer produced in both the first and the second reaction zones is mainly controlled through monomer incorporation. The difference in density between the two copolymers is preferably more than 2%, even more preferably more than 3%. The second reaction zone can employ the same catalyst system carried over from the first reaction zone. Alternatively, additional catalyst can be fed into the second reaction zone. In another embodiment, a different catalyst can be used in the second polymerization zone. All of ethylene can be fed into the first reaction zone. Alternatively, additional ethylene can be supplied into the second reaction zone.

The in-reactor polymer blends can be also produced by contacting ethylene and one or more monomers selected from $C_3$ to $C_{12}$ alpha-olefins in a first reaction zone with a first polymerization catalyst capable of producing a polyethylene having a density of 0.91 g/cm$^3$ or less, and then supplying at least part of the contents of the first reaction zone together with optionally additional ethylene or one or more of $C_3$ to $C_{12}$ alpha-olefins into a separate second reaction zone wherein a higher density ethylene copolymer is produced in the presence of ethylene copolymer produced in the first reaction zone. The density of the ethylene copolymer produced in both the first and the second reaction zones is mainly controlled through monomer incorporation and catalyst structures. The same catalyst can be employed in both the first and the second reaction zone. Alternatively, the second catalyst is different from the first catalyst.

In one embodiment, the catalyst employed to produce the second polymer component is the same as, or is compatible with, the catalyst used to produce a thermoplastic first polymer component. In such a case, the first and second polymerization zones can be in a multiple-zone reactor, or separate, series-connected reactors, with the entire effluent from the first polymerization zone, including any active catalyst, being transferred to the second polymerization zone. Additional catalyst can then be added, as necessary to the second polymerization zone. In a particularly preferred embodiment, the present process is conducted in two or more series-connected, continuous flow, stirred tank or tubular reactors using metallocene catalysts.

As described above, the contents of the first reactor zone are transferred to the second reactor zone, and become a part of the reaction medium in the second reactor zone. The catalyst system employed in the first reactor zone is still active to continue the polymerization reaction in the second reactor zone. Alternatively, a part or all of the solvent and unreacted monomers are removed from the polymerization effluent in the first reactor zone, and the polymer, and remaining solvent and monomers are transferred into the second reactor zone. This can be implemented in a system with two reactors in series and a primary separator in between the two reactors. This process scheme also allows independent control of polymerization temperature in the first and second polymerization zones.

It is to be appreciated that, although the foregoing discussion refers only to first and second polymerization zones, further reaction zones could be employed, with the feed to the second reaction zone being split between the additional reaction zones. However, from an economic viewpoint, such additional reaction zones are not currently preferred.

In-reactor polymer blends that can be made using the described processes can have a variety of compositions, characteristics and properties. At least one of the advantages is that the process utilized can be tailored to form a polymer composition with a desired set of properties. Polymers with bimodal distributions of molecular weight and composition can be produced by the present polymerization process by, for example, controlling the polymerization conditions in the first and the second polymerization zones and/or by selecting the catalysts for the first and the second polymerizations, such as by using multiple catalysts in each polymerization zone. Bimodal distributions of molecular weight and composition of the second polymer can also be obtained when different catalysts are used in the first and second polymerization zones and the catalyst employed in the first polymerization zone is transferred into the second polymerization zone for production of the branched block polymers.

In certain embodiments, a lower molecular weight and higher density polyethylene component is produced from the first catalyst which is capable of producing polymer with a density of 0.92 g/cm³ or higher. A higher molecular weight and lower density polymer is produced from the second catalyst.

The amount of second polymer relative to the first polymer may vary widely depending on the nature of the polymers and the intended use of the final polymer blend. In particular, however, one advantage of the present process is the ability to be able to produce a polymer blend in which the second polymer comprises more than 50 wt %, such as more than 60 wt %, for example more than 70 wt % of the total polymer blend. For thermoplastic elastomer (TPE) applications, the weight ratio of the second polymer to the first polymer is generally from about 90:10 to about 50:50, such as from about 80:20 to about 60:40, for example from about 75:25 to about 65:35. For TPO or impact copolymer applications, the weight ratio of the second polymer to the first polymer is generally from about 49:51 to about 10:90, such as from 35:65 to about 15:85.

In an alternative embodiment, the first step of polymerization is replaced by the use of a pre-made polymer, at least part of which has reactive polymerizable chain ends. The pre-made polymer can be produced in a separate system or can be a commercially available product. The crystalline thermoplastic polymer can be dissolved in a solvent and then added into a reaction medium for the second polymerization step. The crystalline thermoplastic polymer can be also ground into fine powder and then added into the reaction medium for the second polymerization step.

Preferably, the polymerization is conducted in a continuous, stirred tank reactor. Tubular reactors equipped with the hardware to introduce feeds, catalysts and scavengers in staged manner can also be used. Generally, polymerization reactors are agitated (stirred) to reduce or avoid concentration gradients. Reaction environments include the case where the monomer(s) acts as diluent or solvent as well as the case where a liquid hydrocarbon is used as diluent or solvent. Preferred hydrocarbon liquids include both aliphatic and aromatic fluids, such as desulphurized light virgin naphtha and alkanes, such as propane, isobutane, mixed butanes, hexane, pentane, isopentane, isohexane, cyclohexane, isooctane, and octane. In an alternate embodiment a perfluorocarbon or hydrofluorocarbon is used as the solvent or diluent.

More preferably, the polymerization is conducted by a continuous solution process. Monomer concentration may be varied over a wide range in a solution process. For most catalysts, high monomer concentration implies high productivity and high molecular weight of polymer formed. Polymer solubility in the reaction medium varies with the composition of the polymerization medium. The polymerization temperature and/or pressure can be adjusted to ensure a homogeneous phase polymerization under high monomer conditions. It is also desirable to have a good balance between polymer concentration, viscosity of the polymerization medium and energy consumption. Generally, the monomer concentration is 5 wt % or more, such as 10 wt % or more, for example 15 wt % or more, even 20 wt % or more, or 30 wt % or more, based on the total weight of the polymerization medium including solvent, monomers and polymer produced.

The polymerization process conditions are generally selected to promote the production of reactive macromonomers in the first polymerization step and the incorporation of side branches into the backbone in the second polymerization step. The reactive macromonomers also need to be soluble in the reaction medium so that they can re-incorporate into growing chains when a solution process is employed. Adequate mixing is also important to ensure proper contact of the reactive macromonomers with the growing backbone molecules. Higher monomer conversion or low monomer concentration in the second polymerization zone is always preferred to boost the reactive macromonomer incorporation over monomer insertion. In one embodiment, the monomer conversion in the second polymerization zone is 50% or more, such as 70% or more. In another embodiment, the monomer concentration in the second polymerization zone is 5 mole/liter or less, such as 2 mole/liter or less, such as 1 mole/liter or less, for example 0.5 mole/liter or less.

Another method of enhancing branch block compositions is to add a chain transfer agent that transfers a vinyl group to the end of the polymer chain while deactivating the catalyst. Such chain transfer agents include, but are not limited to, vinyl chloride, vinyl fluoride, vinyl bromide. In the process, the catalyst is reactivated by the presence of an aluminum alkyl activator, such as an alumoxane (typically methylalumoxane).

Suitable conditions for polymerization in each reaction zone include a temperature from about 50° C. to about 250° C., such as from about 50° C. to about 150° C., for example from about 70° C. to about 150° C. and a pressure of 0.1 MPa or more, such as 2 MPa or more. The upper pressure limit is not critically constrained but is typically 200 MPa or less, such as 120 MPa or less, except when operating in supercritical phase then the pressure and temperature are above the critical point of the reaction media in question (typically over 95° C. and 4.6 MPa for propylene polymerizations). For more information on running supercritical polymerizations, see International Patent Publication No. WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers, or solvent), or combinations of all three. Adiabatic reactors with pre-chilled feeds may also be used.

Where the polymerization is conducted in at least two reaction zones, the temperature employed in the first reaction zone is preferably lower than the temperature employed in the second reaction zone, typically by at least 10° C., such as at least 20° C. In one embodiment, the temperature employed in the first reaction zone is between about 70° C. and about 180° C. and the temperature employed in the second reaction zone is between about 80° C. and about 200° C.

A polymer can be recovered from the effluent of either the first polymerization step or the second polymerization step by separating the polymer from other constituents of the effluent using conventional separation means. For example, polymer can be recovered from either effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone; triphenyl phosphate; heptylated diphenylamine; 2,2'-methylene-bis(4-methyl-6-tert-butyl)phenol; and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

Suitable catalysts are those capable of polymerizing a $C_2$ to $C_{20}$ olefin to produce an ethylene copolymer. These include both metallocene and Ziegler-Natta catalysts. The catalysts employed in the first reaction zone should be able to produce polymers with reactive unsaturated chain ends, preferably at least 50% of vinyl unsaturation based on the total unsaturated olefin chain ends, while the catalyst used in the second reaction zone should be capable of incorporating the polymerizable macromonomer into a growing chain to form branched block polymers. For polymerization in single reaction zone using mixed catalysts, at least one of the catalysts is able to produce polymers with reactive unsaturated chain ends, preferably at least 50% of vinyl unsaturation based on the total unsaturated olefin chain ends, while at least one of the catalysts is capable of incorporating the polymerizable macromonomer into a growing chain to form branched block polymers. The catalysts can be in the form of a homogeneous solution, supported, or a combination thereof. In case of two catalysts are employed in the same reaction zone, preferably, at least one of the catalyst is able to incorporate more comonomer (such as butene, hexene, or octene) than other catalysts so that the polymers produced will have different densities. A wide variety of transition metals compounds are known that, when activated with a suitable activator will have poor alpha-olefins incorporation and hence will produce higher density ethylene copolymers.

Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV., pp. 243-296 (1999) and in particular, for use in the synthesis of polyethylene in 1 METALLOCENE-BASED POLYOLEFINS, pp. 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components".

The Cp ligands are typically π-bonded and/or fused ring(s) or ring systems. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron, aluminum, and combinations thereof, wherein carbon makes up at least 50% of the ring members. Even more particularly, the Cp ligand(s) may be selected from the group consisting of substituted and unsubstituted cyclopentadienyl ligands and ligands isolobal to cyclopentadienyl, non-limiting examples of which include cyclopentadienyl, indenyl, fluorenyl, and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4Ind$"), substituted versions thereof, and heterocyclic versions thereof. In a particular embodiment, the metallocenes useful in the present invention may be selected from those including one or two (two, in a more particular embodiment), of the same or different Cp rings selected from the group consisting of cyclopentadienyl, indenyl, fluorenyl, tetrahydroindenyl, and substituted versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5, and 6 atoms in yet a more particular embodiment, and from Ti, Zr, Hf atoms in yet a more particular embodiment, and may be Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound to the metal atom "M" are such that the compounds described below in the formulas and structures are electrically neutral, unless otherwise indicated. The Cp ligand(s) form at least one chemical bond with the metal atom "M" to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (I): $Cp^A Cp^B MX_n$ wherein M is as described above; each X is chemically bonded to M; each Cp group is chemically bonded to M; and n is 0, 1, 2, 3, or 4, and either 1 or 2 in a particular embodiment. The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of the group consisting of cyclopentadienyl, indenyl, tetrahydroindenyl, fluorenyl, and substituted derivatives of each. Independently, each $Cp^A$ and $Cp^B$ of formula (I) may be unsubstituted or substituted with any one or combination of substituent groups R. Non-limiting examples of substituent groups R as used in formula (I) as well as ring substituents in formulas (Va-d) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formula (I) through (V) include methyl, ethyl, propyl, butyl, pentyl, hexyl, cyclopentyl, cyclohexyl, benzyl, phenyl, methylphenyl, tert-butylphenyl groups, and the like, including all their isomers, for example tertiary-butyl, isopropyl, and the like. Other possible radicals include substituted alkyls and aryls, such as, for example, fluoromethyl, fluoroethyl, difluoroethyl, iodopropyl, bromohexyl, chlorobenzyl, and hydrocarbyl substituted organometalloid radicals including trimethylsilyl, trimethylgermyl, methyldiethylsilyl, and the like; halocarbyl-substituted organometalloid radicals including tris(trifluoromethyl)silyl, methylbis (difluoromethyl)silyl, bromomethyldimethylgermyl, and the like; disubstituted boron radicals including dimethylboron, for example; and disubstituted Group 15 radicals including dimethylamine, dimethylphosphine, diphenylamine, methylphenylphosphine, Group 16 radicals including methoxy, ethoxy, propoxy, phenoxy, methylsulfide, and ethylsulfide. Other substituents R include olefins, such as, but not limited to, olefinically-unsaturated substituents including vinyl-terminated ligands, for example 3-butenyl, 2-propenyl, 5-hexenyl, and the like. In one embodiment, at least two R groups (two adjacent R groups in one embodiment) are joined to form a ring structure having from 3 to 30 atoms selected from the group consisting of carbon, nitrogen, oxygen, phosphorous, silicon, germanium, aluminum, boron, and combinations thereof. Also, a substituent group R group, such as 1-butanyl, may form a bonding association to the element M.

Non-limiting examples of X groups include alkyls, amines, phosphines, ethers, carboxylates, dienes, hydrocarbon radicals having from 1 to 20 carbon atoms; fluorinated hydrocarbon radicals (e.g., —$C_6F_5$ (pentafluorophenyl)), fluorinated alkylcarboxylates (e.g., $CF_3C(O)O$—), hydrides and halogen ions (such as chlorine or bromine) and combinations thereof. Other examples of X ligands include alkyl groups, such as cyclobutyl, cyclohexyl, methyl, heptyl, tolyl, trifluoromethyl, tetramethylene, pentamethylene, methylidene, methoxy, ethoxy, propoxy, phenoxy, bis(N-methylanilide), dimethylamide, dimethylphosphide radicals, and the like. In one embodiment, two or more X's form a part of a fused ring or ring system.

In another aspect of the invention, the metallocene catalyst component includes those of formula (I) where $Cp^A$ and $Cp^B$ are bridged to each other by at least one bridging group, (A), such that the structure is represented by formula (II): $Cp^A(A)Cp^BMX_n$. These bridged compounds represented by formula (II) are known as "bridged metallocenes". $Cp^A$, $Cp^B$, M, X, and n in formula (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as, but not limited to, at least one of a carbon, oxygen, nitrogen, silicon, aluminum, boron, germanium, tin atom, and combinations thereof; wherein the heteroatom also may be $C_1$ to $C_{12}$ alkyl or aryl substituted to satisfy neutral valency. The bridging group (A) also may contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, —$Si(R')_2Si(R'_2)$—, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl, and the corresponding moieties wherein the Si atom is replaced by a Ge or a C atom; dimethylsilyl, diethylsilyl, dimethylgermyl, and diethylgermyl.

In another embodiment, bridging group (A) also may be cyclic, comprising, for example 4 to 10 ring members (5 to 7 ring members in a more particular embodiment). The ring members may be selected from the elements mentioned above, from one or more of B, C, Si, Ge, N, and O in a particular embodiment. Non-limiting examples of ring structures which may be present as or part of the bridging moiety are cyclobutylidene, cyclopentylidene, cyclohexylidene, cycloheptylidene, cyclooctylidene, and the corresponding rings where one or two carbon atoms are replaced by at least one of Si, Ge, N, and O (in particular, Si and Ge). The bonding arrangement between the ring and the Cp groups may be either cis-, trans-, or a combination.

The cyclic bridging groups (A) may be saturated or unsaturated and/or may carry one or more substituents and/or may be fused to one or more other ring structures. If present, the one or more substituents are selected from the group consisting of hydrocarbyl (e.g., alkyl, such as methyl) and halogen (e.g., F, Cl) in one embodiment. The one or more Cp groups to which the above cyclic bridging moieties may optionally be fused may be saturated or unsaturated, and may be selected from the group consisting of those having 4 to 10 (more particularly 5, 6, or 7) ring members (selected from the group consisting of C, N, O, and S in a particular embodiment) such as, for example, cyclopentyl, cyclohexyl, and phenyl. Moreover, these ring structures may themselves be fused, such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) are different from each other in one embodiment, and the same in another embodiment.

In yet another aspect of the invention, the metallocene catalyst components include bridged mono-ligand metallocene compounds (e.g., mono cyclopentadienyl catalyst components). In this embodiment, the at least one metallocene catalyst component is a bridged "half-sandwich" metallocene represented by the formula (III): $Cp^A(A)QMX_n$ wherein $Cp^A$ is defined above and is bound to M; (A) is a bridging group bonded to Q and $Cp^A$; and wherein an atom from the Q group is bonded to M; and n is an integer 0, 1, or 2. In formula (III) above, $Cp^A$, (A) and Q may form a fused ring system. The X groups and n of formula (III) are as defined above in formula (I) and (II). In one embodiment, $Cp^A$ is selected from the group consisting of cyclopentadienyl, indenyl, tetrahydroindenyl, fluorenyl, substituted versions thereof, and combinations thereof. In formula (III), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen, or sulfur atom in a more particular embodiment, and nitrogen and oxygen in yet a more particular embodiment. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene, and other compounds comprising Group 15 and Group 16 atoms capable of bonding with M.

In yet another aspect of the invention, the at least one metallocene catalyst component may be an unbridged "half sandwich" metallocene represented by the formula (IVa):

$$Cp^A MQ_qX_n \qquad \text{(IVa)}$$

wherein $Cp^A$ is defined as for the Cp groups in (I) and is a ligand that is bonded to M; each Q is independently bonded to M; X is a leaving group as described above in (I); n ranges from 0 to 3, and is 0 or 3 in one embodiment; q ranges from 0 to 3; and is 0 or 3 in one embodiment. In one embodiment, $Cp^A$ is selected from the group consisting of cyclopentadienyl, indenyl, tetrahydroindenyl, fluorenyl, substituted version thereof, and combinations thereof. In formula (IVa), Q is selected from the group consisting of ROO—, RO—, R(O)—, —NR—, —CR$_2$—, —S—, —NR$_2$, —CR$_3$, —SR, —SiR$_3$, —PR$_2$, —H, and substituted and unsubstituted aryl groups, wherein R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ alkyls, and $C_2$ to $C_{20}$ heteroallyl moieties.

In another aspect of the invention, the metallocene catalyst component is one or more as described in U.S. Pat. Nos. 5,703,187, and 5,747,406, including a dimer or oligomeric structure, such as disclosed in, for example, U.S. Pat. Nos. 5,026,798 and 6,069,213. In another aspect of the invention, the metallocene catalyst component is one or more as described in U.S. Pat. No. 6,069,213.

It is contemplated that the metallocene catalyst components described above include their structural or optical or enantiomeric isomers (racemic mixture), and may be a pure enantiomer in one embodiment. As used herein, a single, bridged, asymmetrically substituted metallocene catalyst component having a racemic and/or meso isomer does not, itself, constitute at least two different bridged, metallocene catalyst components. The "metallocene catalyst component" useful in the present invention may comprise any combination of any embodiment described herein.

In addition to the catalyst component described above, the catalyst system employed in the present process employs an activator preferably selected from alumoxanes, such as methyl alumoxane, modified methyl alumoxane, ethyl alumoxane, iso-butyl alumoxane, and the like; neutral activators, such as triphenyl boron, tris-perfluorophenyl boron, tris-perfluoronaphthylboron, tris-perfluorophenyl aluminum, and the like; and ionic activators, such as N,N-dimethylanilinium tetrakis perfluorophenyl borate, triphenyl carbonium tetrakis perfluorophenyl borate, N,N-dimethylanilinium tetrakis perfluoronaphthyl borate, N,N-dimethylanilinium tetrakis perfluorophenyl aluminate, and the like.

A co-activator is a compound capable of alkylating the transition metal complex, such that when used in combination with an activator, an active catalyst is formed. Co-activators include alumoxanes, such as methyl alumoxane; modified alumoxanes, such as modified methyl alumoxane; and aluminum alkyls, such as trimethyl aluminum, tri-isobutyl aluminum, triethyl aluminum, and tri-isopropyl aluminum. Co-activators are typically only used in combination with neutral activators and ionic activators when the pre-catalyst is not a dihydrocarbyl or dihydride complex.

The alumoxane component useful as an activator typically is an oligomeric aluminum compound represented by the general formula $(R^x—Al—O)_n$, which is a cyclic compound, or $R^x(R^x—Al—O)_nAlR^x{}_2$, which is a linear compound. In the general alumoxane formula, Rx is independently a $C_1$-$C_{20}$ alkyl radical, for example methyl, ethyl, propyl, butyl, pentyl, isomers thereof, and the like, and "n" is an integer from 1-50. Most preferably, $R^x$ is methyl and "n" is at least 4. Methyl alumoxane and modified methyl alumoxanes are most preferred. For further descriptions see EP 0 279 586; EP 0 594 218; EP 0 561 476; WO 94/10180; and U.S. Pat. Nos. 4,665, 208; 4,874,734; 4,908,463; 4,924,018; 4,952,540; 4,968,827; 5,041,584; 5,091,352; 5,103,031; 5,157,137; 5,204,419; 5,206,199; 5,235,081; 5,248,801; 5,329,032; 5,391,793; and 5,416,229.

When an alumoxane or modified alumoxane is used, the pre-catalyst (all pre-catalysts)-to-activator molar ratio is from about 1:3000-10:1; alternatively, 1:2000-10:1; alternatively 1:1000-10:1; alternatively, 1:500-1:1; alternatively 1:300-1:1; alternatively 1:200-1:1; alternatively 1:100-1:1; alternatively 1:50-1:1; alternatively 1:10-1:1. When the activator is an alumoxane (modified or unmodified), some embodiments select the maximum amount of activator at a 5000-fold molar excess over the pre-catalyst (per metal catalytic site). The preferred minimum activator-to-pre-catalyst-ratio is 1:1 molar ratio.

NCA activators (at times used in combination with a co-activator) may be used in the practice of this invention. Preferably, discrete ionic activators such as [Me$_2$PhNH] [B(C$_6$F$_5$)$_4$], [Ph$_3$C][B(C$_6$F$_5$)$_4$], [Me$_2$PhNH][B((C$_6$H$_3$-3,5-(CF$_3$)$_2$))$_4$], [Ph$_3$C][B((C$_6$H$_3$-3,5-(CF$_3$)$_2$))$_4$], [NH$_4$] [B(C$_6$H$_5$)$_4$], [Me$_2$PhNH][B(C$_{10}$F$_7$)$_4$], [Ph$_3$C][B(C$_{10}$F$_7$)$_4$], or neutral activators, such as B(C$_6$F$_5$)$_3$, B(C$_{10}$F$_7$)$_3$, or B(C$_6$H$_5$)$_3$ can be used (where C$_6$F$_5$ is perfluorophenyl, C$_{10}$F$_7$ is perfluoronaphthyl, and C$_6$H$_3$-3,5-(CF$_3$)$_2$ is 3,5-bis(trifluoromethyl) phenyl). Preferred co-activators, when used, are alumoxanes, such as methyl alumoxane, modified alumoxanes, such as modified methyl alumoxane, and aluminum alkyls, such as tri-isobutyl aluminum, and trimethyl aluminum.

It is within the scope of this invention to use one or more type of NCA activators, which may be neutral or ionic, such as tri(n-butyl) ammonium tetrakis(pentafluorophenyl) borate, a trisperfluorophenyl boron metalloid precursor, or a trisperfluoronaphthyl boron metalloid precursor, polyhalogenated heteroborane anions (WO 98/43983), boric acid (U.S. Pat. No. 5,942,459).

Activated ionic catalysts can be prepared by reacting a transition metal compound (pre-catalyst) with a neutral activator, such as B(C$_6$F$_6$)$_3$, which upon reaction with the hydrolyzable ligand (X) of the transition metal compound forms an anion, such as ([B(C$_6$F$_5$)$_3$(X)]$^-$), which stabilizes the cationic transition metal species generated by the reaction.

Examples of neutral NCA activators include tri-substituted boron, tellurium, aluminum, gallium and indium or mixtures thereof. The three substituent groups are each independently selected from alkyls, alkenyls, halogen, substituted alkyls, aryls, arylhalides, alkoxy, and halides. Preferably, the three groups are independently selected from halogen, mono or multicyclic (including halosubstituted) aryls, alkyls, and alkenyl compounds and mixtures thereof, preferred are alkenyl groups having 1-20 carbon atoms, alkyl groups having 1-20 carbon atoms, alkoxy groups having 1-20 carbon atoms and aryl groups having 3-20 carbon atoms (including substituted aryls). More preferably, the three groups are alkyls having 1-4 carbon groups, phenyl, naphthyl, or mixtures thereof. Even more preferably, the three groups are halogenated, preferably fluorinated, aryl groups. Most preferably, the neutral NCA activator is trisperfluorophenyl boron or trisperfluoronaphthyl boron.

Ionic NCA activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. Ser. No. 08/285,380, filed Aug. 3, 1994, all of which are herein fully incorporated by reference. In this case, the ionic activator reacts with the transition metal compound (pre-catalyst) to form a cationic transition metal species, an anion, and byproduct(s). The byproducts are defined by the cation associated with the ionic NCA activator used.

Compounds useful as an ionic NCA activator comprise a cation, which is preferably a Bronsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic diolefinic and acetylenically unsaturated substrates or other neutral Lewis bases, such as ethers, nitriles, and the like. Two classes of compatible non-coordinating anions have been disclosed in EP 0 277 003 A and EP 0 277 004 A, published 1988: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the ionic NCA activators include a cation and an anion component, and may be represented by the following formula:

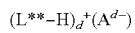

$(L^{}-H)_d^+(A^{d-})$ wherein $L^{}$ is a neutral Lewis base; H is hydrogen; $(L^{**}-H)^+$ is a Bronsted acid; $A^{d-}$ is a non-coordinating anion having the charge d–; d is 1, 2, or 3.

The cation component, $(L^{**}-H)_d^+$ may include Bronsted acids such as protons or protonated Lewis bases or reducible Lewis acids capable of protonating or abstracting a moiety, such as an alkyl or aryl, from the pre-catalyst after alkylation.

The activating cation $(L^{}-H)_d^+$ may be a Bronsted acid, capable of donating a proton to the alkylated transition metal catalytic precursor resulting in a transition metal cation, including ammoniums, oxoniums, phosphoniums, silyliums, and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline; phosphoniums from triethylphosphine, triphenylphosphine, and diphenylphosphine; oxomiuns from ethers, such as dimethyl ether, diethyl ether, tetrahydrofuran, and dioxane; sulfoniums from thioethers, such as diethyl thioethers and tetrahydrothiophene, and mixtures thereof. The activating cation $(L^{}-H)_d^+$ may also be a moiety, such as silver, tropylium, carbeniums, ferroceniums, and mixtures; preferably carboniums and ferroceniums; most preferably triphenyl carbonium.

The anion component $A^{d-}$ include those having the formula $[M^{k+}Q_n]^{d-}$ wherein k is an integer from 1-3; n is an integer from 2-6; n–k=d; M is an element selected from group 13 of the Periodic Table of the Elements, preferably boron or aluminum; and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl having 1-20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic NCA activator is N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

The catalyst precursors employed in the present process can also be activated with cocatalysts or activators that comprise non-coordinating anions containing metalloid-free cyclopentadienide ions. These are described in U.S. Patent Publication 2002/0058765 A1, published on 16 May 2002, and for the instant invention, require the addition of a co-activator to the catalyst pre-cursor.

The term "non-coordinating anion" (NCA) means an anion that does not coordinate to the catalyst metal cation or that does coordinate to the metal cation, but only weakly. An NCA coordinates weakly enough that a neutral Lewis base, such as an olefinically or acetylenically unsaturated monomer can displace it from the catalyst center. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal complex cation in the sense of balancing its ionic charge at +1, and yet retain sufficient liability to permit displacement by an ethylenically or acetylenically unsaturated monomer during polymerization. These types of cocatalysts sometimes use scavengers, such as, but not limited to, tri-iso-butyl aluminum, tri-n-octyl aluminum, tri-n-hexyl aluminum, triethylaluminum, or trimethylaluminum.

The present process also can employ cocatalyst compounds or activator compounds that are initially neutral Lewis acids but form a cationic metal complex and a noncoordinating anion, or a zwitterionic complex upon reaction with the alkylated transition metal compounds. The alkylated transition metal compound is formed from the reaction of the catalyst pre-cursor and the co-activator. For example, tris (pentafluorophenyl) boron or aluminum act to abstract a hydrocarbyl ligand to yield an invention cationic transition metal complex and stabilizing noncoordinating anion, see EP 0 427 697 A and EP 0 520 732 A for illustrations of analogous group 4 metallocene compounds. Also, see the methods and compounds of EP 0 495 375 A. For formation of zwitterionic complexes using analogous Group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.*, 100, pp. 1391-1434 (2000).

When the cations of noncoordinating anion precursors are Bronsted acids, such as protons or protonated Lewis bases (excluding water), or reducible Lewis acids, such as ferrocenium or silver cations, or alkali or alkaline earth metal cations, such as those of sodium, magnesium, or lithium, the catalyst-precursor-to-activator molar ratio may be any ratio. Combinations of the described activator compounds may also be used for activation.

When an NCA activator is used, the pre-catalyst (all pre-catalysts)-to-activator molar ratio is from 1:10-1:1; 1:10-10:1; 1:10-2:1; 1:10-3:1; 1:10-5:1; 1:2-1.2:1; 1:2-10:1; 1:2-2:1; 1:2-3:1; 1:2-5:1; 1:3-1.2:1; 1:3-10:1; 1:3-2:1; 1:3-3:1; 1:3-5:1; 1:5-1:1; 1:5-10:1; 1:5-2:1; 1:5-3:1; 1:5-5:1; 1:1-1:1.2. The pre-catalyst-to-co-activator molar ratio is from 1:100-100:1; 1:75-75:1; 1:50-50:1; 1:25-25:1; 1:15-15:1; 1:10-10:1; 1:5-5:1, 1:2-2:1; 1:100-1:1; 1:75-1:1; 1:50-1:1; 1:25-1:1; 1:15-1:1; 1:10-1:1; 1:5-1:1; 1:2-1:1; 1:10-2:1.

Preferred activators and activator/co-activator combinations include methylalumoxane, modified methylalumoxane, mixtures of methylalumoxane with dimethylanilinium tetrakis(pentafluorophenyl)borate or tris(pentafluorophenyl)boron, and mixtures of trimethyl aluminum or triethyl aluminum or triisobutyl aluminum or tri-n-octylaluminum with dimethylanilinium tetrakis(pentafluorophenyl)borate or tris(pentafluorophenyl)boron or dimethylanilinium tetrakis(perfluoronaphthyl)borate. Particularly preferred activator/co-activator combinations include tri-n-octylaluminum with dimethylanilinium tetrakis(pentafluorophenyl)borate, tri-n-octylaluminum with dimethylanilinium tetrakis(perfluoronaphthyl)borate, and methylalumoxane with dimethylanilinium tetrakis(pentafluorophenyl)borate.

In some embodiments, scavenging compounds are used with NCA activators. Typical aluminum or boron alkyl components useful as scavengers are represented by the general formula $R^x JZ_2$ where J is aluminum or boron, $R^x$ is a $C_1$-$C_{20}$ alkyl radical, for example, methyl, ethyl, propyl, butyl, pentyl, isomers thereof, and each Z is independently $R^x$ or a different univalent anionic ligand, such as halogen (Cl, Br, I), alkoxide ($OR^x$), and the like. Most preferred aluminum alkyls include triethylaluminum, diethylaluminum chloride, tri-isobutylaluminum, tri-n-octylaluminum. tri-n-hexylaluminum, trimethylaluminum, and the like. Preferred boron alkyls include triethylboron. Scavenging compounds may also be alumoxanes and modified alumoxanes including methylalumoxane and modified methylalumoxane.

The catalyst system useful in the present invention may further comprise a support material. Supports, methods of supporting, modifying, and activating supports for single-site catalyst, such as metallocenes, is discussed in, for example, 1 METALLOCENE-BASED POLYOLEFINS, pp. 173-218 (J. Scheirs & W. Kaminsky eds., John Wiley & Sons, Ltd. 2000). Desirable carriers are inorganic oxides that include Group 2, 3, 4, 5, 13, and 14 oxides and chlorides in one embodiment, and more particularly, inorganic oxides and chlorides of Group 13 and 14 atoms. Yet more particularly, support materials include silica, alumina, silica-alumina, magnesium chloride, graphite, and mixtures thereof. Other useful supports include magnesia, titania, zirconia, montmorillonite (EP 0 511 665 B1), phyllosilicate, and the like. Also, combinations of these support materials may be used, for example, silica-chromium, silica-alumina, silica-titania, and the like. Additional support materials may include those porous acrylic polymers described in EP 0 767 184 B1.

In certain embodiment, the two catalyst components reside on a single support particles. Alternatively, each catalyst can be supported on different support particles.

The in-reactor blends described herein are used as modifiers of linear ethylene containing polymers and are blended with at least one linear ethylene polymer to prepare the compositions of this invention.

Additives

The composition of this invention may optionally be combined with one or more polymer additives known in the art, such as reinforcing and non-reinforcing fillers, scratch resistant agents, plasticizers, antioxidants, heat stabilizers, extender oils, lubricants, antiblocking agents, antistatic agents, anti-fogging agent, waxes, foaming agents, pigments, flame/fire retardants, dyes and colorants, and ultraviolet absorber. Other additives include, for example, blowing agents, vulcanizing or curative agents, vulcanizing or curative accelerators, cure retarders, processing aids, tackifying resins, and other processing aids known in the polymer compounding art. The lists described herein are not intended to be inclusive of all types of additives which may be employed with the present invention. Upon reading this disclosure, those of skilled in the art will appreciate other additives may be employed to enhance properties. As is understood by the skilled in the art, the blends of the present invention may be modified to adjust the characteristics of the blends as desired. The aforementioned additives may be either added independently or incorporated into an additive or masterbatch. Such additives may comprise up to about 70 wt %, more preferably up to about 65 wt %, of the total composition.

The compositions of this invention may also comprise slip agents or mold-release agents to facilitate moldability, preferably present at 50 ppm to 10 wt %, more preferably 50 ppm to 5000 ppm, even more preferably 0.01 wt % to 0.5 wt % (100 ppm to 5000 ppm), even more preferably 0.1 wt % to 0.3 wt % (1000 ppm to 3000 ppm), based upon the weight of the composition. Desirable slip additives include but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; stearates (such as zinc stearate); and mixtures thereof. Preferred slip additives are unsaturated fatty acid amides, which are available from Crompton (Kekamide™ grades) and Croda Universal (Crodamide™ grades). Particularly preferred are the erucamide and oleamide versions of unsaturated fatty acid amides. Preferred slip agents also include amides having the chemical structure $CH_3(CH_2)_7CH=CH(CH_2)_xCONH_2$ where x is 5 to 15. Particularly preferred amides include: 1) Erucamide $CH_3(CH_2)_7CH=CH(CH_2)_{11}CONH_2$ which may also be referred to as cis-13-docosenoamide (Erucamide is commercially available from Akzo Nobel Amides Co. Ltd. under the trade name ARMOSLIP E); 2) Oleylamide $CH_3(CH_2)_7CH=CH(CH_2)_8CONH_2$; and 3) Oleamide which may also be preferred to as N-9-octadecenyl-hexadecanamide) $CH_3(CH_2)_7CH=CH(CH_2)_7CONH_2$. In another embodiment, stearamide is also useful in this invention. Other preferred slip additives include those described in WO 2004/005601 A1.

Additional polymers can also be added into the inventive compositions. In one or more embodiments, the additional polymers include thermoplastic resins or thermoplastic elastomers. Exemplary thermoplastic resins include crystalline polyolefins, such as polypropylene and impact copolymers. Also, suitable thermoplastic resins may include copolymers of polyolefins with styrene, such as a styrene/ethylene copolymer. In one or more embodiments, the thermoplastic resins are formed by polymerizing ethylene or alpha-olefins, such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another alpha-olefin, such as 1-butene, 1-hexene, 1-octene, 2-methyl-1-propene, 3-methyl-1-pentene, 4-methyl-1-pentene, 5-methyl-1-hexene, or mixtures thereof, are also contemplated. Specifically included are the homopolypropylene, impact, and random copolymers of propylene with ethylene or the higher alpha-olefins. Preferably, the homopolypropylene has a melting point of at least 130° C., for example at least 140° C. and preferably less than or equal to 170° C., a heat of fusion of at least 75 J/g, alternatively at least 80 J/g, as determined by DSC analysis, and weight average molecular weight ($M_w$) of at least 50,000, alternatively at least 100,000 g/mol. Comonomer contents for these propylene copolymers will typically be from 1% to about 30% by weight of the polymer (See, for example, U.S. Pat. Nos. 6,268,438; 6,288,171; and 6,245,856). Copolymers available under the trade name VISTAMAXX™ (ExxonMobil, Houston, Tex.) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art, such as, but not limited to, the conventional Ziegler-Natta type polymerizations, and catalysis employing single-site organometallic catalysts including, but not limited to, metallocene catalysts.

The compositions of this invention (comprising a linear ethylene containing polymer and an in-reactor blend) preferably have one or more of the following properties:
a) a decrease in the viscoelastic phase angle (δ) at a complex modulus of 10 kPa at 190° C. (as described in the Examples section below) of at least 0.3° per wt % of the in-reactor polymer blend added relative to the linear ethylene containing polymer; and/or
b) an increase in the degree of shear thinning at 190° C. (as described in the Examples section below) of at least 0.002 per wt % of the in-reactor polymer blend added relative to the linear ethylene containing polymer; and/or
c) a Young's Modulus (modified ASTM D 638) of at least 250 MPa or more (preferably 300 MPa or more, preferably 350 MPa or more); and/or
d) strain at yield (modified ASTM D 638) of at least 2% or more (preferably 4% or more, preferably 5% or more); and/or
e) stress at yield (modified ASTM D 638) of at least 5 MPa or more (preferably 7 MPa or more, preferably 9 MPa or more); and/or
f) stress at 100% strain (modified ASTM D 638) of at least 5 MPa or more (preferably 7 MPa or more, preferably 10 MPa or more); and/or
g) strain at break (modified ASTM D 638) of at least 150% or more (preferably 200% or more, preferably 230% or more); and/or
h) stress at break (modified ASTM D 638) of at least 15 MPa or more (preferably 20 MPa or more, preferably 22 MPa or more); and/or
i) toughness (determined as described in the Examples section) of at least 25 $MJ/m^3$ or more (preferably 30 $MJ/m^3$ or more, preferably 32 $MJ/m^3$ or more).

Use of the Polymer Blends

The inventive compositions can be used in many applications where thermoplastics are used. The inventive blends provide high melt strength, ease of processability (shear thinning), and higher application temperatures over a wide range of densities. The inventive compositions are useful in such forming operations as film, sheet, pipe and fiber extrusion, and co-extrusion, as well as blow molding, injection molding, and rotary molding. Films include blown or cast films formed by coextrusion or by lamination useful as shrink film, cling film, stretch film, sealing films, oriented films, snack packaging, heavy duty bags, grocery sacks, baked and frozen food packaging, cable and wire sheathing, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

Film blowing is the most widely used extrusion technique in terms of polyethylene production volume. Yearly billions of pounds of PE are processed by this method to produce grocery sacks and trash can liners. LLDPE's have narrower MWD's but contain no long chain branching (LCB). They have high entanglement densities which enhance film stretchability, leading to a higher resistance to damage by foreign objects to avoid tear and subsequently down time during the high-speed blowing process. However, the high entanglement density makes LLDPE viscous in the molten state. Also, their short chain branching (SCB) does not enhance shear thinning. Therefore, LLDPE is more viscous at high shear rates when processed in the extruder and the die than LDPE, which contains a certain amount of LCB. The narrow MWD's of mLLDPEs even make them more difficult to flow than conventional LLDPE's (znLLDPE) made by Ziegler-Natta catalysis. At the same time, LLDPE's show lower extensional stresses at low strain rates in the molten tube and bubble inflation regions, hence more prone to bubble instability. Another important feature in film blowing is its ability to draw down the film so that its final gauge is much thinner than the die gap. However, this is limited by the strength of the melt in the bubble. In the case of a high nip roll speed, the tensile stress in the bubble will exceed the cohesive strength of the melt, leading to film rupture. Therefore, there is always a need to improve the melt processability and the melt strength of both mLLDPE's and Ziegler-Natta LLDPE's in the film blowing process. Adding an in-reactor polymer blend in a LLDPE can reduce or eliminate the above problems because the in-reactor polymer blend can slowly relax the polymer chains, leading to high zero shear viscosity, shear thinning, and melt elasticity. The long relaxation time of the LLDPE blended with the in-reactor polymer blend also produces a high melt strength and easy processing in extruders.

More particularly, the inventive compositions are useful in making films. The films may be of any desirable thickness or composition, in one embodiment from 1 to 100 microns, and from 2 to 50 microns in a more particular embodiment, and from 10 to 30 microns in yet a more particular embodiment; and comprise copolymers of ethylene with a $C_3$ to $C_{10}$ olefin in one embodiment, ethylene with $C_3$ to $C_8$ α-olefins in a particular embodiment, and ethylene with $C_4$ to $C_6$ α-olefins in yet a more particular embodiment. The resins used to make the films may be blended with other additives such as pigments, antioxidants, fillers, etc., as is known in the art, as long as they do not interfere with the desired film properties.

For the case of HDPE's, a high-MW polymer will yield a stronger but less flexible film. Also, it is a challenge to achieve a good balance of orientation in the machine and transverse directions, probably due to its extensional flow properties. Incorporating an in-reactor polymer blend in HDPE's can reduce or eliminate these shortcomings.

In one embodiment, the compositions of this invention comprising a linear ethylene containing polymer and an in-reactor blend, preferably from 0.5 to 10 wt % of the in-reactor blend, based upon the weight of the composition, preferably from 1 to 5 wt % of the in-reactor blend. The compositions of this invention, particularly those comprising from 1 to 5 wt % of the in-reactor blend, are useful in making films. The films made with the compositions of this invention, particularly those comprising from 1 to 5 wt % of the in-reactor blend, have one or more of the following properties:

(a) a 1% secant modulus in the machine direction (MD) of at least 25,000 psi; 1% Secant Modulus, reported in pounds per square inch ($lb/in^2$ or psi), is measured as specified by ASTM D-882.

(b) a 1% secant modulus in the transverse direction (TD) of at least 24,000 psi;

(c) a yield strength (ASTM D-882) (both MD and TD) of at least 900 psi;

(d) an elongation at yield (ASTM D-882) (both MD and TD) of at least 4.0%;

(e) a tensile strength (ASTM D-882) in the MD of at least 6.500 psi;

(f) an Elmendorf tear (ASTM D-1922) in the MD of at least 180 gms/mil (preferably at least 250 gms/mil);

(g) a dart drop impact (ASTM D-1709, method A) of at least 200 g/mil;

(h) a Haze lower than 65%; (preferably lower that 60%) reported as a percentage (%), is measured as specified by ASTM D-1003; and (i) a gauge COV lower than 10.0% (alternately less than 7.0); Coefficient of variation (Gauge COV) is used to measure the variation of film thickness in the transverse direction. The Gauge COV is defined as a ratio of the standard deviation to the mean of film thickness.

The inventive compositions can also be used as an impact modifier of polypropylene. TPO compounding is the process of mixing polypropylene (PP) with other ingredients to form a PP based multi-component mixture. For typical TPO applications, the TPO mixture can have about 10% to 30% of the inventive polymer blend.

Thermoforming processes also favor the use of the high melt strength or the high melt elasticity of polyolefins. Thermoforming is the process of heating a solid plastic article, mostly in the sheet form, to a temperature where it softens, but does not flow, then reshaping it. This process has a large cost advantage over injection molding because of less expensive mold and lower energy expended. However, caution to avoid the buildup of slack in the heated sheet needs to be exercised in the thermoforming process. It has been found that a polyolefin containing a certain amount of branching can improve its melt strength or elasticity, which in turn improves its sagging resistance. Although thermoforming process of polyethylene (PE) is not as popular as that of polypropylene (PP), adding an in-reactor polymer blend in PE can improve the melt strength of PE during the thermoforming process. The inventive compositions are useful in thermoforming processes.

The inventive compositions may be used in any known application involving molding or extrusion, including consumer goods, industrial goods, construction materials, packaging materials, and automotive parts. The in-reactor polymer blends described herein may be molded into desirable end use articles by any suitable means known in the art, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art. They are particularly useful for making articles by injection molding, blow molding, film blowing, extrusion, thermoforming, gas foaming, elasto-welding, and compression molding techniques.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING, pp. 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

Preferred articles made using the in-reactor polymer blends include cookware, storageware, toys, medical devices, medical containers, healthcare items, sheets, crates, containers, bottles, packaging, wire and cable jacketing, pipes, sporting equipment, chair mats, tubing, profiles, instrumentation sample holders and sample windows, automotive, boat and water craft components, and other such articles. In particular, the compositions are suitable for automotive components, such as trim parts, parts for dashboards and instrument panels, mirror housing, body panel, protective side molding, and other interior and external components associated with automobiles, trucks, boats, and other vehicles.

The disclosed molded parts may also be fabricated using a co-injection molding process, whereby an injection mold is used to form the part and/or lid and the materials are co-injected into the mold to form separate skins. Also, the part and/or lid can be fabricated using an overmolding process, whereby one of the layers is molded first and the other layers are molded over the previously molded structure. Conventional injection molding and thermal molding may also be utilized. Further, injection molding and blow molding techniques may be combined by injection molding a preform, which is transferred to a blow mold, and inflated to form an outer structure with inner structures or layers blown into the outer structure. The process can be repeated to form as many layers as desired.

In certain embodiments, the molded articles made of the compositions of the present invention are formed by thermoforming, blow molding, injection molding, compression molding, or injection-compression molding.

The nature of high shear thinning of the invented reactor polymer blends provides a number of advantages in the injection molding processes. These materials allow using multi-shot injection molding, and making thinner and bigger pieces. It is also possible to use lower injection temperature for this invented in-reactor polymer blends. In addition to the energy saving, lower injection temperature will reduce the sample cooling time and reduce the production cycle time, and make the injection process more efficient.

In another embodiment, this invention relates to:

1. A film comprising a composition comprising:
   1) a linear ethylene containing polymer having a density of at least 0.910 g/cm$^3$; and
   2) an in-reactor polymer blend comprising: (a) a first ethylene containing polymer having a density of greater than 0.90 g/cm$^3$ and a M$_w$ of more than 20,000 g/mol; and (b) a second ethylene containing polymer having a density of less than 0.90 g/cm$^3$, wherein the densities of the first and second polymers differ by at least 1%, and wherein the in-reactor polymer blend has a T$_m$ of at least 90° C. (DSC second melt), a density of less than 0.92 g/cm$^3$, and contains at least 78 wt % ethylene.

2. A film comprising a composition comprising:
   1) a linear ethylene containing polymer having a density of at least 0.910 g/cm$^3$; and
   2) at least 1 wt % of an in-reactor polymer blend comprising: (a) a first ethylene polymer comprising 90 wt % to 100 wt % ethylene and from 0 wt % to less than 10 wt % comonomer, said first ethylene polymer component having density of greater than 0.920 g/cm$^3$ and an M$_w$ of 20,000 g/mol or more; and (b) a second ethylene polymer comprising from 70 wt % to 90 wt % ethylene and 30 wt % to 10 wt % comonomer, said second ethylene polymer having a density of 0.910 g/cm$^3$ or less, wherein the in-reactor polymer blend has:
   (a) at least 78 wt % ethylene;
   (b) a T$_m$ of at least 100° C. over a density ranging from 0.84 to 0.92 g/cm$^3$;
   (c) an elongation at break of 300% or more;
   (d) a strain hardening ratio, M300/M100, of at least 1.2;
   (e) a ratio of complex viscosity at 0.01 rad/s to the complex viscosity at 100 rad/s of at least 30; and
   (f) a shear thinning index of less than −0.2.

3. The film of paragraph 1 or 2, wherein the difference in density between the first ethylene polymer and the second ethylene polymer is at least 1%.

4. The film of paragraph 1, 2, or 3, wherein the first ethylene polymer has a T$_m$ of 110° C. or more and a melt index at 190° C., under a 2.16 kg load, of 0.01 to 800 dg/min, and/or the second ethylene containing polymer of the in-reactor blend has a melt index at 190° C., under a 2.16 kg load, of 200 dg/min or less.

5. The film of paragraph 1, 2, 3, or 4, wherein the in-reactor blend has a density from 0.84 to 0.92 g/cm$^3$ and a melting point of from 100° C. to 130° C.

6. The film of any of paragraphs 1 to 5, wherein the in-reactor blend has:
   a) a strain hardening index M500/M100 of at least 1.2; and/or
   b) a heat of fusion of at least 50 J/g; and/or
   c) a tensile strength of greater than 15 MPa; and/or
   d) an elongation at break of greater than 400%; and/or
   e) a tensile toughness of 40 MJ/m$^3$ or more; and/or
   f) a melt index at 190° C., under a 2.16 kg load, of 0.01 to 100 dg/min; and/or
   g) a cyclohexane refluxing insoluble fraction of 70 wt % or less.

7. The film of any of paragraphs 1 to 6, wherein the first ethylene containing polymer of the in-reactor blend has 95 wt % to 100 wt % ethylene and 0 wt % to 5 wt % comonomer selected from the group consisting of propylene, butene, hexene or octene; and/or the second ethylene containing polymer of the in-reactor blend has 70 wt % to 90 wt % ethylene and 10 wt % to 30 wt % comonomer selected from the group consisting of propylene, butene, hexene or octene.

8. The film of any of paragraphs 1 to 7, wherein second ethylene containing polymer has a 1% secant flexural modulus from 5 to 100 MPa.

9. The film of any of paragraphs 1 to 8, wherein the linear ethylene containing polymer (preferably an LLDPE or an HDPE) preferably comprises from 50 mole % to 100 mole % ethylene and from 0 mole % to 50 mole % of C$_2$ to C$_{40}$ comonomer and has:
   a) a CDBI of 60% or more; and/or
   b) an M$_w$ of 50,000 g/mol or more; and/or
   c) a g' of 0.95 or more; and/or
   d) an M$_w$/M$_n$ of from greater than 1 to 10; and/or
   e) a density of 0.910 to 0.940 g/cm$^3$.

10. The film of any of paragraphs 1 to 8, wherein the linear ethylene containing polymer is a polymer of an ethylene and at least one alpha olefin having 5 to 20 carbon atoms, where the linear ethylene containing polymer has a melt index (190° C./2.16 kg) of from 0.1 to 15 dg/min; a CDBI of at least 70%, a density of from 0.910 to 0.930 g/cm$^3$; a haze value of less than 20; a melt index ratio of from 35 to 80; an averaged modulus (M) of from 20000 to 60000 psi and a relation between M and the dart impact strength in g/mil, DIS, complying with the formula:

$$DIS \geq 0.8[100 + \exp(11.71 - 0.000268M + 2.183 \times 10^{-9}M^2)].$$

11. The film of any of paragraphs 1 to 8, wherein the linear ethylene containing polymer has a density of 0.940 g/cm$^3$ or more.

12. The film of any of paragraphs 1 to 8, wherein the composition has one or more of:
   a) a decrease in the viscoelastic phase angle (δ) at a complex modulus of 10 kPa at 190° C. (as described in the Examples section below) of at least 0.3° per wt % of the in-reactor polymer blend added relative to the linear ethylene containing polymer; and/or
   b) an increase in the degree of shear thinning at 190° C. (as described in the Examples section below) of at least 0.002 per wt % of the in-reactor polymer blend added relative to the linear ethylene containing polymer; and/or
   c) a Young's Modulus (modified ASTM D 638) of at least 250 MPa or more (preferably 300 MPa or more, preferably 350 MPa or more); and/or
   d) strain at yield (modified ASTM D 638) of at least 2% or more (preferably 4% or more, preferably 5% or more); and/or
   e) stress at yield (modified ASTM D 638) of at least 5 MPa or more (preferably 7 MPa or more, preferably 9 MPa or more); and/or
   f) stress at 100% strain (modified ASTM D 638) of at least 5 MPa or more (preferably 7 MPa or more, preferably 10 MPa or more); and/or
   g) strain at break (modified ASTM D 638) of at least 150% or more (preferably 200% or more, preferably 230% or more); and/or
   h) stress at break (modified ASTM D 638) of at least 15 MPa or more (preferably 20 MPa or more, preferably 22 MPa or more); and/or
   i) toughness (determined as described in the Examples section) of at least 25 MJ/m$^3$ or more (preferably 30 MJ/m$^3$ or more, preferably 32 MJ/m$^3$ or more).

13. A process to produce the composition used in of any of the above paragraphs 1 to 12 comprising:
   1) preparing an in-reactor blend by contacting a metallocene catalyst compound and an activator with ethylene, comonomer, and a macromonomer having at least 50% vinyl terminal unsaturation based on the total unsaturated olefin chain ends, where the macromonomer has an $M_w$ of 20,000 g/mol or more, a density of 0.920 g/cm$^3$ or more, and optionally a melting point of 110° C. or more;
   2) obtaining an in-reactor blend comprising:
      (a) a first ethylene polymer comprising 90 wt % to 100 wt % ethylene and from 0 wt % to less than 10 wt % comonomer, said first ethylene polymer component having density of greater than 0.920 g/cm$^3$ and an $M_w$ of 20,000 g/mol or more;
      (b) a second ethylene polymer comprising from 70 wt % to 90 wt % ethylene and 30 wt % to 10 wt % comonomer, said second ethylene polymer having a density of 0.910 g/cm$^3$ or less;
   wherein the in-reactor polymer blend has:
      (a) at least 78 wt % ethylene;
      (b) a $T_m$ of at least 100° C. over a density ranging from 0.84 to 0.92 g/cm$^3$;
      (c) an elongation at break of 300% or more;
      (d) a strain hardening ratio, M300/M100, of at least 1.2;
      (e) a ratio of complex viscosity at 0.01 rad/s to the complex viscosity at 100 rad/s of at least 30; and
      (f) a shear thinning index of less than −0.2;
   3) combining at least 1 wt % of the in-reactor blend with a linear ethylene containing polymer having a density of at least 0.910 g/cm$^3$.
14. The process of paragraph 13, wherein the process to produce the in-reactor blend occurs in the solution phase, gas phase or slurry phase.
15. The process of paragraph 13 or 14, wherein the macromonomer is made in the same reactor as the in-reactor blend.
16. The process of paragraph 13, 14, or 15, where the process to produce the in-reactor blend comprises:
   (i) contacting at least one first monomer composition comprising ethylene with a first catalyst capable of producing ethylene polymer having a density of 0.920 g/cm$^3$ or more and an $M_w$ of 20,000 g/mol or more at the selected polymerization conditions in a first polymerization stage under conditions including a first temperature sufficient to produce the ethylene-containing first polymer comprising at least 50% vinyl chain ends; and
   (ii) contacting at least part of said first polymer with a second monomer composition comprising ethylene and comonomer and with a second catalyst capable of producing polymer having a density of 0.910 g/cm$^3$ or less or more in a second polymerization stage under conditions including a second temperature sufficient to polymerize said second monomer composition to produce the ethylene-containing second polymer.
17. The process of paragraph 16, wherein said first temperature is between about 80° C. and about 140° C.; and/or wherein the contacting (i) is conducted by slurry polymerization and/or the contacting (ii) is conducted by solution polymerization; and/or wherein each of the contacting (i) and contacting (ii) is conducted in the presence of a single site catalyst comprising at least one metallocene catalyst and at least one activator.
18. The process of paragraph 16, wherein said first temperature is between about 80° C. and about 140° C.
19. The process of paragraph 16, wherein the contacting (i) is conducted by slurry polymerization and/or the contacting (ii) is conducted by solution polymerization.
20. The process of paragraph 16, wherein each of the contacting (i) and contacting (ii) is conducted in the presence of a single site catalyst comprising at least one metallocene catalyst and at least one activator.
21. The process of paragraph 13, wherein the linear ethylene containing polymer has a CDBI of 60% or more.
22. The process of paragraph 13, wherein the linear ethylene containing polymer is an LLDPE or an HDPE.
23. The process of paragraph 13, wherein the linear ethylene containing polymer has an $M_w$ of 50,000 g/mol or more, a g' of 0.95 or more and an $M_w/M_n$ of from greater than 1 to 10 and comprises from 50 mole % to 100 mole % ethylene and from 0 mole % to 50 mole % of $C_2$ to $C_{40}$ comonomer.
24. The process of paragraph 13, wherein the linear ethylene containing polymer is a polymer of an ethylene and at least one alpha olefin having 5 to 20 carbon atoms, where the linear ethylene containing polymer has a melt index (190° C./2.16 kg) of from 0.1 to 15 dg/min; a CDBI of at least 70%, a density of from 0.910 to 0.930 g/cm$^3$; a haze value of less than 20; a melt index ratio of from 35 to 80; an averaged modulus (M) of from 20000 to 60000 psi and a relation between M and the dart impact strength in g/mil, DIS, complying with the formula:

$$DIS \geq 0.8[100 + \exp(11.71 - 0.000268M + 2.183 \times 10^{-9}M^2)].$$

25. The process of paragraph 13, wherein the linear ethylene containing polymer has a density of 0.940 g/cm$^3$ or more.
26. The process of any of paragraphs 13 to 25 further comprising converting the composition into a film, preferably a blown or cast film, preferably by extrusion or blow molding.
27. A film produced by converting the composition produced by the process of paragraphs 13 to 25 into a film.
28. The film of paragraph 27 or produced by the process of paragraph 26, wherein the composition is a homogenous polymeric blend and the film (preferably a blown film, preferably having average gauge between 0.5 to 3.0 mils) has one or more (preferably two or more, preferably three or more, preferably four or more, preferably five or more, preferably six or more, preferably seven or more, preferably eight or more, preferably all nine) of the following properties:
   (a) an 1% secant modulus (MD) of at least 25,000 psi;
   (b) an 1% secant modulus (TD) of at least 24,000 psi;
   (c) a yield strength (both MD and TD) of at least 900 psi;
   (d) an elongation at yield (both MD and TD) of at least 4.0%;
   (e) a tensile strength in MD of at least 6.500 psi;
   (f) an Elmendorf tear in MD of at least 180 g/mil (preferably at least 250 g/mil);
   (g) a dart drop impact of at least 200 g/mil;
   (h) a Haze lower than 65% (preferably lower than 60%); and
   (i) a gauge COV lower than 10.0%, preferably lower than 7.0%.
29. The film of paragraph 28 wherein the film has properties (a) through (i).

The invention will now be more particularly described with reference to the accompanying non-limiting Examples.

EXPERIMENTAL SECTION

Peak melting point, $T_m$, (also referred to as melting point), peak crystallization temperature, $T_c$, (also referred to as crystallization temperature), glass transition temperature ($T_g$), heat of fusion ($\Delta H_f$ or $H_f$), and percent crystallinity were determined using the following DSC procedure according to ASTM D3418-03. Differential scanning calorimetric (DSC) data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (J/g)/B (J/g)]*100, where B is the heat of fusion for the 100% crystalline homopolymer of the major monomer component. These values for B are to be obtained from the Polymer Handbook, Fourth Edition, published by John Wiley and Sons, New York 1999, provided however that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of polymer blends produced show a secondary melting/cooling peak overlapping with the principal peak, which peaks are considered together as a single melting/cooling peak. The highest of these peaks is considered the peak melting temperature/crystallization point.

Morphology data were obtained using an Atomic Force Microscope (AFM) in tapping phase. All specimens were analyzed within 8 hours after cryofacing to prevent specimen relaxation. During cryofacing, the specimens were cooled to −130° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vise for AFM analysis. The AFM measurements were performed in air on a NanoScope Dimension 3000 scanning probe microscope (Digital Instrument) using a rectangular 225-mm Si cantilever. The stiffness of the cantilever was ~4 N/m with a resonance frequency of ~70 kHz. The free vibration amplitude was high, in the range of 80 nm to 100 nm, with a RMS setting of 3.8 volts. While the set point ratio was maintained at a value equal to or lower than 0.5, the contact set point was adjusted routinely to ensure repulsive contacts with positive phase shifts. The cantilever was running at or slightly below its resonance frequency.

Comonomer content such as butene, hexene and octene was determined via FTIR measurements according to ASTM D3900 (calibrated versus $^{13}$C NMR). A thin homogeneous film of polymer, pressed at a temperature of about 150° C., was mounted on a Perkin Elmer Spectrum 2000 infrared spectrophotometer. The weight percent of copolymer is determined via measurement of the methyl deformation band at ~1375 cm$^{-1}$. The peak height of this band is normalized by the combination and overtone band at ~4321 cm$^{-1}$, which corrects for path length differences.

Molecular weights (number average molecular weight ($M_n$), weight average molecular weight ($M_w$), and z-average molecular weight ($M_z$)) were determined using a Polymer Laboratories Model 220 high temperature SEC with on-line differential refractive index (DRI), light scattering, and viscometer detectors. It used three Polymer Laboratories PLgel 10 m Mixed-B columns for separation using a flow rate of 0.54 ml/min and a nominal injection volume of 300 μL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors as well as their calibrations have been described by, for example, T. Sun, P. Brant, R. R. Chance, and W. W. Graessley, in Macromolecules, Volume 34, Number 19, pp. 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/ 0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Temperature rising elution fractionation (TREF) analysis is conducted using Polymer Char TREF 200 (PolymerChar, Valencia, Spain) equipped with an infrared detector according to the method described by Wilde, L.; Ryle, T. R.; Knobeloch, D. C.; Peat, I. R.; Determination of Branching Distributions in Polyethylene and Ethylene Copolymers, J. Polym. Sci., 20, pp. 441-455 (1982). The polymer samples is first dissolved in 1,2 dichlorobenzene with 400 ppm of butylated hydroxy toluene (BHT) at 160° C. for about 60 minutes at a polymer concentration of 2 to 6 mg/ml. The resulting solution is then introduced into a packed column and stabilized at 140° C. for about 45 minutes. The polymer sample is then allowed to crystallize in the packed column by slowly reducing the temperature to 30° C. or 0° C. at a cooling rate of 1° C./min. The sample is then first eluted from the column by pumping the solvent through the column at a flow rate of 1.0 ml/min for 10 minutes at 0° C. or 30° C. A TREF chromatogram curve is then generated by eluting the crystallized polymer sample from the column by slowly increasing the temperature of the eluting solvent from 0° C. or 30° C. to 140° C. at a rate of 2° C./min and eluting solvent flow rate of 1.0 ml/min. The concentration of eluted polymer is measured using the infrared detector.

Crystallization analysis fractionation (CRYSTAF) was conducted using a CRYSTAF 200 unit commercially available from PolymerChar, Valencia, Spain. The sample is dissolved in 1,2 dichlorobenzene at 160° C. at a polymer concentration of about 0.2 to 1.0 mg/ml for about 1 hour and stabilized at 95° C. for about 45 minutes. The sampling temperatures range from 95° C. to 30° C. or 95° C. to 0° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the crystallinity distribution of each polymer components of the in-reactor polymer blends. The CRYSTAF peak temperature and area are identified by the peak analysis module included in the CRYSTAF Software. The CRYSTAF peak finding routine identifies a peak temperature as a maximum in the dW/dT curve and the area between the largest positive inflections on either side of the identified peak in the derivative curve.

Shore hardness was determined according to ASTM D2240.

Stress-strain properties, including ultimate tensile strength, ultimate elongation, Young's modulus, and 100% modulus, of the in-reactor polymer blends were determined at room temperature according to ASTM D638 at 23° C. Tensile properties were measured on an Instron™ model 4502 equipped with a 22.48 lb load cell and pneumatic jaws fitted with serrated grip faces. Deformation was performed at a constant crosshead speed of 5.0 in/min with a data sampling rate of 25 points/second. Initial modulus, stress and strain at yield (where evident), peak stress, tensile strength at break, and strain at break were calculated. A minimum of five specimens from each plaque was tested, the results being reported as the average value. All stresses quoted were calculated based upon the original cross-sectional area of the specimen, taking no account of reduced cross-section as a function of increasing strain. Tensile strength is defined as the maximum tensile stress. Tensile toughness is defined as the ability of polymer to absorb applied energy. The area under the stress-strain curve is used as a measure of the toughness. For mLLDPE's and their blends with the in-reactor polymer blend, a modified ASTM D638 method was used, e.g., the molded plaques with a thickness of about 2 mm obtained from a press at 180° C., a molding time of 15 min, and a force of 25 tons was die-cut into micro-dumbbell specimens (the base was ~1 cm×1 cm and the center, narrow strip was ~0.6 cm×0.2 cm). Stress-strain measurements under tension were performed in a MTS® ReNew™ 4502 (Upgrade Package) tensile tester. Measurements using triplicate samples (conditioned under ambient conditions for 24 hr prior to tests) were performed at room temperature and at a separation speed of 2.0 in/min. The stress was calculated based on the undeformed cross-sectional area of the test specimen. Strain measurements were based on clamp separation. The tensile toughness was calculated as the total area under the stress-strain curve.

Melt index (MI) was determined according to ASTM D1238 using a load of 2.16 kg at a temperature of 190° C. ($I_2$) or a load of 21.6 kg at 190° C. ($I_{21}$).

Density is determined according to ASTM D1505 using a density-gradient column, as described in ASTM D1505, on a compression-molded specimen that has been slowly cooled to room temperature (i.e., over a period of 10 minutes or more) and allowed to age for a sufficient time that the density is constant within +/−0.001 g/cm³.

Dynamic Mechanical Thermal Analysis (DMTA) examines the behavior of viscoelastic materials according to temperature and frequency dependent behavior. The application of a small stress produces a deformation (strain) in the material. The amount of deformation resulting from the applied stress yields information concerning the moduli of the material; its stiffness and damping properties. The DMTA is a controlled stress instrument applied in a sinusoidal fashion and gives a sinusoidal response versus time. As a consequence of the applied sinusoidal stress the material responds in an elastic (stores energy) and viscous (dissipates energy) manners. DMTA separates these responses into two different moduli values: Elastic Modulus (E') and the loss modulus (E") and in a temperature sweep these moduli is measured from the glassy region, the plateau region to the terminal region. The response of viscoelastic materials is out of phase with the input signal by an angle delta (δ). The tangent of this angle is equal to the ratio E"/E' and it is a valuable indicator of the relative damping ability of the material. Any peak in the tan δ corresponds to a region where the material properties are changing very rapidly; the material is undergoing a transition or relaxation such as $T_g$ (glass transition temperature) and other relaxations. For purpose of this invention and the claims thereto, $T_g$ is determined by DSC, unless DSC cannot determine a $T_g$, then DMTA shall be used. In the DMTA measurements, the instrument used was the DMTA V in tension mode (0.05% strain, 1 Hz frequency, 2° C./min heating rate, and a temperature range of ca. −100° C. to 150° C.). Compression-molded samples obtained from a press at 180° C., a molding time of 15 min, and a force of 25 tons, had dimensions of ~23 mm×6.42 mm×0.7 mm and were conditioned under ambient conditions for 24 hr before the measurements.

Dynamic shear melt rheological data was measured with an Advanced Rheometrics Expansion System (ARES) using parallel plates (diameter=25 mm) at several temperatures (150° C., 170° C., 190° C., and 210° C.) using a pristine compression molded sample at each temperature. The measurements were made over the angular frequency ranged from 0.01-100 rad/s. Depending on the molecular weight and temperature, strains of 10% and 15% were used and linearity of the response was verified. A nitrogen stream was circulated through the sample oven to minimize chain extension or cross-linking during the experiments. All the in-reactor polymer blend samples were compression molded at 190° C. and no stabilizers were added. A sinusoidal shear strain is applied to the material if the strain amplitude is sufficiently small that material behaves linearly. It can be shown that the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials 0<δ<90°. The shear thinning slope (STS) was measured using plots of the logarithm (base ten) of the dynamic viscosity versus logarithm (base ten) of the frequency. The slope is the difference in the log(dynamic viscosity) at a frequency of 100 rad/s and the log(dynamic viscosity) at a frequency of 0.01 rad/s divided by 4. For mLLDPE's and their blends with the in-reactor polymer blend, the molded plaques with a thickness of about 2 mm obtained from a press at 180° C., a molding time of 15 min, and a force of 25 tons was die-cut into 25-mm diameter circular specimens. The polymer or blend rheology was measured by a Rheometric Scientific™ ARES Analyzer (1998)

equipped with the 25-mm diameter parallel plates. The strain used was 10% at 190° C. The frequency was varied from 0.01 to 100 rad/s.

Examples 1 to 5

These examples demonstrate the use of a mixed catalyst polymerization in a single reactor operated in a continuous stirred-tank solution process. The catalysts employed were a biscyclopentadienyl zirconium dimethyl (Catalyst A) to produce higher density polyethylene and 1,1'-bis(4-triethylsilylphenyl)-methylene-(cyclopentadienyl)(2,7-ditert-butyl9-fluorenyl) hafnium dimethyl catalyst (Catalyst B) to produce lower density ethylene/hexene copolymer in the same reactor. The reactor was 1.0-liter stainless steel autoclave reactor equipped with a stirrer, a water-cooling/steam-heating element with a temperature controller, and a pressure controller. Solvents, monomers such as ethylene and hexene were first purified by passing through a three-column purification system. Purification columns were regenerated periodically whenever there was evidence of lower activity of polymerization.

Catalyst A was preactivated with N,N-dimethylanilinium tetrakis(heptafluoro-2-naphthyl) borate (Activator A) at a molar ratio of about 1:1 in 900 ml of toluene. Catalyst B was preactivated with N,N-dimethylanilinium tetrakis(pentafluorophenyl) borate (Activator B) at a molar ratio of about 1:1 in 900 ml of toluene. All catalyst solutions were kept in an inert atmosphere with <1.5 ppm water content and fed into reactors by metering pumps. Tri-n-octylaluminum (TNOA) solution was used as a scavenger. Scavenger feed rate was adjusted and optimized to achieve good yield at beginning of each run.

The solvent feed to the reactor was measured by a mass-flow meter. A Pulsa feed pump controlled the solvent flow rate and increased the solvent pressure to the reactor. The compressed, liquefied hexene feed was measured by a mass flow meter and the flow was controlled by a Pulsa feed pump. The solvent, monomers were fed into a manifold first. Ethylene from in-house supply was delivered in the chilled solvent/monomer mixture in the manifold. The mixture of solvent and monomers were then chilled to about −15° C. by passing through a chiller prior to feeding into the reactor through a single tube. Ethylene flow rate was metered through a Brookfield mass flow controller.

The reactor was first cleaned by continuously pumping solvent (e.g., isohexane) and scavenger through the reactor system for at least one hour at a maximum allowed temperature (about 150° C.). After cleaning, the reactor was heated/cooled to the desired temperature using water/steam mixture flowing through the reactor jacket and controlled at a set pressure with controlled solvent flow. Monomers and catalyst solutions were then fed into the reactor. An automatic temperature control system was used to control and to maintain the reactors at set temperatures. Onset of polymerization activity was determined by observations of a viscous product and lower temperature of water-steam mixture. Once the activity was established and system reached steady state, the reactor was lined out by continuing operating the system under the established condition for a time period of at least five times of mean residence time prior to sample collection. The resulting mixture from the reactor, containing mostly solvent, polymer and unreacted monomers, was collected in a collection box. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.4 MPa-g. Isohexane was used as solvent and the solvent flow rate was 80 ml/min for all polymerization experiments. The detailed reaction conditions and polymer properties are listed in Table 1, where the molecular weight data were based on the light scattering (LS) results.

TABLE 1

| | Example # | | | | |
|---|---|---|---|---|---|
| | 1 | 2 | 3 | 4 | 5 |
| Polymerization temperature (° C.) | 90 | 90 | 80 | 80 | 80 |
| Ethylene feed rate (SLPM*) | 4 | 4 | 4 | 4 | 4 |
| Hexene feed rate (ml/min) | 10 | 10 | 10 | 10 | 10 |
| Catalyst A feed rate (mol/min) | 1.41E−07 | 1.41E−07 | 1.41E−07 | 1.41E−07 | 8.84E−08 |
| Catalyst B feed rate (mol/min) | 3.53E−07 | 2.36E−07 | 3.53E−07 | 2.36E−07 | 3.53E−07 |
| Polymer yield (g/min) | 4.7 | 4.9 | 4.7 | 4.9 | 5.7 |
| Conversion (%) | 41.4 | 43.3 | 41.9 | 43.7 | 51 |
| I2 (2.16 kg, 190° C.) (dg/min) | 22.76 | 38.13 | 2.08 | 1.21 | <0.1 |
| I21 (21.6 kg, 190° C.) (dg/min) | 434.24 | 781.6 | 51.41 | 44.68 | 4.05 |
| $M_n$ (kg/mol) | 28.46 | 22.32 | 48.79 | 51.84 | 90.66 |
| $M_w$ (kg/mol) | 90.83 | 62.60 | 185.86 | 315.12 | 798.65 |
| $M_z$ (kg/mol) | 484.02 | 317.39 | 896.48 | 1191.81 | 1757.55 |
| $T_c$ (° C.) | 86.1 | 81.8 | 84.3 | 86.7 | 95.3 |
| $T_m$ (° C.) | 106.2 | 101.9 | 106.1 | 108.0 | 115.0 |
| $T_g$ (° C.) | | | | | −63.0 |
| Heat of fusion (J/g) | 112.8 | 104.5 | 92.8 | 87.5 | 46.6 |
| $T_c$ from a secondary peak (° C.) | 54.0 | 48.8 | 56.4 | 58.6 | 63.5 |
| Density (g/cm³) | 0.9063 | 0.9070 | 0.9033 | 0.8978 | 0.8768 |
| FTIR ethylene (wt %) | 82.15 | 83.35 | 83.77 | 77.05 | 63.17 |
| ¹³C NMR ethylene (wt %) | — | — | 82.41 | 76.51 | 61.01 |
| Critical Relaxation Exponent, n | — | — | 0.41 | 0.25 | 0.22 |
| Shear Thinning Index (STS) | — | — | −0.360 | −0.559 | −0.742 |
| Stress @ yield (MPa) | 7.19 | 7.05 | 7.36 | — | — |
| Tensile strength (MPa) | 15.69 | 18.23 | 26.32 | 20.80 | 6.15 |
| Stress @ 100% strain (MPa) | 7.10 | 6.88 | 7.27 | 6.17 | 2.45 |
| Stress @ 300% strain (MPa) | 8.34 | 8.13 | 9.66 | 8.26 | 3.24 |

TABLE 1-continued

| | Example # | | | | |
|---|---|---|---|---|---|
| | 1 | 2 | 3 | 4 | 5 |
| Stress @ 500% strain (MPa) | 11.6 | 11.50 | 15.22 | 13.39 | 4.20 |
| Stress @ 700% strain (MPa) | — | 15.80 | 23.12 | 19.33 | 5.27 |
| Strain @ break (%) | 694.98 | 817.00 | 830.00 | 748.89 | 1051.22 |
| Toughness (MJ/m$^3$) | 67.89 | 84.47 | 106.17 | 81.92 | 45.81 |

*Standard Liter Per Minute

The complex viscosity of the in-reactor polymer blends produced in Examples 3 to 5 was measured at temperature 190° C. over a frequency ranging from 0.01 to 100 rad/s. Significant shear thinning was observed. The ratio of complex viscosity at a frequency of 0.01 rad/s to the complex viscosity at a frequency of 100 rad/s is 27.5, 171.5 and 926.6 for materials produced in Example 3, 4, and 5, respectively. The complex viscosity profiles are shown in FIG. 1. The present in-reactor blends exhibit a number of important properties. Examples 3-5 have a shear thinning index (e.g., shear thinning slope (see STS in Table 1)), the slope of the log(complex viscosity) versus log(frequency) curve, of −0.360, −0.559, and −0.742, respectively. The more negative this slope, the faster the dynamic viscosity decreases as the frequency increases. These types of polymer blends are easily processed in high shear rate fabrication methods, such as injection molding. Large negative shear thinning slopes occur when blends are highly branched.

When the loss or phase angle is plotted versus frequency for Examples 3 to 5, the loss angles are nearly independent of frequency and a plateau is observed. This is gel-like behavior and the critical relaxation exponent can be calculated as the ratio of the loss angle of the plateau divided by 90°. The critical relaxation exponents for Examples 3 to 5 are less than or equal to 0.41. Linear polyolefins do not have plateaus in their plots of loss angle versus frequency. According to Garcia-Franco, et al., *Macromolecules* 34(10), 2001, pp. 3115-3117, the lower the critical relaxation exponent, the more extensive the long chain branches in the sample. The critical relaxation exponents observed for the blends of this invention are lower than any reported in this paper. Based upon a comparison with Garcia-Franco's data, Examples 3 to 5 have more than one branch per 10000 carbons.

The loss angle is the inverse tangent of the storage modulus divided by the loss modulus. For linear polymer chains the polymer melt is fully relaxed at small frequencies or long relaxation times; the storage modulus is much larger than the loss modulus and the loss angles are 90°. For the in-reactor blends of Examples 3 to 5 the loss modulus is still larger than the storage modulus even at a frequency of 0.01 rad/s. The chains are unable to relax, because of the presence of significant amounts of branching between the higher density polyethylene and lower density ethylene copolymer chains. These effects must be due to branching, because the experiment was carried out at a temperature of 190° C., above the melting points of both polymers in the blend.

Figure 2:
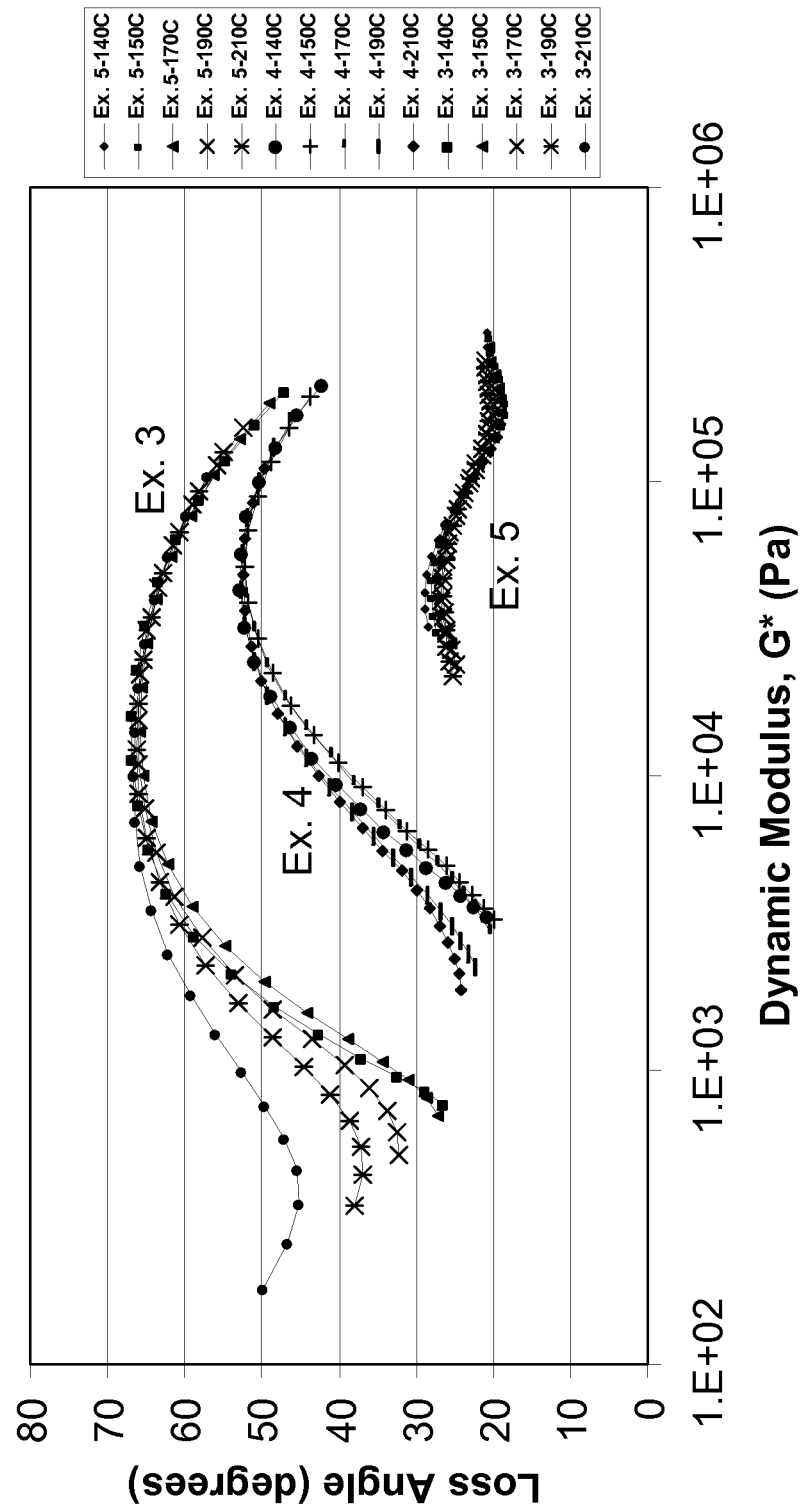
FIG. 2 is a plot of loss or phase angle vs. complex or dynamic modulus (G*) for the in-reactor polymer blends produced in Examples 3 to 5.

In FIG. 2, the loss angle data collected at 140° C., 150° C., 170° C., 190° C., and 210° C. is plotted versus the dynamic shear modulus, G*, for Examples 3, 4, and 5. These plots are known as van Gurp/Palmen plots. According to Garcia-Franco, et al., *European Polymer Journal* 44 (2008), pp. 376-391, these plots collected at different temperatures should superimpose for linear polyolefins as a result of the well-known time-temperature superposition principle. It can be seen that the plots for Examples 3 to 5 do not superimpose, because these in-reactor polymer blends are highly branched. According to this paper the lower the values of the loss or phase angle, the greater the level of long chain branches.

The dynamic viscosity at low shear rates is highly sensitive to those chains in the melt which relax slowly. To quantify how many chains with long relaxation times are present in the melt, the dynamic moduli, G' and G", measured at 190° C. were fit with a Generalized Maxwell model. Using the amount of the chains with 100 second relaxation times divided by the zero shear viscosity, viscosity fractions of 0.83, 0.90, and 0.89 were calculated for the chains with 100 second relaxation times for the in-reactor blends of Examples 3, 4, and 5. These slowly relaxing chains lead to high zero shear viscosities and shear thinning as demonstrated in FIG. 1. Long relaxation times also lead to high melt strengths and easy processing in extruders.

$^{13}$C NMR spectra were collected for Examples 3 to 5. The peaks were assigned and analyzed using the method of M. R. Seger and G. E. Maciel, *Anal. Chem.* 2004, 76, pp. 5734-5747. The ethylene weight percent for these Examples is presented in Table 1. A peak for the methine in the middle of a HHH pentad was present at 33.7 ppm. This is where the methine at the branch points of the cross products would also be seen, so the amount of cross products could not be quantified for these Examples.

Figure 3:
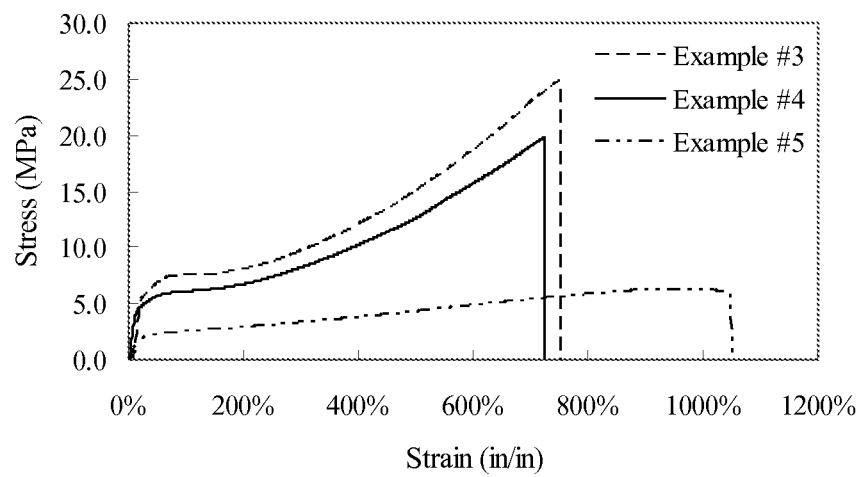
FIG. 3 shows stress-strain curves for the in-reactor polymer blends produced in Examples 3 to 5.

The in-reactor blends produced in the Examples 1 to 5 were compressed into plaques for the tensile testing according to the procedure described above. The strain-stress properties of the products are listed in Table 1. Five replicas are averaged for the results. The strain-stress curves for Examples 3 to 5 are shown in FIG. 3. Strain hardening is observed after the yield point for all examples. Strain hardening index is the increase of stress in the stress-strain curves after yielding. For polymer in Example 3, M300/M100=1.3, M500/M100=2.1, and M700/M100=3.2. It is believed that strain hardening is observed because parts of the chains in the reactor blend are immobilized in crystallites or by branch points. The in-reactor blend of Example 4 behaves as a crosslinked elastomer or a thermoplastic elastomer.

The data obtained from DSC for material in Example 1 to 5 are listed in Table 1. All of the polymer blends have high peak melting temperatures, and the peak melting temperatures are significant higher than those of random ethylene copolymers with similar density. For the material produced in Example 5, $T_m$=115° C. with a density of 0.8768 g/cm$^3$. For all of these samples, there is a shoulder connected to the primary crystallization peak. The peak temperatures for these shoulders are around 48° C. to 64° C.

Figure 4:
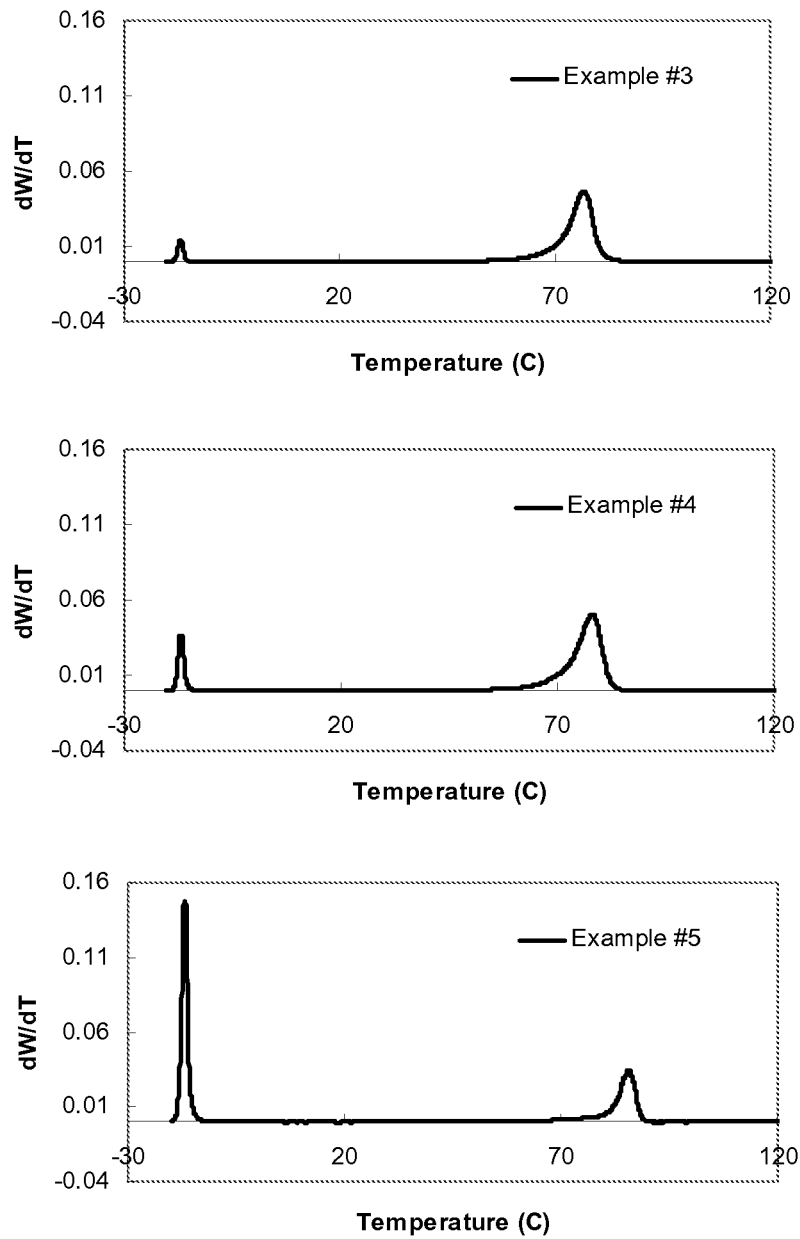
FIG. 4 shows TREF traces of dW/dT against elution temperature T for the in-reactor polymer blends produced in Examples 3 to 5, where W is the concentration of eluted polymer.

Materials produced in Examples 3 to 5 have a faction eluted between 50° C. to 90° C. and a soluble fraction which elutes below 0° C. when fractionated using TREF according to the procedure described above. The fraction corresponding to the highest temperature peak is referred to as the high-crystalline fraction. The soluble fraction is therefore referred to as amorphous elastomeric component. The peak temperatures for each fraction will be varied depending on the density of each component. TREF traces of dW/dT vs. elution temperature T for material produced in Examples 3 to 5 are shown in FIG. 4.

Figure 5:
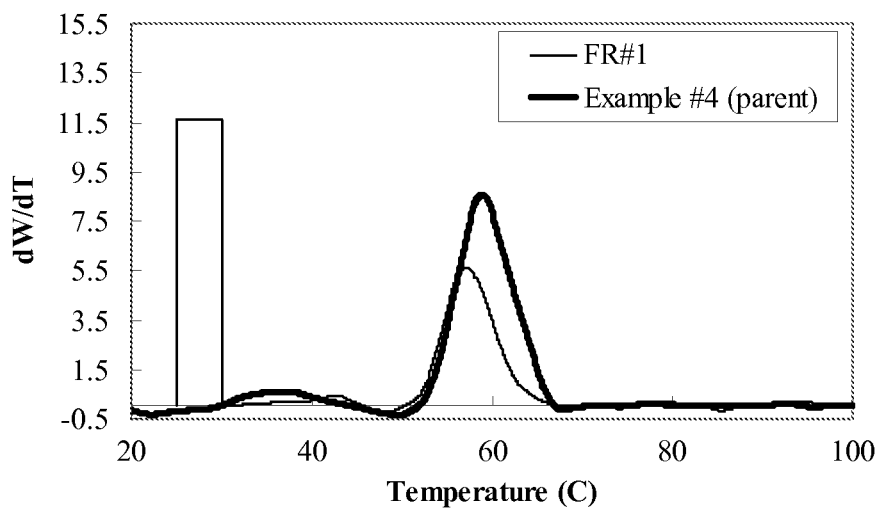
FIG. 5 are crystallization analysis fractionation (CRYSTAF) traces for the fractionated components of in-reactor polymer blend produced in Example 4.
Figure 5:
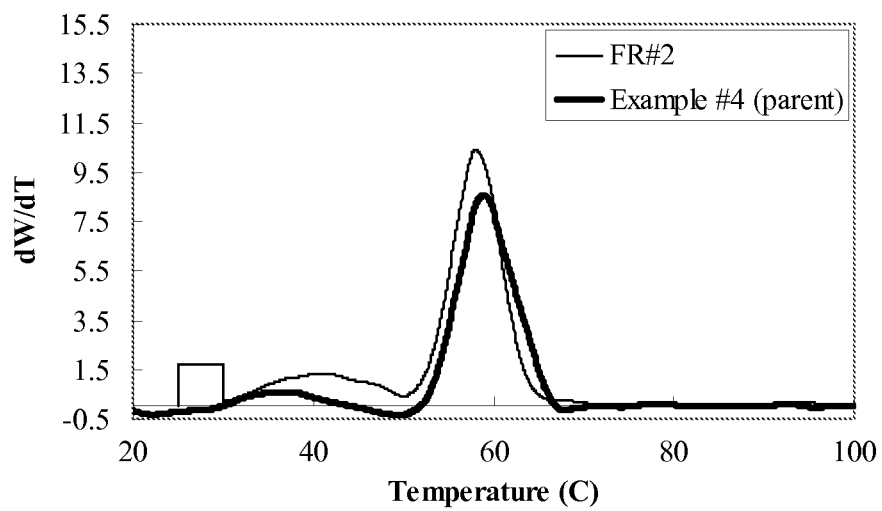
Figure 5:
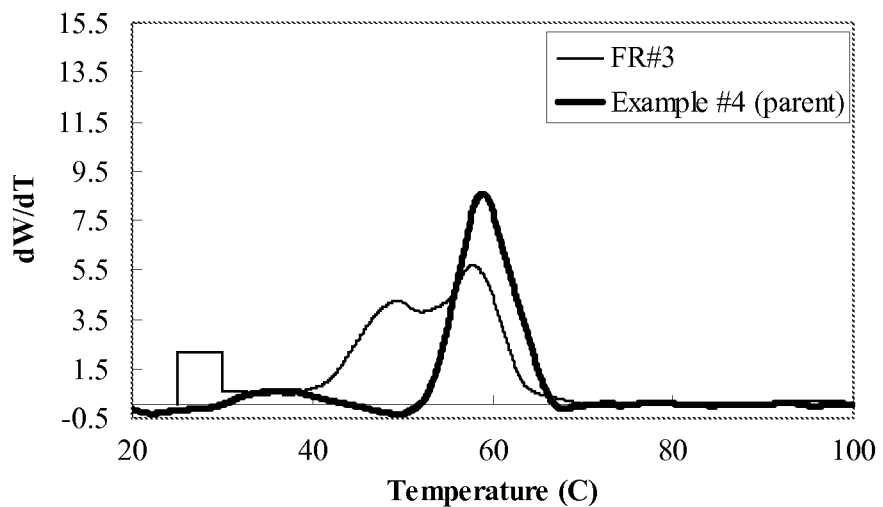
Figure 5:
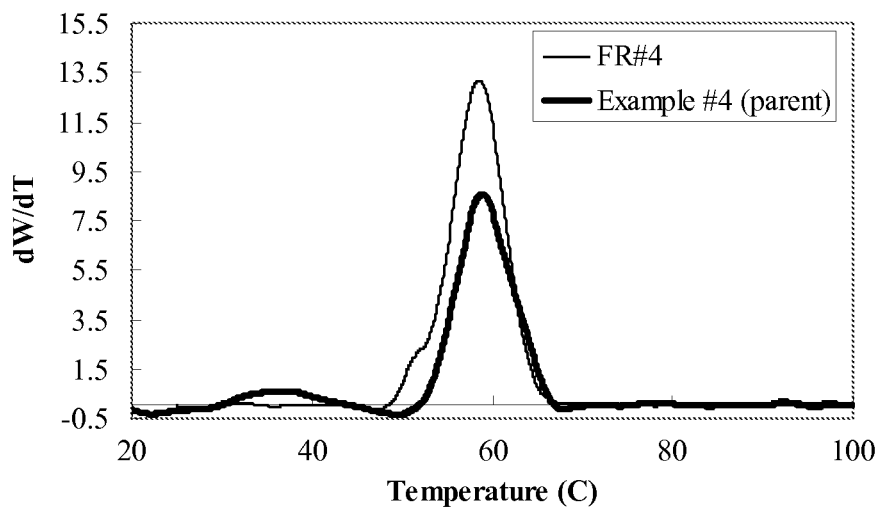

Polymer produced in Example 4 was also subjected to fractionation using a preparative temperature elution fractionation. Four fractions were collected at temperatures of 30° C., 45° C., 55° C., and 90° C. The weight percent for each fraction is listed in Table 2. Some of the analytical data for each fraction is also included in Table 2. The large fraction located below 30° C. is attributed to low density-component, while the large fraction above 90° C. is attributed to high density polyethylene component. Each fraction was also subjected to fractionation using a CRYSTAF in a temperature range from room temperature to 100° C. The CRYSTAF spectra for these four fractions and for the whole sample of Example 4 are plotted in FIG. 5 and are labeled as FR #1 to FR #4. DSC analysis revealed that all of these fractions have a similar $T_m$ ranging from 106° C. to 109° C. and a similar $T_c$ ranging from 88° C. to 91° C. It was surprised to observe that fraction #1 has a peak melting temperature of 107.8° C. and a heat of fusion of 58.6 J/g. Moreover, the molecular weight distribution for all four fractions showed a bi-modal distribution. In other word, this polymer blend cannot have a clean separation of lower density component and a higher density polyethylene component. Every fraction seems to contain at least two different components of polymer. It is believed that this multi-characteristic feature of each fraction is due to the present of branched block structure in the polymer blend.

TABLE 2

|  | FR#1 | FR#2 | FR#3 | FR#4 |
|---|---|---|---|---|
| Cut off temperature (° C.) | 30 | 45 | 55 | 90 |
| Weight percent of each fraction | 39.2 | 3.7 | 4.4 | 52.7 |
| $M_n$ (kg/mol) | 73.43 | 27.50 | 26.73 | 45.45 |
| $M_w$ (kg/mol) | 433.73 | 117.68 | 85.87 | 116.95 |
| $M_z$ (kg/mol) | 1179.06 | 620.69 | 448.80 | 536.2 |
| Molecular weight distribution | bi-modal | bi-modal | bi-modal | bi-modal |
| $T_c$ (° C.) | 88.0 | 90.3 | 91.0 | 89.1 |
| $T_m$ (° C.) | 107.8 | 108.1 | 106.6 | 108.3 |
| Heat of fusion (J/g) | 58.6 | 111.2 | 111.6 | 106.8 |
| First peak temperature in CRYSTAF (° C.) | 57.1 | 58.1 | 57.8 | 58.5 |
| Fraction of the first peak in CRYSTAF (%) | 37.9 | 71.3 | 47.5 | 97.3 |
| Second peak temperature in CRYSTAF (° C.) | — | 40.9 | 49.4 | — |
| Fraction of the 2nd peak in CRYSTAF (%) | — | 18.3 | 35.5 | — |
| Soluble fraction in CRYSTAF (<30° C.) (%) | 58 | 8.7 | 2.4 | — |

Figure 6:
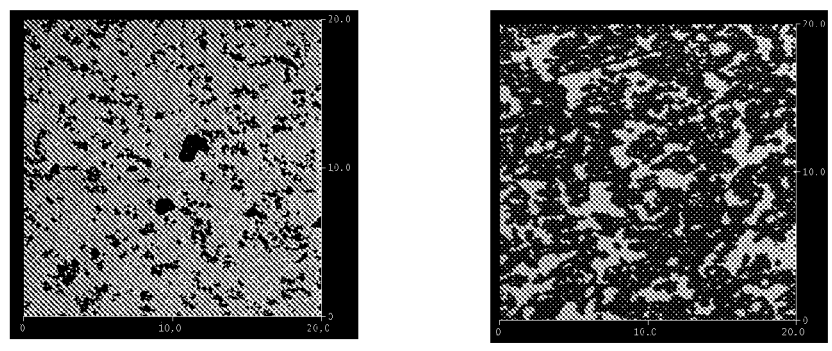
FIG. 6 shows atomic force micrographs (AFM) of the in-reactor polymer blends produced in Example 3 (field of view=40×40 μm) and Example 5 (field of view=10×10 μm).

The morphology of each of the blends produced in Examples 3 and 5 was examined using AFM according to the procedure described above and the results are shown in FIG. 6. A heterogeneous morphology was observed for materials produced in the Examples 3 and 5. For example 3, the high density component is the matrix phase and the low density is in discrete particle phase. The low density and high density components are in a co-continuous morphology for the polymer blend in Example 5.

Examples 6 to 9

Examples 6 to 9 were made by following the same procedure used in Examples 1 to 5 except that different types of catalysts were used in Examples 7 and 8. In Example 7, 2,6-diacetylpyridine bis(2,4,6-trimethylphenylimine) iron dichloride (Catalyst C) was used to produce higher density polyethylene and Catalyst B was used for the lower density ethylene/hexene copolymer. 100 mg of 2,6-diacetylpyridine bis(2,4,6-trimethylphenylimine) iron dichloride was first mixed with 8 ml of tri-n-octyl aluminum solution (25 wt %) in 900 ml of toluene for at least 10 minutes, then 160 mg of Activator B was added into the solution to form a catalyst solution. In Example 8, pentamethyl cyclopentadienyl 1,3 dimethyl indenyl hafnium dimethyl (Catalyst D) was used to make higher density polyethylene and Catalyst B was used to produce the lower density ethylene/hexene copolymer. Pentamethyl cyclopentadienyl 1,3 dimethyl indenyl hafnium dimethyl was preactivated with Activator B at a molar ratio of about 1:1 in 900 ml of toluene. The detailed process conditions and some property data are listed in Table 3a. Example 9 was made using only catalyst B, and is a comparative example.

TABLE 3a

|  | Example # | | | |
|---|---|---|---|---|
|  | 6 | 7 | 8 | 9 |
| Polymerization temperature (° C.) | 85 | 100 | 80 | 85 |
| Ethylene feed rate (SLPM*) | 4 | 6 | 4 | 4 |
| Hexene feed rate (ml/min) | 4 | 7 | 10 | 6 |
| Catalyst for higher density PE | Catalyst A | Catalyst C | Catalyst D | — |
| Catalyst A feed rate (mol/min) | 5.3E−08 | 2.119E−07 | 1.323E−07 | 0 |
| Catalyst for lower density ethylene/hexene copolymer | Catalyst B | Catalyst B | Catalyst B | Catalyst B |
| Catalyst B feed rate (mol/min) | 7.06E−08 | 1.766E−07 | 7.888E−08 | 6.71E−08 |
| Polymer yield (g/min) | 3.3 | 3.8 | 3.6 | 6.2 |
| Conversion (%) | 45.7 | 33 | 32.3 | 72.6 |
| I2 (2.16 kg, 190° C.) (dg/min) | <0.1 | <0.1 |  | <0.1 |
| $M_n$ (kg/mol) | 153.3 | 88.3 | 155.7 | 426.7 |
| $M_w$ (kg/mol) | 1229.9 | 395.9 | 506.4 | 1070.3 |
| $M_z$ (kg/mol) | 2659.5 | 1192.5 | 1153.1 | 2104.1 |
| $T_c$ (° C.) | 103.5 | 105.4 | 103.7 | 19.2 |
| $T_m$ (° C.) | 123.6 | 114.9 | 123.9 | 45.5 |
| $T_g$ (° C.) | −44.4 |  | −62.0 | −53.5 |
| Heat of fusion (J/g) | 39.9 | 102.8 | 78.8 | 38.9 |
| $T_c$ from a secondary peak (° C.) | 41.5 | 47.6 | 72.0 |  |

TABLE 3a-continued

| | Example # | | | |
|---|---|---|---|---|
| | 6 | 7 | 8 | 9 |
| $T_m$ from a secondary peak (° C.) | 61.3 | 64.7 | | |
| Heat of fusion from a secondary peak (J/g) | 27.9 | | | |
| FTIR ethylene content (wt %) | 84.1 | 88.1 | 77.0 | 72.2 |
| Stress @ yield (MPa) | | 10.2 | 5.7 | |
| Tensile strength (MPa) | 23.6 | 34.4 | 15.2 | 11.8 |
| Stress @ 100% strain (MPa) | 7.5 | 10.5 | 5.9 | 2.4 |
| Strain @ break (%) | 514.2 | 641.6 | 713.0 | 560.6 |
| Toughness (MJ/m³) | 62 | 125 | 65 | 29 |

*Standard Liter Per Minute

Figure 7:
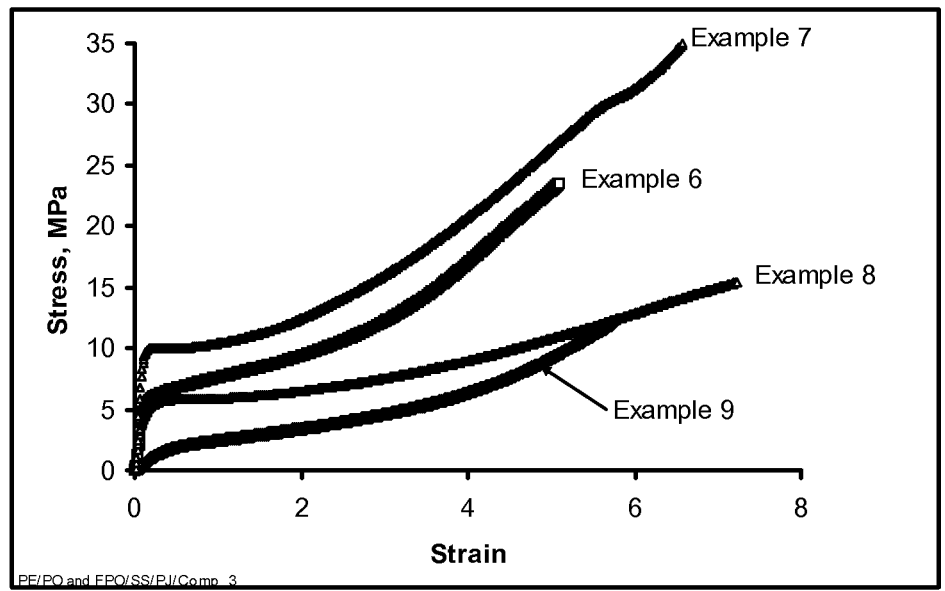
FIG. 7 provides stress-strain curves of the in-reactor polymer blends produced in Examples 6 to 9.

Tensile property and thermal property of the in-reactor blends produced in Examples 6 to 9 were measured using the procedures described early and some of results are listed in Table 3a. The polymer in Example 9 was prepared with a single metallocene catalyst, and is, more or less, like a plastomer with 27.8 wt % hexene. It shows a single $T_g$ and a single $T_m$. The polymers in Examples 6 and 8 should have two amorphous phases (one associated with the amorphous ethylene/hexene (EH) phase and the other associated with the amorphous PE phase) and two crystallized phases (one associated with the crystallized EH phase and the other associated with the crystallized PE phase). However, polymer in Example 8 only shows one crystallized phase (associated with the crystallized PE phase) because higher amount of hexene was incorporated in the lower density ethylene/hexene segments of this copolymer, resulting in an amorphous phase without any crystallinity. In Examples 6 and 7, the difference in the peak melting temperatures between the first high crystalline polymer and the second low crystalline polymer are 62.3° C. and 50.2° C., respectively. The total heat of fusion of Examples 6 to 9 is 67.8, 102.8, 78.8, and 38.9 J/g, respectively. All the above results are consistent with the tensile properties of these copolymers listed in Table 3a. FIG. 7 shows the full stress-strain curves of all these polymers. As expected, all in-reactor polymer blends (Examples 6 to 8) have better tensile properties than the comparative example, Example 9 made using only Catalyst B. Also, Examples 6 and 7 have higher tensile strengths than Example 8 because the second ethylene polymers of these two former in-reactor polymer blends contain crystallinity.

Examples 10-11

Examples 10 and 11 were made by following the same procedure used in Examples 1 to 5 except that Catalyst D was used in Example 11 for the higher density component. Catalyst D was preactivated with N,N-dimethylanilinium tetrakis (pentafluorophenyl) borate (Activator B) at a molar ratio of about 1:1 in 900 ml of toluene. The detailed process conditions and some property data are listed in Table 3b.

TABLE 3b

| | Example # | |
|---|---|---|
| | 10 | 11 |
| Polymerization temperature (° C.) | 100 | 80 |
| Ethylene feed rate (SLPM) | 6 | 4 |
| Hexene feed rate (ml/min) | 4.5 | 10 |
| Catalyst A | Catalyst A | Catalyst D |
| Catalyst A feed rate (mol/min) | 8.837E−08 | 1.186E−07 |
| Catalyst B | Catalyst B | Catalyst B |

TABLE 3b-continued

| | Example # | |
|---|---|---|
| | 10 | 11 |
| Catalyst B feed rate (mol/min) | 1.177E−07 | 5.298E−08 |
| Polymer yield (g/min) | 8.3 | 3.9 |
| Conversion (%) | 84.5 | 35.1 |
| I2 (2.16 kg, 190° C.) | <0.1 | <0.1 |
| Mn_LS (kg/mol) | 38.8 | 149.8 |
| Mw_LS (kg/mol) | 298.2 | 624.8 |
| Mz_LS (kg/mol) | 1,104.5 | 1,438.4 |
| Tc (° C.) | 102.6 | 104.9 |
| Tm (° C.) | 120.1 | 126.1 |
| Tg (° C.) | | −60.3 |
| Heat of fusion (J/g) | 112.3 | 67.5 |
| Tc from a secondary peak (° C.) | 66.2 | 73.9 |
| FTIR ethylene content (wt %) | 84.8 | 88.1 |
| Stress @yield (MPa) | 9.9 | 3.6 |
| Tensile strength (MPa) | 18.5 | 13.3 |
| Stress at 100% strain (MPa) | 8.6 | 5.0 |
| Stress at 300% strain (MPa) | 10.3 | 6.6 |
| Stress at 500% strain (MPa) | 14.9 | 9.6 |
| Strain At break (%) | 639.3 | 659.6 |
| Toughness (MJ/m³) | 75.1 | 50.0 |

Blends with LLDPE

Materials

Exceed™ Polyethylene 2018 ("Exceed PE 2018"), an mLLDPE available from ExxonMobil Chemical Company (Houston, Tex.), has an MI of 2.0 dg/min, a density of 0.918 g/cm³, an $M_w$ of 98 kg/mol, an $M_w/M_n$ of 2.09, a hexene content of about 6.0 wt %, and a CDBI of about 82% to 85%. From DMTA (dynamic mechanical thermal analysis) we observed that the Exceed PE 2018 has an α transition at 80° C. and a β transition at about −9° C. In semi-crystalline polymers such as PE's, relaxations are more complex than amorphous polymers because they often involve coupling processes in the crystalline and amorphous domains and individual PE's can be dominated by their peculiarities. The β transition has the characteristics of a $T_g$, but is not observed in a linear PE, presumably because of the heavy constraints to motion imposed by the crystalline domains in this highly crystalline linear PE material. The α transition is even more complex, involving coupled relaxations in both the crystalline and amorphous domains. Overall, a PE without any LCB or comonomer will only show the α transition because its crystallinity is high. On the other hand, a PE with LCB and/or comonomer will show both α and β transitions when it has a lower crystallinity.

Enable™ Polyethylene 2705 ("Enable PE 2705"), a mLLDPE with long chain branching available from ExxonMobil Chemical Company (Houston, Tex.), has an MI of 0.5 dg/min, a density of 0.927 g/cm³, an $M_w$ of 109 kg/mol, an $M_w/M_n$ of 2.87, a hexene content of about 4.5 wt %, and an CDBI of about 85%. It is an essentially linear ethylene containing polymer with about 1 wt % long chain branching. From DMTA, we observed that the Enable PE 2705 has an α transition at 88° C. but no β transition. It is likely that no beta transition was detected because Enable PE 2705 has a higher density or a lower amount of comonomer compared to Exceed PE 2018.

Example 12

The in-reactor blends produced in Examples 6 to 8 along with the comparative example of Example 9 and the commercial processability improver of LDPE 200.48 were tested as a modifier (at a concentration of 10 wt %) for Exceed PE 2018E. The blends were prepared using a Brabender mixer (50-g capacity) at a mixing temperature of 200° C. The mixture of Exceed PE 2018 and the in-reactor blend was introduced in the preheated Brabender mixer together with 500 ppm of Irganox 1076 (available from Ciba Specialty Chemicals Corporation, Tarrytown, N.Y.), 1000 ppm of Irgafos 168 (also available from Ciba Specialty Chemicals Corporation, Tarrytown, N.Y.), and 800 ppm of Dynamar FX 5920A (available from Dyneon LLC, Oakdale, Minn.). A rotor speed of 50 rpm was used throughout the run and the system was kept at the temperature desired and stable. Mixing was continued for 10 min once all the blend components were incorporated in the Exceed PE 2018. Finally the blend was discharged from the mixer and allowed to cool down. Polyethylene LD™ 200.48 ("LDPE 200.48") is an LDPE available from Exxon-Mobil Chemical Company (Houston, Tex.) having an MI of 7.5 dg/min and a density of 0.915 g/cm$^3$.

Table 4 reports the blend properties compared to the neat Exceed PE 2018 polymer properties.

means a higher melt elasticity. According to Garcia-Franco, et al., *European Polymer Journal* 44 (2008), pp. 376-391, the lower the values of the loss or phase angle (δ), the greater the level of long chain branches in the polymer or in the blend. The highly branched in-reactor polymer blend in Exceed PE 2018 can slowly relax the polymer chains. The long relaxation time will result in a high melt strength.

Figure 9:
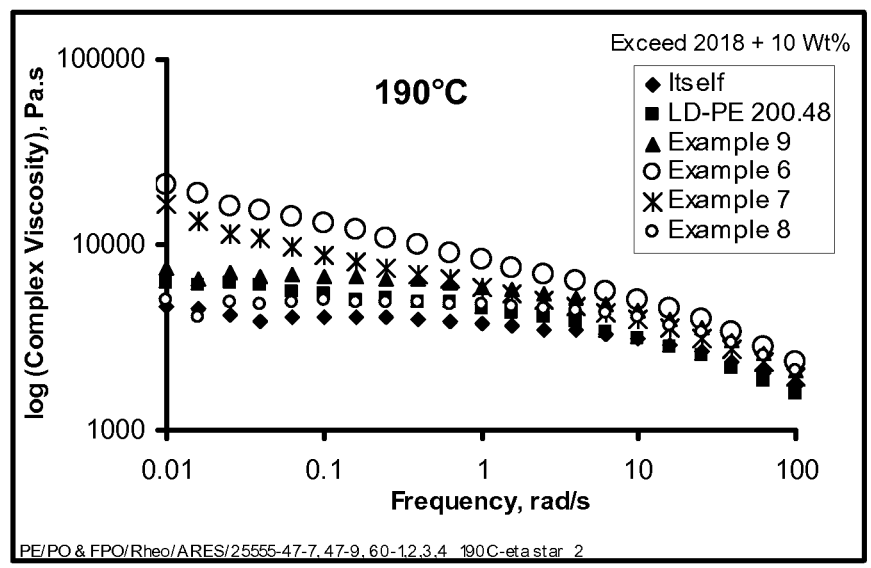
FIG. 9 provides complex viscosity versus frequency plots of polymeric materials in Table 4.

Ten wt % of polymers produced in Examples 6 and 7 in Exceed PE 2018 not only improve the melt strength, they also enhance the shear thinning of the host Exceed PE 2018, FIG. 9. The decreases in phase angle of Exceed PE 2018 are in the amounts of 0.9° and 0.7° for every 1 wt % of polymers in Examples 6 and 7 added, respectively. The increases in the degree of shear thinning of Exceed PE 2018 are in the amounts of 0.025 and 0.021 for every 1 wt % of polymers in Examples 6 and 7 added, respectively. In Table 4, the following ratio was used:

$$\text{degree of shear thinning} = \frac{\eta^*(0.1 \text{rad}/s) - \eta^*(100 \text{rad}/s)}{\eta^*(0.1 \text{rad}/s)}$$

to measure the degree of shear thinning, where $\eta_1^*(0.1 \text{ rad/s})$ and $\eta^*(100 \text{ rad/s})$ are the complex viscosities at frequencies of 0.1 and 100 rad/s, respectively, measured at 190° C. The higher this ratio, the higher is the degree of shear thinning. Again, adding a suitable in-reactor polymer blend in a mLL-DPE can slowly relax the polymer chains, leading to high zero shear viscosity, shear thinning, and easy processing in extruders.

The stress-strain properties are also shown in Table 4, where $E_o$ denotes the Young's modulus (obtained from the

TABLE 4

Properties of Exceed PE 2018 Blended with 10 wt % of Various In-reactor Blends
Polymer blend: 90 wt % of Exceed 2018 + 10 wt % of modifier

| | | Polymer blend | | | | |
| --- | --- | --- | --- | --- | --- | --- |
| | Exceed PE 2018 | Exceed PE 2018 + 10 wt % LDPE 200.48 | Exceed PE 2018 + 10 wt % polymer in Example 9 | Exceed PE 2018 + 10 wt % polymer in Example 6 | Exceed PE 2018 + 10 wt % polymer in Example 7 | Exceed PE 2018 + 10 wt % polymer in Example 8 |
| Exceed 2018 (wt %) | 100 | 90 | 90 | 90 | 90 | 90 |
| Modifier | | LDPE 200.48 | Example 9 | Example 6 | Example 7 | Example 8 |
| LDPE 200.48 or in-reactor blend (wt %) | | 10 | 10 | 10 | 10 | 10 |
| δ* | 81° | 75° | 80° | 72° | 74° | 84° |
| Degree of shear thinning | 0.57 | 0.71 | 0.69 | 0.82 | 0.78 | 0.58 |
| $E_o$, MPa | 348 | 372 | 331 | 369 | 410 | 351 |
| Strain @ yield (%) | 22 | 23 | 24 | 16 | 20 | 22 |
| Stress @ yield (MPa) | 11 | 11 | 9.3 | 9.6 | 11 | 10 |
| Stress @ 100% strain (MPa) | 11 | 11 | 10 | 11 | 11 | 10 |
| Strain @ break (%) | 320 | 320 | 280 | 270 | 300 | 320 |
| Stress @ break (MPa) | 33 | 30 | 26 | 27 | 31 | 30 |
| Toughness (MJ/m$^3$) | 54 | 51 | 38 | 39 | 48 | 48 |

*Loss or phase angle at a complex modulus of 10 kPa, $E_o$ = Young's modulus

Figure 8:
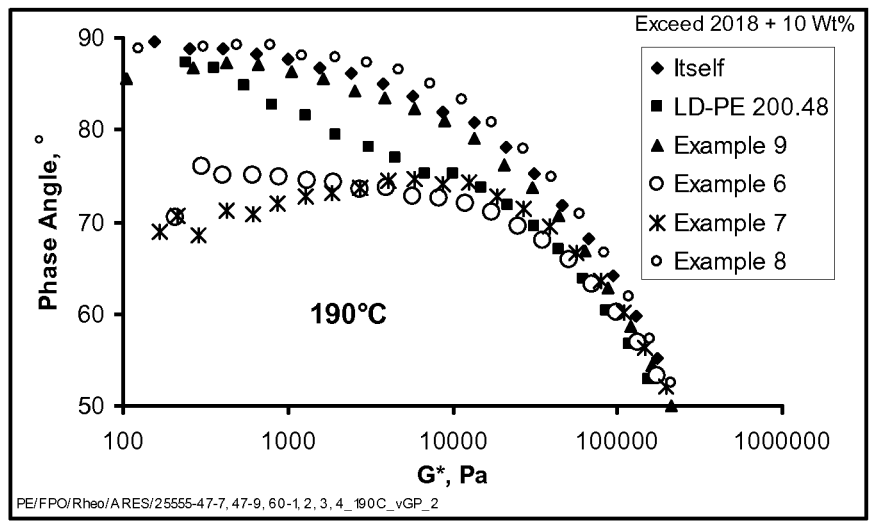
FIG. 8 are van Gurp-Palmen plots of polymeric materials in Table 4.

The van Gurp-Palmen and the complex viscosity versus frequency plots at 190° C. of these various polymeric materials in Table 4 are compared in FIGS. 8 and 9, respectively. G* denotes the complex modulus in FIG. 8. In Table 4, we use the loss or phase angle at a G* of 10 kPa to rank these polymeric materials. Blends with 10 wt % of in-reactor polymer blends produced in Example 6 and 7 with two $T_m$'s lower the phase angle of Exceed PE 2018 more than LD-PE 200.48, the commercial control, FIG. 8. The polymer produced in Example 8 and polymer produced in Example 9 with one $T_m$ show smaller effects. A lower phase angle at a given G* initial slope of the stress-strain curve). Some of these materials showed two yield points. The values of strain at yield and stress at yield in Table 4 were based on the first yield point starting from the lower-strain region of the stress-strain curve. Therefore, LD-PE 200.48 and polymers in Examples 6-9 affect the tensile properties of Exceed PE 2018 differently.

Exceed™ Polyethylene 1018 ("Exceed PE 1018"), an mLLDPE available from ExxonMobil Chemical Company (Houston, Tex.), has an MI of 1.0 dg/min, a density of 0.918 g/cm$^3$, and a $T_m$ of 118° C. It is expected that the in-reactor polymer blends in Examples 6 and 7 also improve the melt strength and shear thinning of this linear ethylene containing polymer in applications, such as blown film, cast film, sheet, pipe and fiber extrusion, and co-extrusion as well as blow molding, injection molding, and rotary molding.

Example 13

The in-reactor blends produced in Examples 6 to 8 along with the comparative example of Example 9 were tested as a modifier (at a concentration of 10 wt %) to Enable PE 2705. The blends were prepared using a Brabender mixer (50-g capacity) at a mixing temperature of 200° C. The mixture of Enable PE 2705 and the modifier were introduced in the preheated Brabender mixer together with 500 ppm of Irganox 1076, 1000 ppm of Irgafos 168, and 800 ppm of Dynamar FX 5920A. A rotor speed of 50 rpm was used throughout the run and the system was kept at temperature desired and stable. Mixing was continued for 10 min once all the blend components were incorporated in the Enable PE 2705. Finally the blend was discharged from the mixer and allowed to cool down.

As shown in Table 5, the blend properties were compared to the neat Enable 2705 polymer properties.

TABLE 5

Properties of Enable PE 2705 Blended with 10 wt % of Various In-reactor Blends
Polymer blend: 90 wt % of Enable PE 2705 + 10 wt % of modifier

| Polymer blend | Enable PE 2705 | Enable PE 2705 + 10 wt % polymer in Example 9 | Enable PE 2705 + 10 wt % polymer in Example 6 | Enable PE 2705 + 10 wt % polymer in Example 7 | Enable PE 2705 + 10 wt % polymer in Example 8 |
|---|---|---|---|---|---|
| Enable PE 2705 (wt %) | 100 | 90 | 90 | 90 | 90 |
| In-reactor blend | | Example 9 | Example 6 | Example 7 | Example 8 |
| $\Delta$* | 56° | 56° | 53° | 51° | 58° |
| Degree of shear thinning | 0.93 | 0.95 | 0.96 | 0.95 | 0.94 |
| $E_o$, MPa | 645 | 583 | 526 | 564 | 544 |
| Strain @ yield (%) | 5.2 | 6.4 | 6.5 | 5.7 | 5.6 |
| Stress @ yield (MPa) | 14 | 11 | 11 | 13 | 12 |
| Stress @ 100% strain (MPa) | 12 | 11 | 12 | 12 | 11 |
| Strain @ break (%) | 330 | 220 | 230 | 300 | 160 |
| Stress @ break (MPa) | 32 | 20 | 22 | 30 | 15 |
| Toughness (MJ/m$^3$) | 57 | 28 | 32 | 51 | 18 |

*Loss or phase angle at a complex modulus of 10 kPa, $E_o$ = Young's modulus

Figure 10:
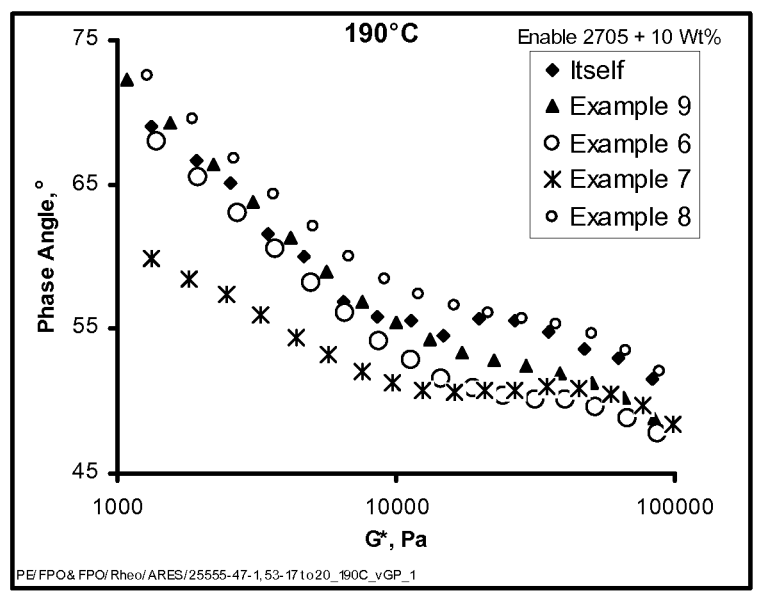
FIG. 10 are van Gurp-Palmen plots of polymeric materials in Table 5.

FIG. 10 compares the van Gurp-Palmen plot of Enable PE 2705 to those of Enable PE2705 containing 10 wt % of each polymer produced in Examples 6 to 9. In-reactor polymer blends produced in Examples 6 and 7 decrease the phase angle of Enable PE 2705, thereby enhancing the melt elasticity and melt strength of Enable PE 2705. The decreases in phase angle of Enable PE 2705 are in the amounts of 0.3° and 0.5° for every 1 wt % of polymers in Examples 6 and 7 added, respectively. In Table 5, the loss or phase angle at G*=10 kPa is used to rank these polymeric materials. Also, in-reactor polymer blends produced in Examples 6 and 7, after blended with Enable PE 2705, produce enhancements in the degree of shear thinning, Table 5. The increases in the degree of shear thinning of Enable PE 2705 are in the amounts of 0.003 and 0.002 for every 1 wt % of polymers in Examples 6 and 7 added, respectively.

Example 14

In-reactor polymer blends produced in Examples 10 and 11 were blended as a modifier with Exceed PE 2018 for film applications. The compounding of the in-reactor blend with Exceed PE 2018 was carried out in a 1" Haake twin screw extruder with an L/D of 15 followed by a strand pelletizer. The in-reactor blend was pre-mixed in solid state with Exceed PE 2018 granules. A two-step compounding process was employed to ensure proper mixing. In the first compounding step, a blend of 60% of the in-reactor blend r and 40% Exceed PE 2018 was produced in the twin screw extruder. The extrudate was pelletized using a strand pelletizer and used as a masterbatch. The masterbatch was then further diluted with additional ethylene polymer to produce the inventive composition with desired concentration of the in-reactor blend additives in the second compounding step. An antioxidant package was added into all the compounded compositions. The antioxidant consists of 0.05 wt % of Irganox™ 1076 (available from Ciba Specialty Chemicals Corporation, Tarrytown, N.Y.), 0.2 wt % of Weston™ 399 (available from Chemtura) and 0.08 wt % of Dynamar™ FX592DA (available from Dyneon LLC, Oakdale, Minn.). The concentration is the weight percent of the final blend.

The compounding extrusion conditions are listed below.

| Zone #1 | 180° C. |
|---|---|
| Zone #2 | 185° C. |
| Zone #3 | 190° C. |
| Die (Zone #5) | 195° C. |
| Extruder Speed (rpm) | 55 |

Blown films were made using Haake Rheomex 252P single screw extruder in connection with a Brabender blown film die. The line contains a 1" single screw Haake extruder and a 1" mono-layer blown film die. The screw is a 3:1 compression ratio metering screw with a Maddock type mixing section before the metering section. The die gap is 0.022 mm. The extrusion die is also equipped with a cooling air ring on the outside of the die. The air ring is used to blow the air onto the film bubble to solidify the film. There is an air orifice in the center of the die to provide air to inflate the bubble. The line also contains two take-up nip rollers to pick up and collapse the film bubble. The film has 1.5 mil gauge and 2.8 bubble blow-up ratio (BUR). The film bubble BUR and gauge are achieved by adjusting extruder speed, take-up speed and amount of air in the bubble. The specified process conditions are listed in the table below.

| Extrusion condition | Unit | Set point |
|---|---|---|
| Zone #1 temperature | °C. | 190 |
| Zone #2 temperature | °C. | 195 |
| Zone #3 temperature | °C. | 190 |
| Die (Zone #5) temperature | °C. | 185 |
| Extruder speed | rpm | 33 |
| Line speed | ft/min | 5.9 |
| Film gauge | mil | 1.5 |
| Layflat | in | 4.4 |

Table 6 provides some properties of the films produced from the inventive composition. Films composed with the inventive in-reactor blend and Exceed 2018 PE showed good properties.

TABLE 6

| | Example # | | |
|---|---|---|---|
| | Exceed PE 2018 | F01 | F02 |
| Exceed PE 2018 | | 94.67 wt % | 94.67 wt % |
| In-reactor blend | — | Example 10 | Example 11 |
| In-reactor blend (wt %) | — | 5 wt % | 5 wt % |
| 1% secant Modulus (psi) | | | |
| MD | 23482 | 28359 | 26634 |
| TD | 23401 | 29246 | 25404 |
| Yield Strength (psi) | | | |
| MD | 1162 | — | 1182 |
| TD | 1219 | — | 1321 |
| Elongation at yield (%) | | | |
| MD | 6.2 | — | 6.2 |
| TD | 5.9 | — | 6.6 |
| Tensile Strength in MD (psi) | 7168 | — | 7753 |
| Elmendorf Tear in MD (gms/mil) | 330 | 267 | 186 |
| Dart Drop (g/mil) | 427 | 227 | 271 |
| Haze (%) | 48 | 30 | 61 |
| Gauge Average (mils) | 1.12 | 1.18 | 1.06 |
| Gauge COV | 11.6% | 5.3% | 9.4% |

The film property results listed in Table 6 were determined according the following procedures. Gauge, reported in mils, was measured using a Measuretech Series 200 instrument. The instrument measures film thickness using a capacitance gauge. For each film sample, ten film thickness data points were measured per inch of film as the film was passed through the gauge in a transverse direction. From these measurements, an average gauge measurement was determined and reported. Coefficient of variation (Gauge COV) is used to measure the variation of film thickness in the transverse direction. The Gauge COV is defined as a ratio of the standard deviation to the mean of film thickness. Elmendorf Tear, reported in grams (g) or grams per mil (g/mil), was measured as specified by ASTM D-1922. The following procedures were used for testing the films: Tensile Strength at Yield, Tensile Strength at Break, Ultimate Tensile Strength and Tensile Strength at 50%, 100%, and/or 200% Elongation were measured as specified by ASTM D-882. Tensile Peak Load was measured as specified by ASTM D-882. Tensile Energy, reported in inch-pounds (in-lb), was measured as specified by ASTM D-882. Elongation at Yield and Elongation at Break, reported as a percentage (%), were measured as specified by ASTM D-882. 1% Secant Modulus, reported in pounds per square inch (lb/in$^2$ or psi), was measured as specified by ASTM D-882. Haze, reported as a percentage (%), was measured as specified by ASTM D-1003. Dart Drop Impact or Dart Drop Impact Strength (DIS), reported in grams (g) and/or grams per mil (g/mil), was measured as specified by ASTM D-1709, method A, unless otherwise specified. Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

All documents described herein are incorporated by reference herein for purposes of all jurisdictions where such practice is allowed, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A film comprising a composition comprising:
   1) a linear ethylene containing polymer having a density of at least 0.910 g/cm$^3$; and
   2) an in-reactor polymer blend comprising: (a) a first ethylene containing polymer having a density of greater than 0.90 g/cm$^3$ and a $M_w$ of more than 20,000 g/mol and (b) a second ethylene containing polymer having a density of less than 0.90 g/cm$^3$, wherein the densities of the first and second polymers differ by at least 1%, and wherein the in-reactor polymer blend has a $T_m$ of at least 90° C. (DSC second melt), a density of less than 0.92 g/cm$^3$, and contains at least 78 wt % ethylene.

2. The film of claim 1, wherein the linear ethylene containing polymer has a CDBI of 60% or more.

3. The film of claim 1, wherein the linear ethylene containing polymer is an LLDPE or an HDPE.

4. The film of claim 1, wherein the linear ethylene containing polymer has an $M_w$ of 50,000 g/mol or more, a g' of 0.95 or more and an $M_w/M_n$ of from greater than 1 to 10 and comprises from 50 mole % to 100 mole % ethylene and from 0 mole % to 50 mole % of $C_3$ to $C_{40}$ comonomer.

5. The film of claim 1, wherein the linear ethylene containing polymer is a polymer of an ethylene and at least one alpha olefin having 5 to 20 carbon atoms, where the linear ethylene containing polymer has a melt index (190° C./2.16 kg) of from 0.1 to 15 dg/min; a CDBI of at least 70%, a density of from 0.910 to 0.930 g/cm$^3$; a haze value of less than 20; a melt index ratio of from 35 to 80; an averaged modulus (M) of from 20000 to 60000 psi and a relation between M and the dart impact strength in g/mil, DIS, complying with the formula:

$$DIS \geq 0.8[100 + \exp(11.71 - 0.000268M + 2.183 \times 10^{-9} M^2)].$$

6. The film of claim 1, wherein the linear ethylene containing polymer has a density of 0.940 g/cm³ or more.

7. A film comprising a composition comprising:
1) a linear ethylene containing polymer having a density of at least 0.910 g/cm³; and
2) at least 1 wt % of an in-reactor polymer blend comprising: (a) a first ethylene polymer comprising 90 wt % to 100 wt % ethylene and from 0 wt % to less than 10 wt % comonomer, said first ethylene polymer component having density of greater than 0.920 g/cm³ and an $M_w$ of 20,000 g/mol or more; and (b) a second ethylene polymer comprising from 70 wt % to 90 wt % ethylene and 30 wt % to 10 wt % comonomer, said second ethylene polymer having a density of 0.910 g/cm³ or less, wherein the in-reactor polymer blend has:
(a) at least 78 wt % ethylene;
(b) a $T_m$ of at least 100° C. over a density ranging from 0.84 to 0.92 g/cm³;
(c) an elongation at break of 300% or more;
(d) a strain hardening ratio, M300/M100, of at least 1.2;
(e) a ratio of complex viscosity at 0.01 rad/s to the complex viscosity at 100 rad/s of at least 30; and
(f) a shear thinning index of less than −0.2.

8. The film of claim 7, wherein the difference in density between the first ethylene polymer and the second ethylene polymer is at least 1%.

9. The film of claim 7, wherein the first ethylene polymer has a $T_m$ of 110° C. or more.

10. The film of claim 7, wherein the in-reactor blend has a density from 0.84 to 0.92 g/cm³ and a melting point of from 100° C. to 130° C.

11. The film of claim 7, wherein the in-reactor blend has a strain hardening index M500/M100 of at least 1.2.

12. The film of claim 7, wherein the in-reactor blend has a heat of fusion of at least 50 J/g.

13. The film of claim 7, wherein the in-reactor blend has a tensile strength of greater than 15 MPa.

14. The film of claim 7, wherein the in-reactor blend has an elongation at break of greater than 400%.

15. The film of claim 7, wherein the in-reactor blend has a tensile toughness of 40 MJ/m³ or more.

16. The film of claim 7, wherein the in-reactor blend has a melt index at 190° C., under a 2.16 kg load, of 0.01 to 100 dg/min.

17. The film of claim 7, wherein the first ethylene containing polymer of the in-reactor blend has 95 wt % to 100 wt % ethylene and 0 wt % to 5 wt % comonomer selected from the group consisting of propylene, butene, hexene or octene.

18. The film of claim 7, wherein the second ethylene containing polymer of the in-reactor blend has 70 wt % to 90 wt % ethylene and 10 wt % to 30 wt % comonomer selected from the group consisting of propylene, butene, hexene or octene.

19. The film of claim 7, wherein the first ethylene containing polymer of the in-reactor blend has a melting point of 110° C. or more and a melt index at 190° C., under a 2.16 kg load, of 0.01 to 800 dg/min, and the second ethylene containing polymer of the in-reactor blend has a melt index at 190° C., under a 2.16 kg load of 200 dg/min or less.

20. The film of claim 7, wherein the second ethylene containing polymer of the in-reactor blend has a 1% secant flexural modulus from 5 to 100 MPa.

21. The film of claim 7, wherein the in-reactor polymer blend has a cyclohexane refluxing insoluble fraction of 70 wt % or less.

22. The film of claim 7, wherein the linear ethylene containing polymer has a CDBI of 60% or more.

23. The film of claim 7, wherein the linear ethylene containing polymer is an LLDPE or an HDPE.

24. The film of claim 7, wherein the linear ethylene containing polymer has an $M_w$ of 50,000 g/mol or more, a g' of 0.95 or more and an $M_w/M_n$ of from greater than 1 to 10 and comprises from 50 mole % to 100 mole % ethylene and from 0 mole % to 50 mole % of $C_2$ to $C_{40}$ comonomer.

25. The film of claim 7, wherein the linear ethylene containing polymer is a polymer of an ethylene and at least one alpha olefin having 5 to 20 carbon atoms, where the linear ethylene containing polymer has a melt index (190° C./2.16 kg) of from 0.1 to 15 dg/min; a CDBI of at least 70%, a density of from 0.910 to 0.930 g/cm³; a haze value of less than 20; a melt index ratio of from 35 to 80; an averaged modulus (M) of from 20000 to 60000 psi and a relation between M and the dart impact strength in g/mil, DIS, complying with the formula:

$$DIS \geq 0.8[100+\exp(11.71-0.000268M+2.183\times 10^{-9}M^2)].$$

26. The film of claim 7, wherein the linear ethylene containing polymer has a density of 0.940 g/cm³ or more.

27. A process to produce a film comprising a blend of a linear ethylene containing polymer and an in-reactor blend comprising:
1) preparing an in-reactor blend by contacting a metallocene catalyst compound and an activator with ethylene, comonomer, and a macromonomer having at least 50% vinyl terminal unsaturation based on the total unsaturated olefin chain ends, where the macromonomer has an $M_w$ of 20,000 g/mol or more, a density of 0.920 g/cm³ or more, and optionally a melting point of 110° C. or more;
2) obtaining an in-reactor blend comprising:
(a) a first ethylene polymer comprising 90 wt % to 100 wt % ethylene and from 0 wt % to less than 10 wt % comonomer, said first ethylene polymer component having density of greater than 0.920 g/cm³ and an $M_w$ of 20,000 g/mol or more; and
(b) a second ethylene polymer comprising from 70 wt % to 90 wt % ethylene and 30 wt % to 10 wt % comonomer, said second ethylene polymer having a density of 0.910 g/cm³ or less;
wherein the in-reactor polymer blend has:
(a) at least 78 wt % ethylene;
(b) a $T_m$ of at least 100° C. over a density ranging from 0.84 to 0.92 g/cm³;
(c) an elongation at break of 300% or more;
(d) a strain hardening ratio, M300/M100, of at least 1.2;
(e) a ratio of complex viscosity at 0.01 rad/s to the complex viscosity at 100 rad/s of at least 30; and
(f) a shear thinning index of less than −0.2;
3) combining at least 1 wt % of the in-reactor blend with a linear ethylene containing polymer having a density of at least 0.910 g/cm³;
4) converting the combination of in-reactor blend with a linear ethylene containing polymer into a film.

28. The process of claim 27, wherein the process to produce the in-reactor blend occurs in the solution phase.

29. The process of claim 27, wherein the process to produce the in-reactor blend occurs in the gas or slurry phase.

30. The process of claim 27, wherein the macromonomer is made in the same reactor as the in-reactor blend.

31. The process of claim 27, where the process to produce the in-reactor blend comprises:
(i) contacting at least one first monomer composition comprising ethylene with a first catalyst capable of producing ethylene polymer having a density of 0.920 g/cm³ or more and an $M_w$ of 20,000 g/mol or more at the selected polymerization conditions in a first polymerization stage under conditions including a first temperature sufficient to produce the ethylene-containing first polymer comprising at least 50% vinyl chain ends; and (ii) contacting at least part of said first polymer with a second monomer composition comprising ethylene and comonomer and with a second catalyst capable of producing polymer having a density of 0.910 g/cm³ or less or more in a second polymerization stage under conditions including a second temperature sufficient to polymerize said second monomer composition to produce the ethylene-containing second polymer.

32. The film of claim 7, wherein the composition has a decrease in the phase angle (δ) at a complex modulus of 10 kPa at 190° C. of at least 0.3° per wt % of the in-reactor polymer blend added relative to the linear ethylene containing polymer.

33. The film of claim 32, wherein the composition is a homogenous polymeric blend having an increase in the degree of shear thinning at 190° C. of at least 0.002 per 1 wt % of the in-reactor polymer blend added relative to the linear ethylene containing polymer.

34. The film of claim 1, wherein the film has one or more of the following properties:
(a) a 1% secant modulus (MD) of at least 25,000 psi;
(b) a 1% secant modulus (TD) of at least 24,000 psi;
(c) a yield strength (both MD and TD) of at least 900 psi;
(d) an elongation at yield (both MD and TD) of at least 4.0%;
(e) a tensile strength in MD of at least 6.500 psi;
(f) an Elmendorf tear in MD of at least 180 g/mil;
(g) a dart drop impact of at least 200 g/mil;
(h) a Haze lower than 65%; and
(i) a gauge COV lower than 10.0%.

35. The film of claim 1, wherein the film is a cast film.

36. The film of claim 1, wherein the film is a blown film.

37. The film of claim 1, wherein the film is a an oriented film.

38. The film of claim 1, wherein the film is 1 to 100 microns thick.

39. The film of claim 1, wherein the film is 2 to 50 microns thick.

40. The film of claim 1, wherein the film is 10 to 30 microns thick.

41. The film of claim 1, wherein the in-reactor polymer blend is present at from 1 to 5 wt %, based upon the weight of the blend.

42. The film of claim 1, wherein the film has the following properties:
(a) a 1% secant modulus (MD) of at least 25,000 psi;
(b) a 1% secant modulus (TD) of at least 24,000 psi;
(c) a yield strength (both MD and TD) of at least 900 psi;
(d) an elongation at yield (both MD and TD) of at least 4.0%;
(e) a tensile strength in MD of at least 6.500 psi;
(f) an Elmendorf tear in MD of at least 180 g/mil;
(g) a dart drop impact of at least 200 g/mil;
(h) a Haze lower than 65%; and
(i) a gauge COV lower than 10.0%.

43. A molded article comprising a composition comprising:
1) a linear ethylene containing polymer having a density of at least 0.910 g/cm³; and
2) an in-reactor polymer blend comprising: (a) a first ethylene containing polymer having a density of greater than 0.90 g/cm³ and a $M_w$ of more than 20,000 g/mol and (b) a second ethylene containing polymer having a density of less than 0.90 g/cm³, wherein the densities of the first and second polymers differ by at least 1%, and wherein the in-reactor polymer blend has a $T_m$ of at least 90° C. (DSC second melt), a density of less than 0.92 g/cm³, and contains at least 78 wt % ethylene.

44. A molded article comprising a composition comprising:
1) a linear ethylene containing polymer having a density of at least 0.910 g/cm³; and
2) at least 1 wt % of an in-reactor polymer blend comprising: (a) a first ethylene polymer comprising 90 wt % to 100 wt % ethylene and from 0 wt % to less than 10 wt % comonomer, said first ethylene polymer component having density of greater than 0.920 g/cm³ and an $M_w$ of 20,000 g/mol or more; and (b) a second ethylene polymer comprising from 70 wt % to 90 wt % ethylene and 30 wt % to 10 wt % comonomer, said second ethylene polymer having a density of 0.910 g/cm³ or less, wherein the in-reactor polymer blend has:
(a) at least 78 wt % ethylene;
(b) a $T_m$ of at least 100° C. over a density ranging from 0.84 to 0.92 g/cm³;
(c) an elongation at break of 300% or more;
(d) a strain hardening ratio, M300/M100, of at least 1.2;
(e) a ratio of complex viscosity at 0.01 rad/s to the complex viscosity at 100 rad/s of at least 30; and
(f) a shear thinning index of less than −0.2.

45. The film of claim 1, wherein the film has a gauge COV lower than 7.0%.

* * * * *